United States Patent
Inoue

(10) Patent No.: US 11,212,665 B2
(45) Date of Patent: Dec. 28, 2021

(54) EMBEDDED SIM MANAGEMENT SYSTEM, NODE DEVICE, EMBEDDED SIM MANAGEMENT METHOD, PROGRAM, AND INFORMATION REGISTRANT DEVICE

(71) Applicant: NEC Corporation, Tokyo (JP)

(72) Inventor: Tetsuo Inoue, Tokyo (JP)

(73) Assignee: NEC CORPORATION, Tokyo (JP)

( * ) Notice: Subject to any disclaimer, the term of this patent is extended or adjusted under 35 U.S.C. 154(b) by 22 days.

(21) Appl. No.: 16/338,543

(22) PCT Filed: Sep. 20, 2017

(86) PCT No.: PCT/JP2017/033950
§ 371 (c)(1),
(2) Date: Apr. 1, 2019

(87) PCT Pub. No.: WO2018/066362
PCT Pub. Date: Apr. 12, 2018

(65) Prior Publication Data
US 2019/0289454 A1    Sep. 19, 2019

(30) Foreign Application Priority Data

Oct. 4, 2016  (JP) .............................. JP2016-196566

(51) Int. Cl.
*H04W 8/18*     (2009.01)
*G06F 16/182*   (2019.01)
(Continued)

(52) U.S. Cl.
CPC ........ *H04W 8/183* (2013.01); *G06F 16/1824* (2019.01); *G06F 16/1834* (2019.01);
(Continued)

(58) Field of Classification Search
CPC .. H04W 12/04071; H04L 9/32; H04L 9/0825; H04L 9/08; H04L 9/0643; G06F 21/33; G06F 21/44
See application file for complete search history.

(56) References Cited

U.S. PATENT DOCUMENTS 9,100,810 B2 * 8/2015 Schell ................... H04W 8/205
10,182,060 B2 * 1/2019 Lee ......................... H04L 67/36
(Continued)

FOREIGN PATENT DOCUMENTS

JP    2012231466 A    11/2012
JP    2015043510 A    3/2015
(Continued)

OTHER PUBLICATIONS

Nakamoto, S., "Bitcoin A Peer-to-Peer Electronic Cash System", 2016, pp. 1-9, https://bitcoin.org/bitcoin.pdf.
(Continued)

*Primary Examiner* — Redentor Pasia

(57) ABSTRACT

A node device configuring a peer-to-peer network includes: a network interface; and a blockchain management part configured to receive, through the network interface, an information registration request transaction that includes embedded Subscriber Identity Module, SIM, information including SIM identification information, an electronic signature put on the embedded SIM information by using a private key of an information registrant, and a public key paired with the private key, and accumulate the received information registration request transaction into a blockchain based on a consensus building algorithm executed in cooperation with another node device configuring the peer-to-peer network.

7 Claims, 29 Drawing Sheets

(51) Int. Cl.
　　　*H04L 9/06*　　　　(2006.01)
　　　*H04L 9/08*　　　　(2006.01)
　　　*G06F 21/64*　　　(2013.01)
　　　*H04L 9/32*　　　　(2006.01)
　　　*G09C 1/00*　　　　(2006.01)
　　　*H04W 12/0471*　　(2021.01)

(52) U.S. Cl.
　　　CPC ............... *G06F 21/64* (2013.01); *G09C 1/00* (2013.01); *H04L 9/0643* (2013.01); *H04L 9/08* (2013.01); *H04L 9/0825* (2013.01); *H04L 9/32* (2013.01); *H04W 12/0471* (2021.01); *H04L 2209/38* (2013.01)

(56) References Cited

U.S. PATENT DOCUMENTS

| | | | |
|---|---|---|---|
| 10,567,576 B2* | 2/2020 | Yeoum | H04M 3/42136 |
| 2012/0117635 A1* | 5/2012 | Schell | H04W 8/205 |
| | | | 726/9 |
| 2012/0331292 A1* | 12/2012 | Haggerty | H04L 63/0853 |
| | | | 713/168 |
| 2013/0227646 A1* | 8/2013 | Haggerty | H04W 12/35 |
| | | | 726/3 |
| 2014/0143826 A1 | 5/2014 | Sharp et al. | |
| 2016/0006729 A1* | 1/2016 | Yang | H04W 12/06 |
| | | | 713/156 |
| 2016/0063260 A1* | 3/2016 | Sharp | H04L 63/102 |
| | | | 726/1 |
| 2016/0142906 A1* | 5/2016 | Park | H04L 67/30 |
| | | | 455/419 |
| 2016/0275461 A1 | 9/2016 | Sprague et al. | |
| 2017/0064552 A1* | 3/2017 | Park | H04L 63/0869 |
| 2017/0338954 A1* | 11/2017 | Yang | H04W 12/02 |
| 2018/0027480 A1* | 1/2018 | Narasimhan | H04W 8/02 |
| | | | 455/435.1 |
| 2018/0063668 A1* | 3/2018 | Li | H04W 4/50 |
| 2018/0131699 A1* | 5/2018 | Park | H04L 63/0853 |
| 2018/0198631 A1* | 7/2018 | Yang | H04L 9/3239 |
| 2019/0166483 A1* | 5/2019 | Li | H04W 12/10 |
| 2019/0349751 A1* | 11/2019 | Park | H04W 8/24 |

FOREIGN PATENT DOCUMENTS

| | | |
|---|---|---|
| JP | 5724039 B2 | 4/2015 |
| JP | 2016505929 A | 2/2016 |
| JP | 2016081134 A | 5/2016 |
| WO | 2014097517 A1 | 6/2014 |

OTHER PUBLICATIONS

Chin Cheng Liang, "A Next-Generation Smart Contract and Decentralized Application Platform", 2016, pp. 1-48, https://github.com/ethereum/wiki/wiki/White-Paper.

GSM Association, "Embedded SIM Remote Provisioning Architecture", Version 4.0, Feb. 25, 2019, pp. 1-103, https://www.gsma.com/connectedliving/wp-content/uploads/2014/01/1.-GSMA-Embedded-SIM-Remote-Provisioning-Architecture-Version-1.1.

International Search Report dated Dec. 26, 2017 from the International Bureau in counterpart International application No. PCT/JP2017/033950.

Fuchita, Y., "Block Chain and Innovation in Financial Transaction", vol. 19, No. 2, 2015, Nomura Capital Markets Quarterly, pp. 11-35 (29 pages).

Extended European Search Report for EP Application No. EP17858201.1 dated Jun. 13, 2019.

* cited by examiner

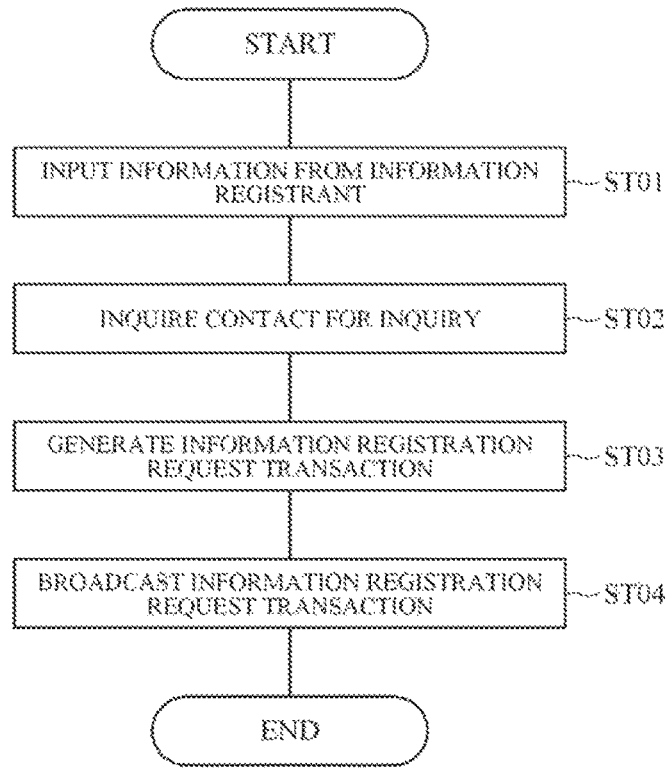
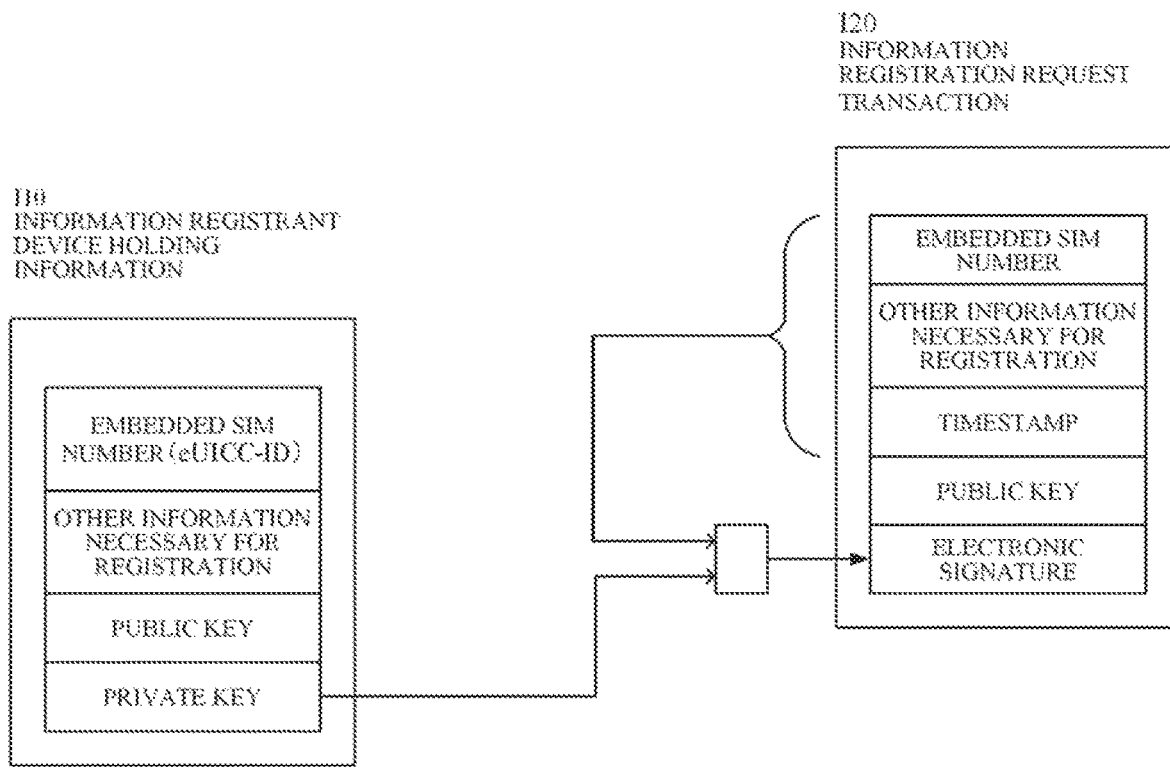

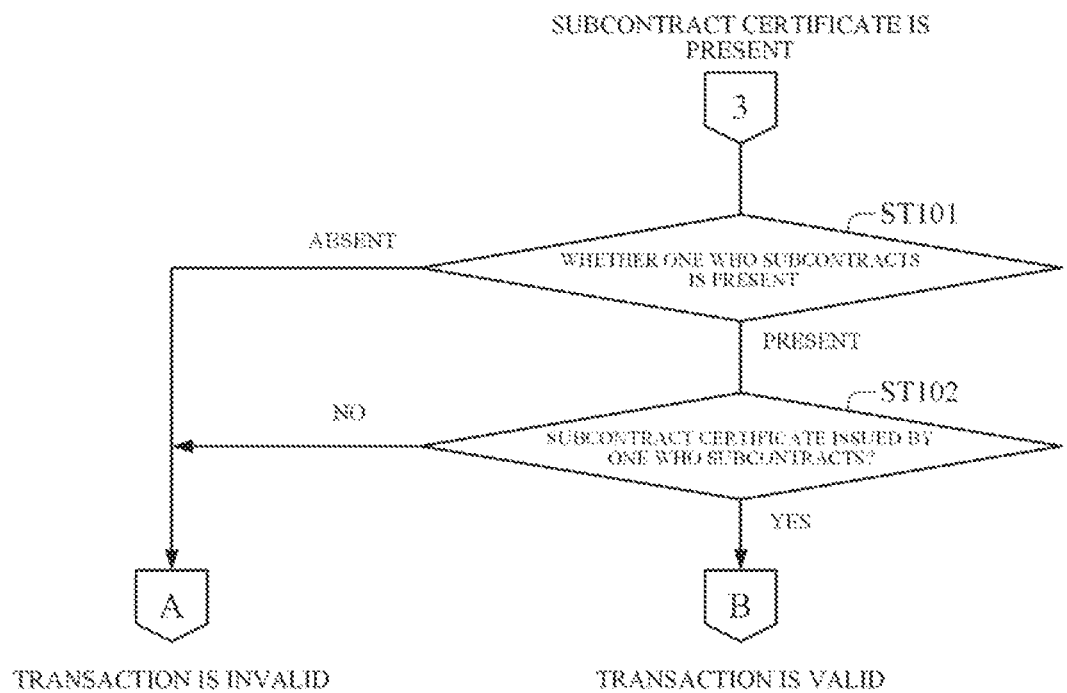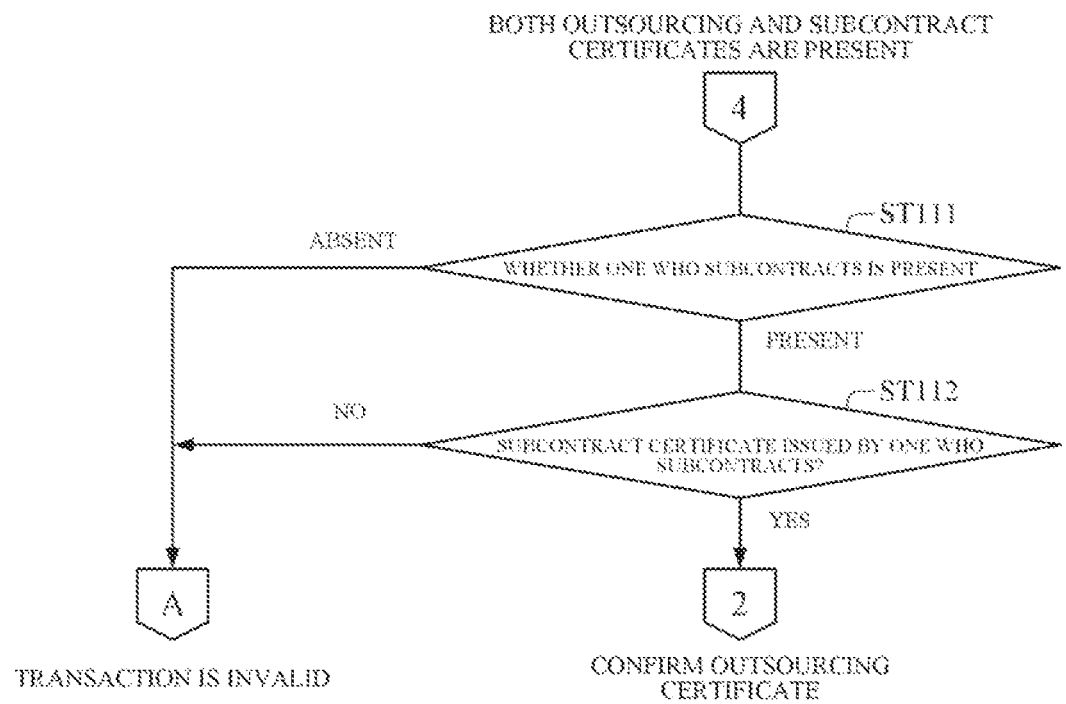

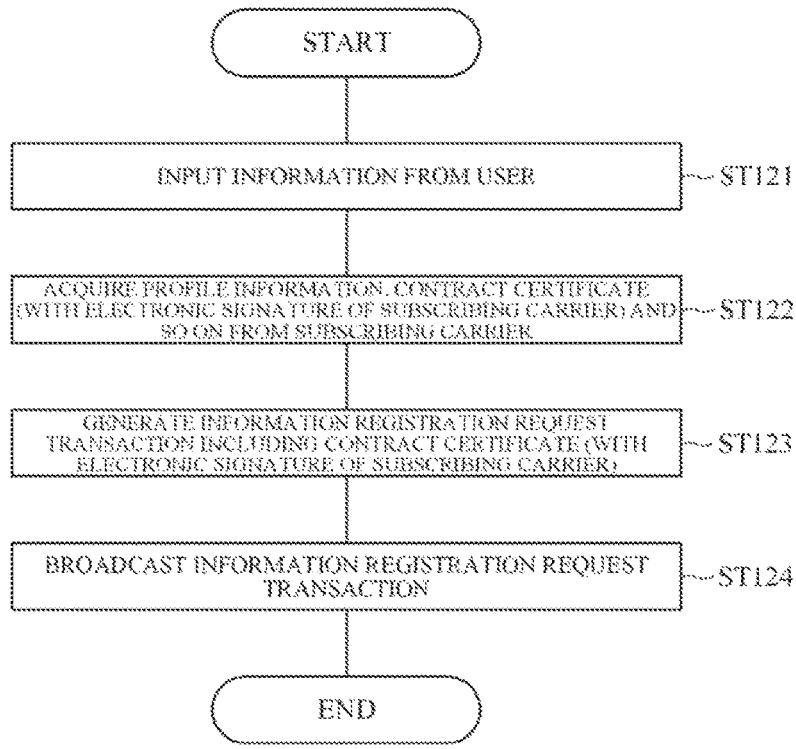
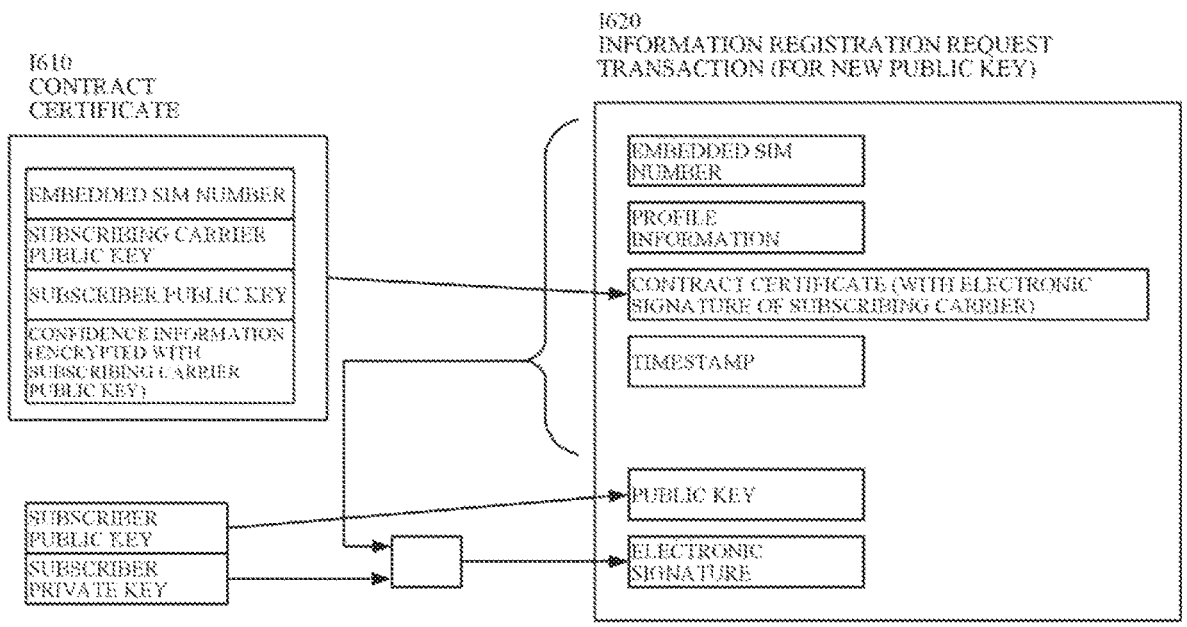

Fig.38
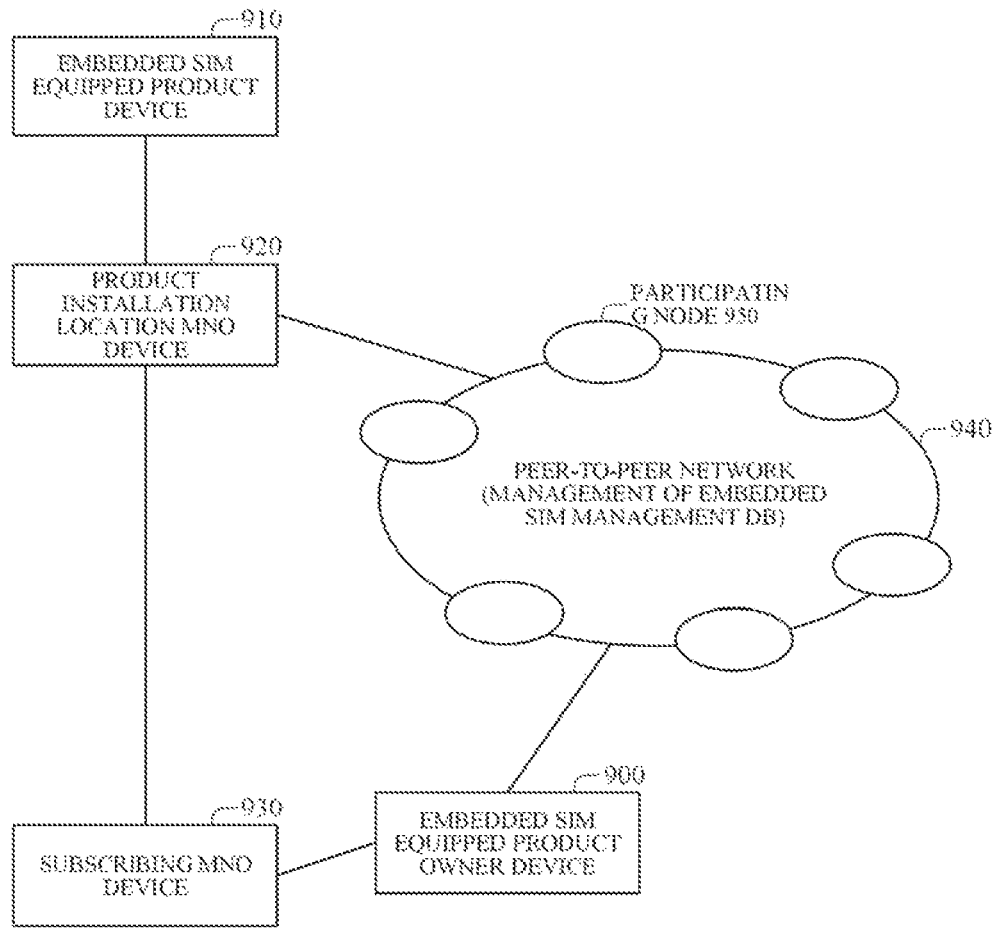
Fig.39
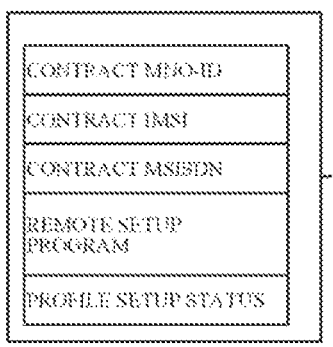
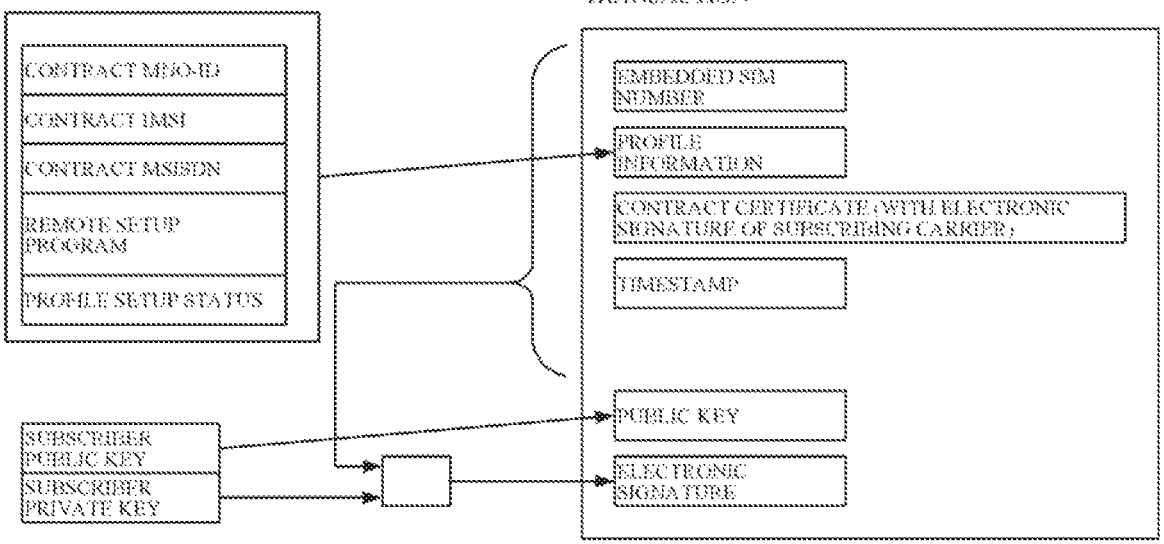

2000 EMBEDDED SIM MANAGEMENT SYSTEM

EMBEDDED SIM MANAGEMENT SYSTEM, NODE DEVICE, EMBEDDED SIM MANAGEMENT METHOD, PROGRAM, AND INFORMATION REGISTRANT DEVICE

This application is a National Stage Entry of PCT/JP2017/033950 filed on Sep. 20, 2017, which claims priority from Japanese Patent Application 2016-196566 filed on Oct. 4, 2016, the contents of all of which are incorporated herein by reference, in their entirety.

TECHNICAL FIELD

The present invention relates to an embedded SIM (Subscriber Identity Module) management system, a node device, an embedded SIM management method, a program, and an information registrant device.

BACKGROUND ART

An embedded SIM (also referred to as a software-type SIM, a soft SIM, a virtual SIM card, an E-SIM, or the like) is a subscriber identification card module for mobile communication embedded in, for example, M2M (Machine to Machine) or IoT (Internet of Things) equipment. In general, a profile for communication with a specific mobile carrier is written in an embedded SIM at the time of shipment of the product from the factory, and the embedded SIM is handed over to its actual user in that state. When the user switches to a contract with another mobile carrier, information in the embedded SIM is updated remotely by using the OTA (Over-The-Air) technology. As such techniques for managing embedded SIM information, techniques described in Patent Documents 1 to 3 are available.

According to the technique described in Patent Document 1 (hereinafter referred to as a first related technique), information is stored and managed by an eUICC appliance connected to an MNO (Mobile Network Operator) infrastructure through a network interface. To be specific, the eUICC appliance stores and manages embedded SIM information in internal storage or external storage. Moreover, the eUICC appliance has a SIM database. The SIM database stores information on a device permitted to use the embedded SIM, the current state of the embedded SIM, and a current status (available, unavailable, and so on). Besides, the first related technique describes a technique for securely transferring embedded SIM information between a plurality of telecommunications service providers by a technology such as encryption.

Further, according to the technique described in Patent Document 2 (hereinafter referred to as a second related technique), an operational profile (OP) that is set in an embedded SIM by a subscription manager (SM) managed by an individual company or organization is stored and managed in an auxiliary storage device. Moreover, the second related technique describes a method for more efficiently perform movement from a mobile communication network corresponding to an OP managed by one SM to a mobile communication network corresponding to an OP managed by another SM (SM swap).

Further, the technique described in Patent Document 3 (hereinafter referred to as a third related technique) is a technique which enables safe transfer of a subscriber profile and so on necessary for activation of an embedded SIM between telecommunications service providers without using a SM.

Patent Document 1: Japanese Unexamined Patent Application Publication No. JP-A 2012-231466
Patent Document 2: Japanese Patent No. 5724039
Patent Document 3: Japanese Unexamined Patent Application Publication No. JP-A 2015-043510
Patent Document 4: International Publication WO2014/097517
Non-Patent Document 1: Satoshi Nakamoto, "Bitcoin A Peer-to-Peer Electronic Cash System" [online], searched on Jun. 17, 2016 on the Internet <URL: https://bitcoin.org/bitcoin.pdf>
Non-Patent Document 2: Chin Cheng Liang, "A Next-Generation Smart Contract and Decentralized Application Platform" [online], searched on Jun. 17, 2016 on the Internet <URL: https://github.com/ethereum/wiki/wiki/White-Paper>
Non-Patent Document 3: "Embedded SIM Remote Provisioning Architecture" [online], searched on Jun. 17, 2016 on the Internet <URL: http://www.gsma.com/connectedliving/wp-content/uploads/2014/01/1.-GSMA-Embedded-SIM-Remote-Provisioning-Architecture-Version-1.1.pdf>

According to the first to third related techniques, however, embedded SIM information is managed in a device such as a subscription manager operated by a specific company or organization. For this reason, a device such as a subscription manager becomes a bottleneck, and there arises a problem that capabilities such as reliability, availability and maintainability are deteriorated.

SUMMARY

An object of the present invention is to provide an embedded SIM management system which solves the abovementioned problem.

An embedded SIM management system as an aspect of the present invention includes a peer-to-peer network configured by a plurality of node devices capable of peer-to-peer communication with each other, and an information registrant device. The information registrant device includes: a first network interface; and an information registration request transaction generating part configured to generate an information registration request transaction and broadcast the transaction to the peer-to-peer network through the first network interface. The information registration request transaction generating part is configured to generate the information registration request transaction based on embedded SIM information including SIM identification information and a profile, an electronic signature put on the embedded SIM information by using a private key of the information registrant, and a public key paired with the private key. Each of the node devices includes: a second network interface; and a blockchain management part configured to accumulate the information registration request transaction received through the second network interface into a blockchain based on a consensus building algorithm executed in cooperation with the other node device.

Further, a node device as another aspect of the present invention is a node device configuring a peer-to-peer network. The node device includes: a network interface; and a blockchain management part configured to receive, through the network interface, an information registration request transaction that includes embedded SIM information including SIM identification information and a profile, an electronic signature put on the embedded SIM information by using a private key of an information registrant, and a public key paired with the private key, and accumulate the received information registration request transaction into a blockchain based on a consensus building algorithm executed in cooperation with another node device configuring the peer-to-peer network.

Further, an embedded SIM management method as another aspect of the present invention is an embedded SIM management method executed by a node device configuring a peer-to-peer network. The embedded SIM management method includes: receiving, through a network interface, an information registration request transaction that includes embedded SIM information including SIM identification information and a profile, an electronic signature put on the embedded SIM information by using a private key of an information registrant, and a public key paired with the private key, and accumulating the received information registration request transaction into a blockchain based on a consensus building algorithm executed in cooperation with another node device configuring the peer-to-peer network.

Further, a program as another aspect of the present invention is a computer program including instructions for causing a computer configuring a peer-to-peer network to functions as: a network interface; and a blockchain management part configured to receive, through the network interface, an information registration request transaction that includes embedded SIM information including SIM identification information and a profile, an electronic signature put on the embedded SIM information by using a private key of an information registrant, and a public key paired with the private key, and accumulate the received information registration request transaction into a blockchain based on a consensus building algorithm executed in cooperation with another node device configuring the peer-to-peer network.

Further, an information registrant device as another aspect of the present invention is an information registrant device configured to broadcast an information registration request transaction to a peer-to-peer network configured by a plurality of node devices capable of peer-to-peer communication with each other. The information registrant device includes: a network interface; and an information registration request transaction generating part configured to generate the information registration request transaction and broadcast the transaction to the peer-to-peer network through the network interface. The information registration request transaction generating part is configured to generate the information registration request transaction based on embedded SIM information including SIM identification information and a profile, an electronic signature put on the embedded SIM information by using a private key of an information registrant, and a public key paired with the private key.

With the configurations described above, the present invention can provide an embedded SIM management system which is excellent in reliability, availability and maintainability.

BRIEF DESCRIPTION OF DRAWINGS

FIG. 5 is a flow diagram showing an example of a process in which the information registrant device transmits an information registration request transaction signal to the peer-to-peer network;

FIG. 6 is an information component diagram showing the relation of contents between information registrant device holding information and an information registration request transaction;

FIG. 29 is a flowchart showing an example of a process performed by a participating node which participates in the peer-to-peer network;

FIG. 30 is a flowchart showing an example of a process performed by a participating node which participates in the peer-to-peer network;

FIG. 34 is a flow diagram showing an example of a process in which the subscriber device transmits an information registration request transaction signal to the peer-to-peer network;

FIG. 35 is an explanatory diagram of step ST123 for generating an information registration request transaction, shown in FIG. 34;

FIG. 38 is a configuration diagram of an eighth example embodiment of the present invention;

FIG. 39 is a diagram showing an example of an information registration request transaction generated in the eighth example embodiment;

EXAMPLE EMBODIMENTS

Next, example embodiments of the present invention will be described in detail with reference to the drawings.

First Example Embodiment

Figure 45:
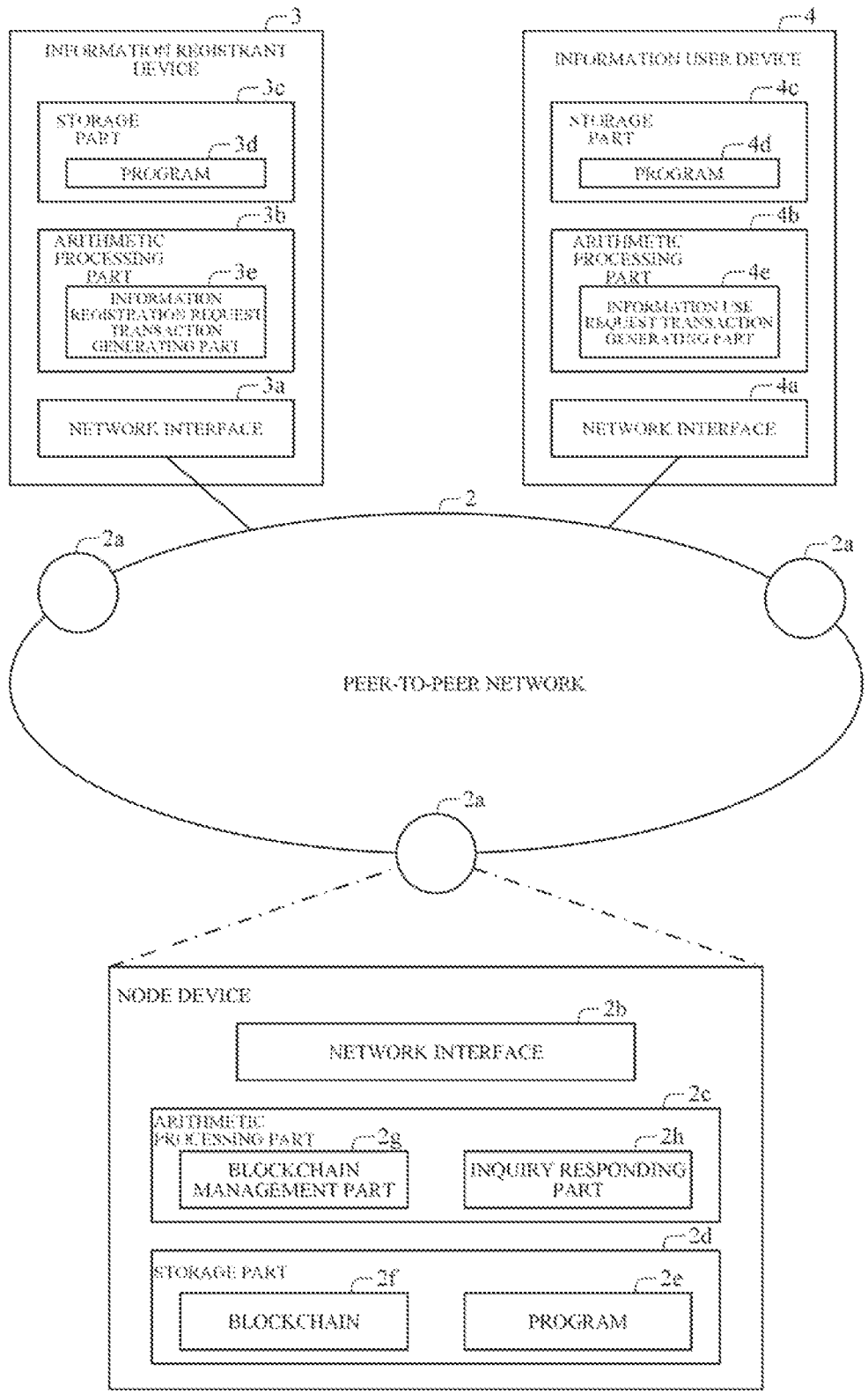
FIG. 45 is a diagram showing an example of the configuration of an embedded SIM management system in a first example embodiment of the present invention.

With reference to FIG. 45, an embedded SIM management system 1 according to a first example embodiment of the present invention includes a peer-to-peer network 2, an information registrant device 3, and an information user device 4.

The information registrant device 3 is a device used by a person who registers embedded SIM information. One or more information registrant devices 3 are included. Herein, embedded SIM information includes, for example, SIM identification information for uniquely identifying an embedded SIM and a profile including various information necessary for communication. The various information necessary for communication is, for example, an IMSI (International Mobile Subscriber Identity), an MSISDN (Mobile Subscriber ISDN number), or the like. The information registrant device 3 includes a network interface 3*a*, an arithmetic processing part 3*b*, and a storage part 3*c*.

The network interface 3*a* is formed by a dedicated data communication circuit. The network interface 3*a* performs data communication with the peer-to-peer network 2 connected via a wired or wireless communication line, or the like.

The storage part 3*c* is formed by a storage device such as a hard disk and a memory. The storage part 3*c* holds processing information necessary for various processes performed by the arithmetic processing part 3*b* and a program 3*d*. The program 3*d* is a program loaded and executed by the arithmetic processing part 3*b* to realize various processing parts. The program 3*d* is previously loaded from an external device (not shown) or a program storage medium (not shown) via a data input/output function such as the network interface 3*a* and stored into the storage part 3*c*.

The arithmetic processing part 3*b* has a microprocessor such as a CPU and a peripheral circuit thereof. The arithmetic processing part 3*b* loads the program 3*d* from the storage part 3*c* and executes the program, coordinates the above-described hardware and the program 3*d*, and thereby realizes various processing parts. A major processing part realized by the arithmetic processing part 3*b* is an information registration request transaction generating part 3*e*.

The information registration request transaction generating part 3*e* generates an information registration request transaction and broadcasts the transaction to the peer-to-peer network 2 through the network interface 3*a*. For example, the information registration request transaction generating part 3e generates the information registration request transaction, based on embedded SIM information including SIM identification information and a profile, an electronic signature using a private key of an information registrant put on the embedded SIM information, and a public key paired with the private key.

The information user device 4 is a device used by a person who uses embedded SIM information. One or more information user devices 4 are included. The information user device 4 includes a network interface 4a, an arithmetic processing part 4b, and a storage part 4c.

The network interface 4a is formed by a dedicated data communication circuit. The network interface 4a performs data communication with the peer-to-peer network 2 connected via a wired or wireless communication line, or the like.

The storage part 4c is formed by a storage device such as a hard disk and a memory. The storage part 4c holds processing information necessary for various processes performed by the arithmetic processing part 4b and a program 4d. The program 4d is a program loaded and executed by the arithmetic processing part 4b to realize various processing parts. The program 4d is previously loaded from an external device (not shown) or a program storage medium (not shown) via a data input/output function such as the network interface 4a and stored into the storage part 4c.

The arithmetic processing part 4b has a microprocessor such as a CPU and a peripheral circuit thereof. The arithmetic processing part 4b loads the program 4d from the storage part 4c and executes it, coordinates the above-described hardware and the program 4d, and thereby realizes various processing parts. A major processing part realized by the arithmetic processing part 4b is an information use request transaction generating part 4e.

The information use request transaction generating part 4e generates an information use request transaction for inquiring about embedded SIM information including desired SIM identification information and broadcasts the transaction to the peer-to-peer network 2 through the network interface 4a. For example, the information use request transaction generating part 4e generates an information use request transaction including SIM identification information. Moreover, the information use request transaction generating part 4e receives a response to the inquiry by the information use request transaction, through the network interface 4a.

The peer-to-peer network 2 is formed by a plurality of node devices 2a capable of peer-to-peer communication with each other. Each of the node devices 2a includes a network interface 2b, an arithmetic processing part 2c, and a storage part 2d.

The network interface 2b is formed by a dedicated data communication circuit. The network interface 2b performs data communication with various devices such as another node device 2a, the information registrant device 3 and the information user device 4 that are connected via a wired or wireless communication line.

The storage part 2d is formed by a storage device such as a hard disk and a memory. The storage part 2d holds processing information necessary for various processes performed by the arithmetic processing part 2c and a program 2e. The program 2e is a program loaded and executed by the arithmetic processing part 2c to realize various processing parts. The program 2e is previously loaded from an external device (not shown) or a program storage medium (not shown) via a data input/output function such as the network interface 2b and stored into the storage part 2d. Major processing information stored in the storage part 2d is a blockchain 2f.

The blockchain 2f is a data structure in which blocks each holding transactions of a predetermined period are connected in chain. For example, a blockchain of Ethereum may be used as the blockchain 2f, which is not limited thereto. The blockchain 2f is also referred to as an embedded SIM information DB.

The arithmetic processing part 2c has a microprocessor such as a CPU and a peripheral circuit thereof. The arithmetic processing part 2c loads the program 2e from the storage part 2d and executes it, coordinates the above-described hardware and the program 2e, and thereby realizes various processing parts. A major processing part realized by the arithmetic processing part 2c is a blockchain management part 2g and an inquiry responding part 2h.

The blockchain management part 2g accumulates information registration request transactions received via the network interface 2b into the blockchain 2f, based on a consensus building algorithm executed in cooperation with the other node 2a. Herein, the consensus building algorithm refers to a general algorithm for mutually approving a distributed ledger by using Proof of Work (PoW) or the like. PoW is equivalent to an operation called "mining" in Bitcoin and Ethereum.

The inquiry responding part 2h, in accordance with an information use request transaction having been received, generates a response corresponding to the received information use request transaction. For example, the inquiry responding part 2h receives an information use request transaction (an information inquiry request) via the network interface 2b. Then, the inquiry responding part 2h acquires embedded SIM information including SIM identification information included by the information use request transaction, from the information accumulated in the blockchain 2f. Then, the inquiry responding part 2h generates a response to be transmitted through the network interface 2b.

Figure 46:
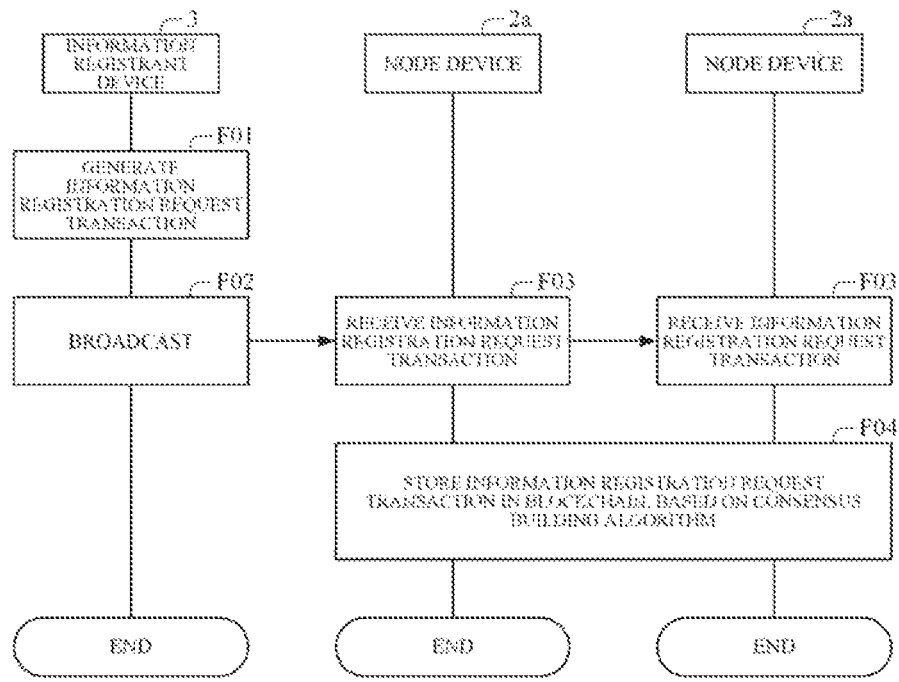
FIG. 46 is a flowchart showing an example of a procedure to register embedded SIM information.

FIG. 46 is a flowchart showing an example of a procedure to register embedded SIM information. With reference to FIG. 46, the information registrant device 3 causes the information registration request transaction generating part 3e to generate an information registration request transaction (F01). An information registration request transaction includes embedded SIM information including SIM identification information and a profile, an electronic signature using a private key of the information registrant put on the embedded SIM information, and a public key paired with the private key. Next, the information registrant device 3 causes the network interface 3a to broadcast the information registration request transaction to the peer-to-peer network 2 (F02).

Each of the node devices 2a causes the network interface 2b to receive the information registration request transaction broadcast to the peer-to-peer network 2 (F03). Next, each of the node devices 2a causes the blockchain management part 2g to store the received information registration request transaction in the blockchain 2f, based on the consensus building algorithm executed in cooperation with the other node device 2a (F04).

Figure 47:
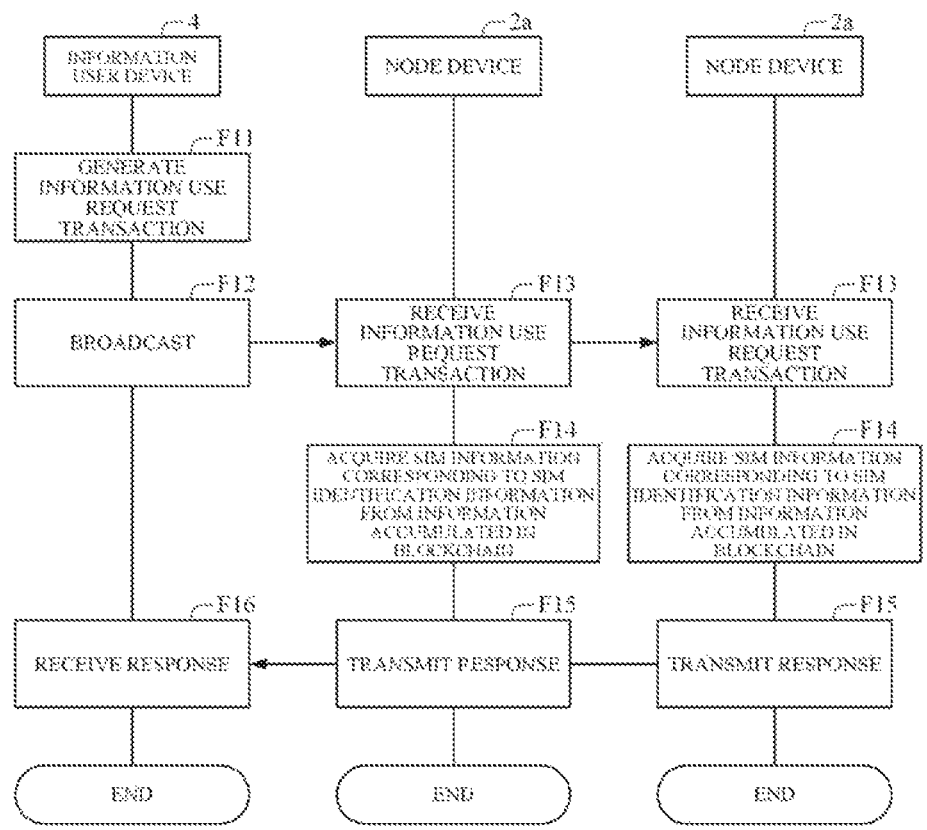
FIG. 47 is a flowchart showing an example of a procedure to use embedded SIM information.

FIG. 47 is a flowchart showing an example of a procedure to use embedded SIM information. With reference to FIG. 47, the information user device 4 causes the information use request transaction generating part 4e to generate an information use request transaction for inquiring about embedded SIM information including desired SIM identification information (F11). Next, the information user device 4 causes the network interface 4a to broadcast the information use request transaction to the peer-to-peer network 2 (F12).

Each of the node devices 2a causes the network interface 2b to receive the information use request transaction broadcast to the peer-to-peer network 2 (F13). Next, each of the node devices 2a causes the inquiry responding part 2h to acquire embedded SIM information including SIM identification information included by the information use request transaction, from the information accumulated in the blockchain 2f (F14). Then, each of the node devices 2a causes the network interface 2b to transmit a response including the acquired information to the information user device 4 (F15).

The information user device 4 causes the network interface 4a to receive the response from the node device 2a (F16). In the case of receiving responses from a plurality of node devices 2a to an information use request transaction having been transmitted, the information user device 4 adopts the response from any of the node devices 2a. For example, the information user device 4 may adopt the node device 2a having presented embedded SIM information having been selected by a majority vote or the like at the earliest time, as a response node. Alternatively, the information user device 4 may define a unique rule such as adopting information at the time when the minimum number of nodes required to return the same embedded SIM information has been reached. The information user device 4 may define a rule to pay some fee for an adopted node or a node having provided adopted information.

Thus, according to this example embodiment, embedded SIM information is managed by the blockchain technology. For this reason, according to this example embodiment, it is possible to provide an embedded SIM information management system which is excellent in reliability, availability and maintainability.

Second Example Embodiment

Next, a second example embodiment of the present invention will be described.

<Task to be Solved in this Example Embodiment>

An embedded SIM is a subscriber identification card module for mobile communication embedded in M2M/IoT equipment or the like. In the embedded SIM, a profile for communication with a specific mobile carrier is written when the product is shipped from the factory. In a case where the product is handed to an actual user after shipped from the factory and the user wants to switch to a contract with another mobile carrier, the setting of the embedded SIM is remotely changed by actual mobile communication (OTA: Over The Air) in the form of roaming from the old carrier to the new carrier.

A network-side mechanism which supports setting information management and setting change in an embedded SIM as mentioned above is required. According to Non-Patent Document 3, such a mechanism is realized by cooperation of a subscription information management device (SM: Subscription Manager), a mobile communication carrier device relating to an old contract and a new contract, and so on.

This example embodiment shows, as a method for managing an embedded SIM managing subscription information management device database (hereinafter, referred to as the DB for embedded SIM management), a method for managing by a common distributed DB.

According to Non-Patent Document 3, information written in an embedded SIM is an eUICC-ID (Embedded Universal Integrated Circuit Card Identity) representing the card number of the embedded SIM, an ICCID (Integrated Circuit Card ID) representing any of a plurality of profiles in the embedded SIM, an IMSI (International Mobile Subscriber Identity) representing a subscriber SIM per mobile network operator, an MSISDN (Mobile Subscriber International ISDN Number) representing a subscriber embedded SIM number per mobile network operator, or the like. An IMSI and an MSISDN can hold different contents for each profile represented by an ICCID. The profiles are an embedded SIM setup profile definitely written at the time of shipment from the factory (Provisioning Profile) and a profile which is subjected to setting change after shipment from the factory and used in actual communication service operation (Operational Profile).

As a network-side mechanism which supports setting information management and setting change in an embedded SIM as mentioned above, a subscription information management device (SM: Subscription Manager) is defined.

In actual operation, a subscription information management device is managed by any of the manufacturer of the embedded SIM, the manufacturer of a product equipped with the embedded SIM, a mobile network operator (MNO) written in the embedded SIM setup profile at the time of shipment from the factory and a third party, or managed by them in cooperation. Additionally, according to Patent Document 4, an organization with the confidence of a plurality of MNOs take on the function of the subscription information management device.

Whatever the management entity is, a function corresponding to the subscription information management device includes not only management of information of the DB for embedded SIM management but also remote change of the setting of the embedded SIM by actual mobile communication (OTA: Over The Air). Therefore, in actual operation, the subscription information management device is managed by a mobile network operator (MNO) with the confidence of a single organization or a plurality of organizations.

Every time a product equipped with an embedded SIM is relocated (change of its owner, change of its installation location including overseas, or the like) and a mobile network operator which the user contracts is changed, there is a need to update the information in the subscription information management device and rewrite the profile in the actual embedded SIM by remote setting by using the OTA technology.

Further, in actual operation, there is also a possibility that a subscription information management device of a product equipped with an embedded SIM is also relocated in the course of the relocation.

Thus, every time an embedded SIM equipped product is relocated and a contract operator is changed, a subscription information management device needs to keep managing information of the embedded SIM (Task 1), and also needs to respond to an inquiry about embedded SIM information from the other carrier (Task 2). An embedded SIM subscription information administration operator needs to pay a great deal of cost for that and are forced to charge for responding to an inquiry from another carrier, so that processing becomes more complicated, for example, the fee is settled between operators every time an inquiry is made (Task 3). Moreover, because an operator administrating a DB for embedded SIM management varies depending on the kind of an embedded SIM equipped product, or because there is a possibility that an operator administrating a DB for embedded SIM management (a subscription information management device) relocates in the course of relocation of an embedded SIM equipped product as described above, other operators need to divide contacts for inquiry about contract operator information of an embedded SIM equipped product (that is, an operator of a DB for embedded SIM management or a subscription information management device) depending on the kind of a product or depending on a pinpoint manufacture number, or the like (Task 4).

Even if a single DB for embedded SIM management is operated with funds contributed by all the operators (or a single MNO or a plurality of MNOs), a new problem that the single DB for embedded SIM management becomes a bottleneck is also concerned, so that enhancement of the processing capability, reliability, availability and so on of the DB is required (Task 5), which leads to soaring contributions to the fund.

<Configuration of Example Embodiment>

Figure 1:
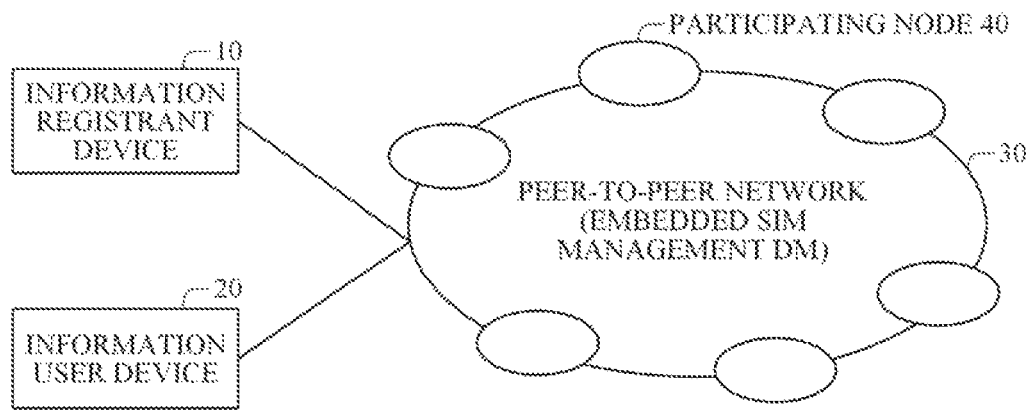
FIG. 1 is a diagram showing an example of the configuration of an embedded SIM management system according to a second example embodiment of the present invention.

With reference to FIG. 1, an embedded SIM management system according to this example embodiment includes an information registrant device 10 (can be plural) that registers information to a DB for embedded SIM management, an information user device 20 (can be plural) that uses the information in the DB for embedded SIM management, and a peer-to-peer network 30.

The information registrant device 10 and the information user device 20 include an embedded SIM manufacturer device, an embedded SIM equipped product manufacturer device, a mobile network operator (MNO) device, an embedded SIM equipped product owner device, an embedded SIM equipped product device, and the like. The details of the embedded SIM manufacturer device, the embedded SIM equipped product manufacturer device, the mobile network operator (MNO) device, the embedded SIM equipped product owner device and the embedded SIM equipped product device will be described later.

The peer-to-peer network 30 manages a blockchain (a chain of cryptographic hash blocks) handled in, for example, Bitcoin (see Non-Patent Document 1, for example) that is one of virtual currencies, and Ethereum (see Non-Patent Document 2, for example) that is one of smart contract realization platforms using the distributed ledger technology.

The DB for embedded SIM management in this example embodiment is held and managed by a plurality of participating nodes 40 (node devices) that participate in the peer-to-peer network 30. The plurality of participating nodes 40 that participate in the peer-to-peer network 30 may belong to a communication carrier or a collective of carriers, or may be anonymous individuals that do not belong to any organization or anonymous organizations.

The plurality of participating nodes 40 that participate in the peer-to-peer network 30 not only hold information and respond to an inquiry but also have a program which can be automatically executed in the information held in the DB. By execution of the above program, the participating node 40 has a role in, for example, exchanging confidence information when the owner of an embedded SIM equipped product changes a contract MNO, and prompting a mobile network operator (MNO) device or the like to perform setup of embedded SIM information by using the OTA technology.

<Operation of this Example Embodiment>

The information registrant devices 10 in this example embodiment request registration of information by broadcasting transactions for requesting information registration onto the DB for embedded SIM management, to the entire peer-to-peer network 30.

Each of the participating nodes 40 that participate in the peer-to-peer network 30 verifies an information registration request transaction having been broadcast and, if determining the transaction is valid, generates a new block holding the transaction together with other valid information registration request transactions, and adds the new block to the end of the blockchain. A reward to the participating node 40 is paid at the time of verification of an information registration request transaction and generation of a new block.

According to Non-Patent Document 1 and Non-Patent Document 2, a blockchain is made by connecting blocks having been subjected to hash calculation in chain, and is recorded in a form that a consensus on the validity of the contents is built among all the nodes participating in the peer-to-peer network. For this reason, it is generally said that falsification of the content recorded as a blockchain is virtually impossible. Moreover, even if a certain node intends to record wrong information on purpose or intends not to record a requested content, the participating nodes intend to record a correct content as a whole while building a consensus. Therefore, it is generally said that the content recorded as a blockchain is correct.

The information user devices 20 each inquire the peer-to-peer network 30 about useful information held in the DB for embedded SIM management. Alternatively, any of the participating nodes 40 that participate in the peer-to-peer network 30 autonomously transfer information to a proper information user device 20 in accordance with a program code that can be executed, in the information held in the DB for embedded SIM management. Autonomously transferred information includes confidence information at the time when the owner of the embedded SIM equipped product changes the contract MNO, information that prompts the mobile network operator (MNO) device or the like to perform setup of embedded SIM information by using the OTA technology, and so on.

<Effect of this Example Embodiment>

According to this example embodiment, the DB for embedded SIM management is managed by the participating nodes 40 that participate in the peer-to-peer network 30 as a whole, so that it is possible to solve Tasks 1, 2 and 4 mentioned above.

Task 3 mentioned above may be solved not by settling an inquiry fee between telecommunications service providers but by paying an inquiry fee as a fee in cryptocurrency or the like to a node executing an inquiry request transaction or an autonomous information transfer transaction among the participating nodes 40 that participate in the peer-to-peer network 30. Alternatively, Task 3 may be solved by making a rule of the peer-to-peer network, such as collecting the fee only at the time of information registration and freeing the fee at the time of information inquiry and autonomous information transfer.

The bottleneck of a single DB in the common DB method of Task 5 mentioned above can be solved, because it is covered by all the participating nodes 40 that participate in the peer-to-peer network 30 according to this example embodiment.

Third Example Embodiment

Figure 2:
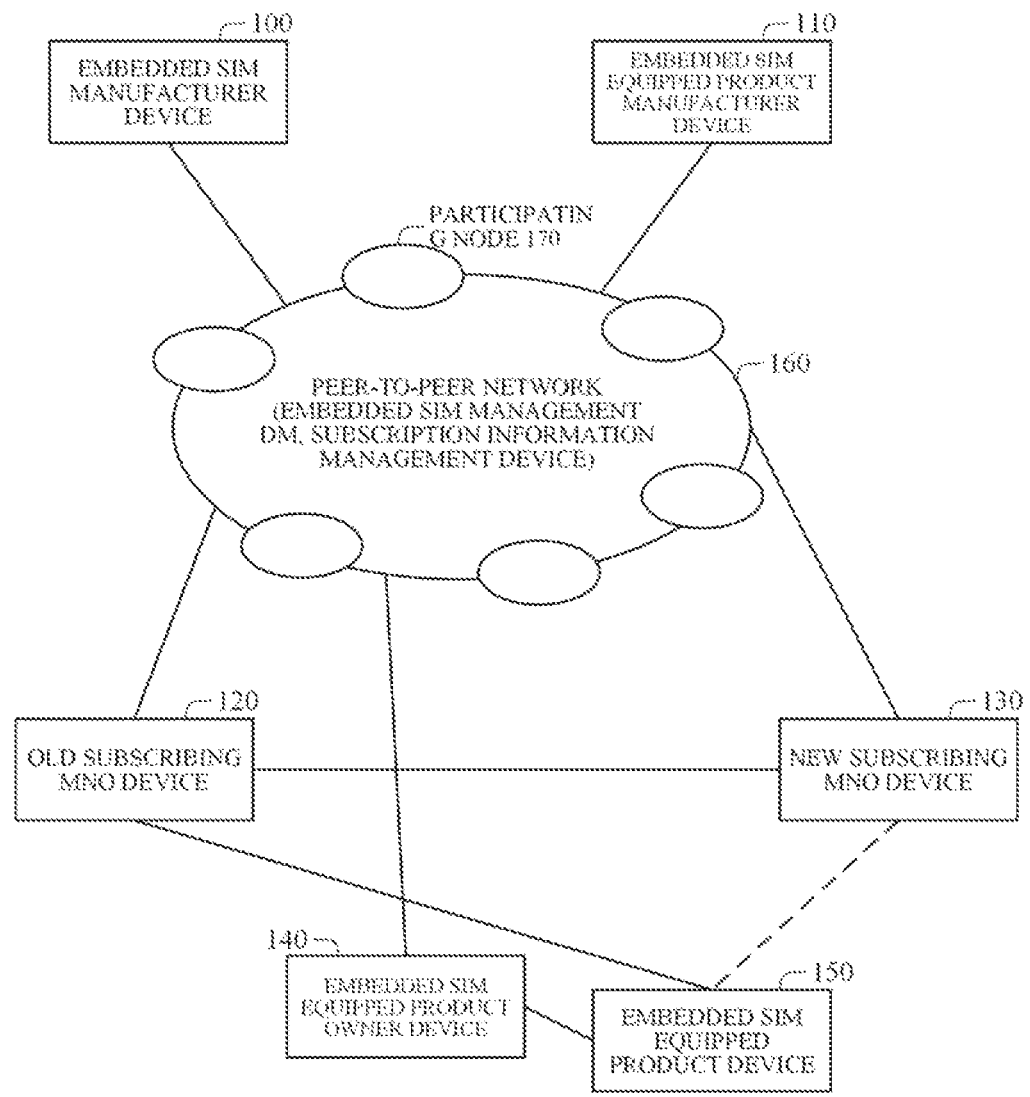
FIG. 2 is a diagram showing an example of the configuration of an embedded SIM management system according to a third example embodiment of the present invention.

With reference to FIG. 2, an embedded SIM management system according to this example embodiment includes an embedded SIM manufacturer device 100, an embedded SIM equipped product manufacturer device 110, an old contract MNO device 120, a new contract MNO device 130, an embedded SIM equipped product owner device 140, an embedded SIM equipped product device 150, a peer-to-peer network 160 that manages a blockchain for embedded SIM management DB (a chain of cryptographic hash blocks) handled in this example embodiment, and a plurality of arbitrary participating nodes 170 that participate in the peer-to-peer network 160.

Herein, the embedded SIM equipped product device 150 is M2M equipment, IoT equipment or the like equipped with an embedded SIM. The embedded SIM equipped product owner device 140 is a device such as a personal computer and a smartphone owned by a person who owns the embedded SIM equipped product device 150. The embedded SIM equipped product owner device 140 may be the embedded SIM equipped product device 150 itself (that is, the embedded SIM equipped product owner device 140 and the embedded SIM equipped product device 150 may represent the same).

The embedded SIM manufacturer device 100 is a device corresponding to a manufacturer such as a manufacturer that manufactures an embedded SIM mounted on the embedded SIM equipped product device 150. The embedded SIM equipped product manufacturer device 110 is a device corresponding to a manufacturer such as a manufacturer that manufactures the embedded SIM equipped product device 150. The old contract MNO device 120 and the new contract MNO device 130 are a device corresponding to the MNO of an old contract and a device corresponding to the MNO of a new contract in view of the embedded SIM equipped product device 150.

Meanwhile, the embedded SIM manufacturer device 100, the embedded SIM equipped product manufacturer device 110, the old contract MNO device 120, the new contract MNO device 130, the embedded SIM equipped product owner device 140, and the embedded SIM equipped product device 150 can be the information registrant device 10 and the information user device 20 shown in FIG. 1. For this reason, the embedded SIM manufacturer device 100, the embedded SIM equipped product manufacturer device 110, the old contract MNO device 120, the new contract MNO device 130, the embedded SIM equipped product owner device 140, and the embedded SIM equipped product device 150 will also be referred to as the information registrant device 10 and the information user device 20.

In the case of functioning as the information registrant device 10 shown in FIG. 1, the embedded SIM manufacturer device 100, the embedded SIM equipped product manufacturer device 110, the old contract MNO device 120, the new contract MNO device 130 and the embedded SIM equipped product owner device 140 each generate a transaction for requesting information registration onto the DB for embedded SIM management described in the second example embodiment, from information on the corresponding embedded SIM that can be known to the device itself, a timestamp, an electronic signature obtained by encrypting the above information with a private key, and a public key. Then, the embedded SIM manufacturer device 100, the embedded SIM equipped product manufacturer device 110, the old contract MNO device 120, the new contract MNO device 130, and the embedded SIM equipped product owner device 140 each broadcast the generated information registration request transaction to the peer-to-peer network 160.

The information on the corresponding embedded SIM that can be known to the device itself can include an embedded SIM number (SIM identification information) (eUICC-ID), an embedded SIM equipped product manufacture number (product serial number), a setup profile MNO access ID (old MNO-ID), a setup profile IMSI (old IMSI), a setup profile MSISDN (old MSISDN), an operation profile MNO access ID (new MNO-ID), an operation profile IMSI (new IMSI), an operation profile MSISDN (new MSISDN), or the like.

The validity of the information registration request transaction broadcast in this example embodiment is verified by all the participating nodes 170 that participate in the peer-to-peer network 160, and it is approved whether or not to record the transaction into the blockchain by a consensus building process by all the participating nodes 170.

Figure 3:
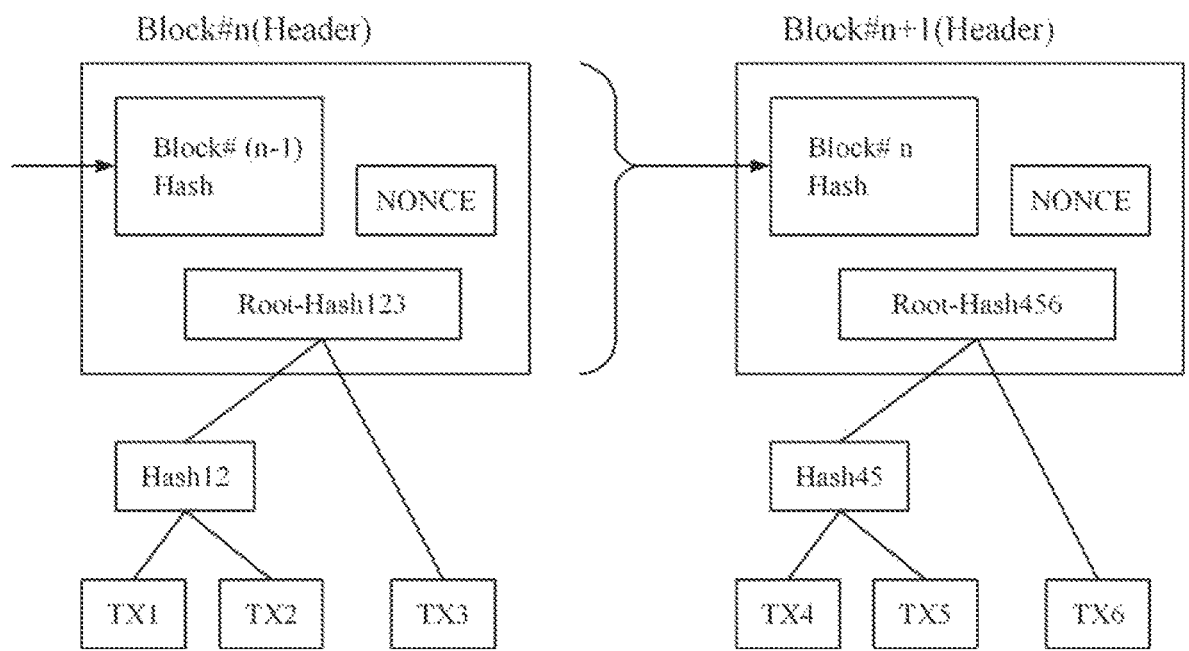
FIG. 3 is an information component diagram showing the relation of contents between a plurality of transactions and a plurality of blocks in a blockchain.

FIG. 3 is an information component diagram showing the relation of contents between a plurality of transactions and a plurality of blocks in a blockchain. Each TX (TX1, TX2, . . . ) represents an information registration request transaction. Each Hash (Hash 12, Hash 45) is a hash value returned from a cryptographic hash function of two transactions. Each of the participating nodes 170 performs hash calculation of all the transactions of one block generation period and, until one Root-Hash value (also referred to as a Merkle-Root value) is obtained in the end, repeats verification of the validity of transactions and calculation of hash values. At a block generation time, each of the participating nodes 170 calculates a hash value of a new block by using a hash value of a block having been broadcast during a previous block generation time (or hash values of all the previous blocks including the last block recalculated by itself) and a Root-Hash value generated from information registration request transactions newly generated during a current block generation period. At that time, a hash value of a new block is obtained while adjusting a NONCE value or the like so that the hash value of the new block becomes a value based on a rule in a consensus building process defined in the peer-to-peer network, and broadcasts the result to the peer-to-peer network 160.

The broadcasting may be performed by the information registrant device 10, or may be performed via a substitutional device. However, an electronic signature in the case of broadcasting via a substitutional device shall be obtained by encrypting with the private key of the information registrant device 10.

Further, the information registrant device 10 can inquiry a related device about information necessary for registration onto the DB before generating a transaction for information registration and broadcasting the transaction. That is, the information registrant device can generate a transaction for information registration and broadcast the transaction after inquiring a related device about information necessary for registration onto the DB.

Figure 4:
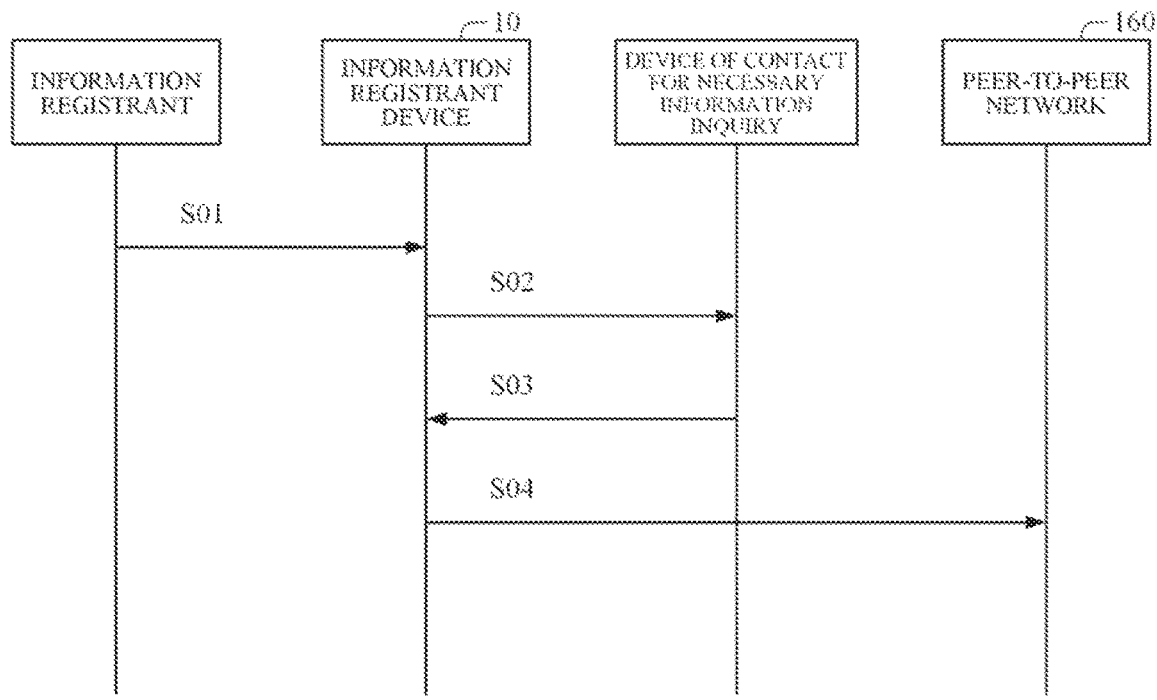
FIG. 4 is a signal sequence diagram showing an example of a process to broadcast an information registration request transaction from an information registrant device to a peer-to-peer network.

FIG. 4 is a signal sequence diagram showing how an information registration request transaction is broadcast from the information registrant device 10 to the peer-to-peer network 160 managing the DB for embedded SIM management. As shown in FIG. 4, an information registrant inputs a private key and public key pair and information on a pertinent embedded SIM that can be known to the registrant into the information registrant device 10. Moreover, the information registrant device 10 obtains other information necessary for information registration. After that, the information registrant device 10 broadcasts an information registration request transaction including the above-described information provided with a timestamp and an electronic signature using a private key, to the peer-to-peer network 160.

To be specific, in FIG. 4, Signal S01 represents an information input signal input from an information registrant into the information registrant device 10. Signal S01 includes a private key, a public key, information that can be known to the registrant, and a contact for inquiry about other necessary information (URL, and so on). Signal S02 is a signal for requesting acquisition of information necessary for information registration from the information registrant device 10 to a device of the contact for inquiry about necessary information. Moreover, Signal S03 is a response signal to Signal S02. Signal S02 includes the content of the inquiry, the URL of the contact for inquiry, and so on. Signal S03 includes the result of the inquiry (response information). Signal S04 is an information registration request transaction signal which is broadcast from the information registrant device 10 to the peer-to-peer network 160. Signal S04 includes the information on the pertinent embedded SIM that can be known to the information registrant, the information necessary for registration obtained in Signal S03, the timestamp, the electronic signature computed by using the above information and the private key, and the public key.

It should be noted that the information necessary for registration set within the information registration request transaction to be broadcast differs depending on what the information registrant device 10 is and the type of a contract between related businesses. For example, it is assumed that the information registrant device 10 is the embedded SIM equipped product manufacturer device 110 and the information that can be known to the device itself is the embedded SIM number (eUICC-ID) and the manufacture number of an in-house product equipped with the embedded SIM (product serial number). Moreover, it is assumed that, at the time of shipment of the product from the factory, the embedded SIM equipped product manufacturer device 110 inquires a pertinent MNO about information such as an MNO access ID for setup profile (old MNO-ID), a setup profile IMSI (old IMSI) and a setup profile MSISDM (old MSISDN), and concludes a contract with the pertinent MNO in a form that it can ship after setting the information in a pertinent embedded SIM. In such a case, the information necessary for registration in the embedded SIM equipped product manufacturer device 110 is information such as the MNO access ID for setup profile (old MNO-ID), the setup profile IMSI (old IMSI) and the setup profile MSISDN (old MSISDN). Moreover, a contact for inquiry about the above information by the embedded SIM equipped product manufacturer device 110 (that is, a device of a contact for inquiry about necessary information in FIG. 4) is the old contract MNO device 120.

FIG. 5 is a flow diagram showing how the information registrant device 10 transmits an information registration request transaction signal to the peer-to-peer network 160 managing the DB for embedded SIM management. Step ST01 is a step for inputting information by an information registrant into the information registrant device 10. At step ST01, a private key, a public key, information that can be known to a requester (the information registrant), and so on. Step ST02 is a step in which the information registrant device 10 inquires a contact for inquiry (a device of a contact for inquiry about necessary information) about necessary information. At step ST02, the information registrant device 10 obtains a setup profile and so on from the device of the contact for inquiry about necessary information. Step ST03 is a step in which the information registrant device 10 generates an information registration request transaction. The information registration request transaction includes information that can be known to the information registrant device itself, other information necessary for registration (including the information obtained at Step ST02), a timestamp, an electronic signature obtained by encrypting hash values of the above information with a private key, and a public key. Step ST04 is a step in which the information registrant device 10 broadcasts the generated information registration request transaction to the peer-to-peer network 160.

FIG. 6 is an information component diagram showing the relation of contents between information registrant device holding information I10, which is information held by the information registrant device, and an information registration request transaction I20, which is a transaction for requesting information registration onto the DB for embedded SIM management. As shown in FIG. 6, the information registrant device 10 holds an embedded SIM number, other information necessary for registration, a public key, and a private key. Moreover, an information registration request transaction broadcast by the information registrant device 10 includes an embedded SIM number, other information necessary for registration, a timestamp, a public key, and an electronic signature. With reference to FIG. 6, it is understood that an electronic signature is generated by encrypting an embedded SIM number, other information necessary for registration and a timestamp by using a private key.

All the participating nodes 170 participating in the peer-to-peer network 160 generate blocks each holding a plurality of information registration request transactions generated in a predetermined period and hash values thereof, connect all the information registration request transactions of a plurality of blocks in a plurality of periods in the past and hash values of the blocks in chain (referred to as a blockchain hereinafter), and holds and manages the blockchain as a DB for embedded SIM management.

The information user device 20 (including the information registrant device 10) inquires the peer-to-peer network 160 about information necessary for processing on its own embedded SIM.

For example, it is assumed that the embedded SIM equipped product manufacturer device 110, at the time of shipment from the factory, writes information such as an embedded SIM number (eUICC-ID), an embedded SIM equipped product manufacture number (product serial number), an MNO access ID for setup profile (old MNO-ID), a setup profile IMSI (old IMSI) and a setup profile MSISDN (old MSISDM) into an embedded SIM mounted on the product, and simultaneously broadcasts an information registration request transaction including the above information to the peer-to-peer network 160. In such a case, it is conceivable that a person (owner) who purchases the embedded SIM equipped product carries out the inquiry described above when using the product for the first time.

More specifically, it is assumed that the owner of the embedded SIM equipped product device 150 concludes a mobile network use contract with a new MNO in the actual use location. Moreover, it is assumed that the embedded SIM equipped product device 150 is first connected to a mobile network managed by the new MNO. For example, in such a case, the new contract MNO device 130 as the connection destination transmits an information use request transaction to the peer-to-peer network 160 in order to judge information issued by the embedded SIM equipped product device 150. Then, the new contract MNO device 130 obtains registration information on the embedded SIM in a response signal, and continues necessary processing. The obtained registration information includes, for example, an embedded SIM equipped product manufacture number (product serial number) associated with an embedded SIM number (eUICC-ID), an MNO access ID for setup profile (old MNO-ID), a setup profile IMSI (old IMSI), a setup profile MSISDN (old MSISDN), and the like.

Further, the new contract MNO device 130 determines whether or not the information issued by the connected embedded SIM equipped product device 150 matches the information obtained by broadcasting the information use request transaction. For example, in a case where both the information match (in a case where matching profiles are included), the new contract MNO device 130 determines that, without performing normal roaming between mobile network service providers, it is possible to rewrite setup information of the embedded SIM to information of the new contract MNO (new MNO-ID, new IMSI, new MSISDN) by using the OTA technology in the new contract MNO device 130. Then, the new contract MNO device 130 continues the information rewriting process for the actual embedded SIM. This will be described with reference to FIGS. 7 and 8.

Figure 7:
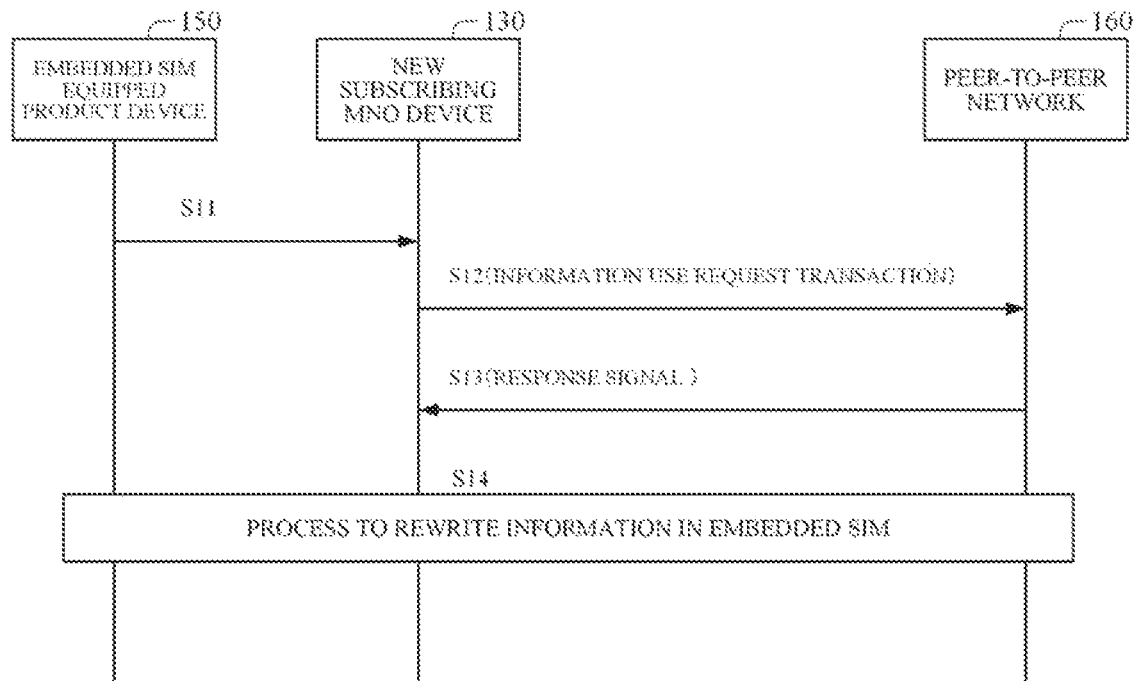
FIG. 7 is a signal sequence diagram showing an example of a process performed when, after the owner of an embedded SIM equipped product device concludes a mobile network use contract with a new MNO, first connecting the embedded SIM equipped product device to the mobile network managed by the new MNO.

FIG. 7 is a signal sequence diagram showing a process performed when, after the owner of the embedded SIM equipped product device 150 concludes a mobile network use contract with a new MNO, first connecting the embedded SIM equipped product device 150 to the mobile network managed by the new MNO. Signal S11 is an initial connection signal of the embedded SIM equipped product device 150 to the new contract MNO device 130. Signal S11 includes an old MNO-ID, an old IMSI, an old MSISD, an embedded SIM number (eUICC-ID), or the like. Signal S12 is an information use request transaction signal broadcast from the new contract MNO device 130 to the peer-to-peer network 160. Signal S12 includes the embedded SIM number (eUICC-ID) obtained in Signal S11. Signal S13 is a response signal from any of the participating nodes 170 participating in the peer-to-peer network 160. The response signal includes information (that is, the old MNO-ID, the old IMSI, the old MSISD) for setup profile associated with the embedded SIM number (eUICC-ID), or the like. There is a possibility that response signals are returned by a plurality of nodes. For this reason, the new contract MNO device 130 can have a configuration for adopting any of the returned response signals. For example, the new contract MNO device 130 adopts a node presenting information selected by majority vote at the earliest time, as a response node. Alternatively, the new contract MNO device 130 can be configured to have a unique rule such as adopting information at the time when the minimum required number of nodes returning the same information is reached. A rule for paying some fee for the adopted node or the node that provides the adopted information may be defined. Alternatively, the new contract MNO device 130 can be configured to always cache copies of all the information of the blockchain at constant intervals. In this case, the new contract MNO device 130 may omit the processing by Signals S12 and S13 and, instead, obtain setup profile information on the connected embedded SIM equipped product device 150 (actually, the embedded SIM) by using the abovementioned cache. Signal S14 represents a process to rewrite information in the embedded SIM of the embedded SIM equipped product device 150 in the new contract MNO device 130 after it is determined that the connection by Signal S11 is proper. The details of the processing by Signal S14 will be described later.

Figure 8:
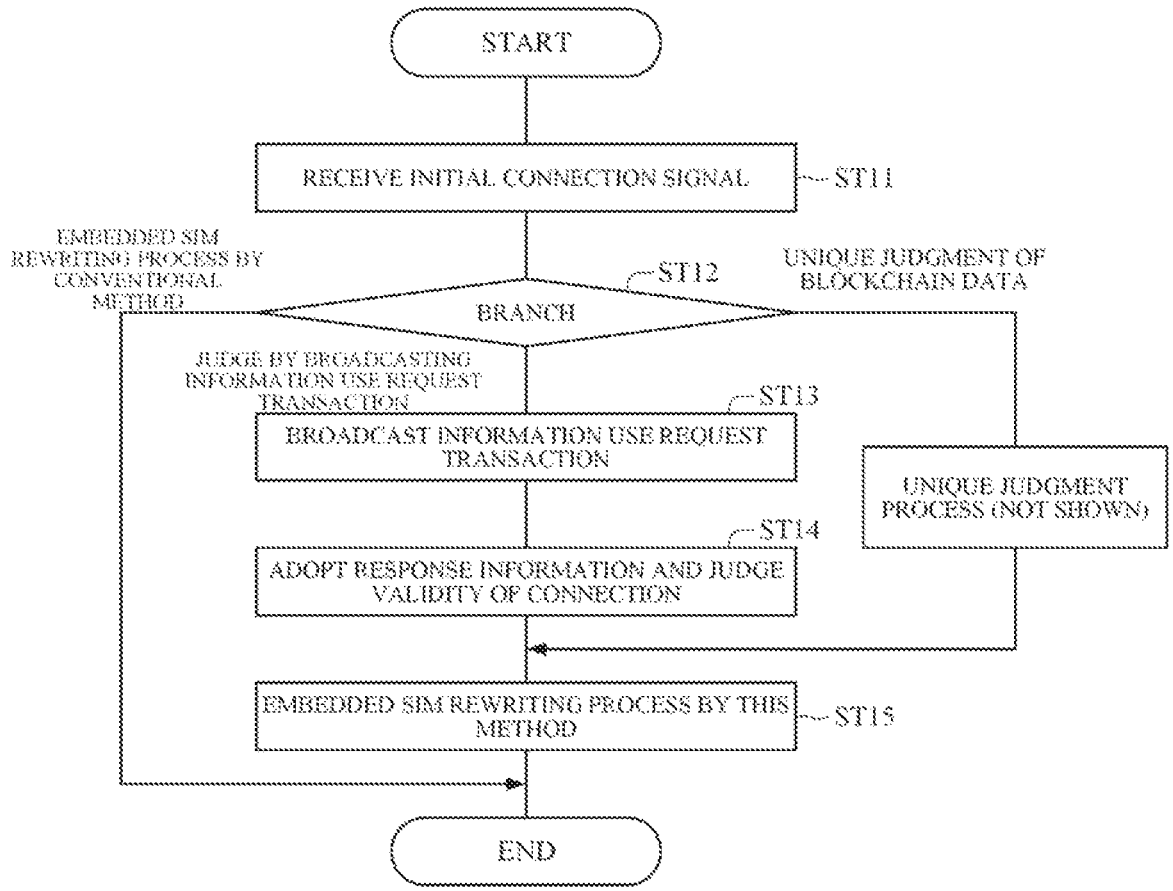
FIG. 8 is a flow diagram showing an example of a process performed by a new contract MNO device.

FIG. 8 is a flow diagram showing an example of processing by the new contract MNO device 130. To be specific, FIG. 8 shows an example of the flow from the time when the new contract MNO device 130 receives an initial connection signal of the embedded SIM equipped product device 150 to the time when the embedded SIM rewriting process is performed. For example, the new contract MNO device 130 broadcasts an information use request transaction to the peer-to-peer network 160, and obtains setup profile information (the old MNO-ID, the old IMSI, the old MSISDN) associated with the pertinent embedded SIM number (eUICC-ID). Then, the new contract MNO device 130 judges the validity of the initial connection signal by using the obtained information, and executes a process of rewriting the pertinent embedded SIM information. Alternatively, the new contract MNO device 130 obtains setup profile information (old MNO-ID, old IMSI, old MSISDN) associated with the pertinent embedded SIM number (eUICC-ID) from blockchain data that has been separately obtained in advance. Then, the new contract MNO device 130 judges the validity of the initial connection signal by using the obtained information, and executes the process of rewriting the pertinent embedded SIM information.

Step ST11 is a step for receiving an initial connection signal in the new contract MNO device 130. Step ST12 is a processing branch step. At step ST12, the processing branches in a manner that the new contract MNO device 130 performs an embedded SIM rewriting process according to a conventional method (left branch in FIG. 8), or makes a unique judgment by using the cache of blockchain data (right branch in FIG. 8), or judges by broadcasting an information use request transaction to the peer-to-peer network 160 (center branch in FIG. 8). Step ST13 is a step in which the new contract MNO device 130 broadcasts, to the peer-to-peer network 160, an information use request transaction for inquiring about setup profile information (old MNO-ID, old IMSI, old MSISDN) associated with the eUICC-ID of the embedded SIM mounted on the embedded SIM equipped product device 150 having emitted the initial connection signal. Step ST14 is a step in which the new contract MNO device 130 waists for a response signal to a broadcast signal and adopts any response content and response node from among them. Moreover, step ST14 is a step for judging the validity of information in the initial connection signal received at step ST11 based on the adopted response content. Step ST15 is a step in which after validity is confirmed at step ST14, the new contract MNO device 130 rewrites information in the embedded SIM. The details of Step ST15 will be described later. To step ST15, the processing also flows from a unique judgment process on blockchain data having branched to the right at step ST12.

Participants (the participating nodes 170) of the peer-to-peer network 160 need to provide computer power by a large amount of cryptographic hash calculation, validation of transactions, generation of a blockchain, and so on. For this reason, in order to maintain the system described in this embodiment, it is necessary to motivate maintenance of the network. That is, some fee is required.

For example, according to Non-Patent Document 1, specific bitcoins are given to a person who has won competition of hash calculation of a new block, which is a bundle of transactions for exchange (transfer of ownership) of bitcoin that is cryptocurrency, and has successfully recorded it onto the end of the blockchain. This is called coin mining (mining). Currently, new blocks are generated at intervals of about 10 minutes and 25 bitcoins are mined. The amount of coins mined every 10 minutes decreases by half once every four years. Mined coins do not affect the issuer of a transaction. In addition to coin mining, it is possible to include an extra fee from the issuer of a transaction into the transaction (transfer of the ownership of bitcoins for the fee). It is also possible to define another cryptocurrency, multi-purpose point, or the like, on the base of bitcoin.

Further, according to Non-Patent Document 2, specific ethers are given to a person who has won competition of hash calculation of a new block, which is a bundle of transactions not only for exchange (transfer of ownership) of ether that is a cryptocurrency in Ethereum but also relating to conclusion of a smart contract (a contract which can be confirmed on a computer) and fulfillment of a contract (a code which can be automatically executed on a computer) and has successfully recorded onto the end of a blockchain (referred to as a mining successor hereinafter). A reward given to a mining successor includes 5 ethers fixed for one mining, and ethers corresponding to the amount of transaction information collected from the transaction issuer and fuel (Gas) defined in Ethereum necessary for execution of a contract fulfillment code.

In this example embodiment, it is possible to configure so that an information registration request transaction approval fee for recording to a blockchain for embedded SIM management DB is paid in the same manner as these virtual currencies or with a separately determined cryptocurrency, multipurpose point, or the like.

A consensus building process is performed based on competition of cryptographic hash calculation at the time of update of a blockchain or a separately defined consensus building rule dedicated for peer-to-peer network.

Distribution of the approval fee to the participating nodes 170 of the peer-to-peer network 160 is performed by a person who has won competition of cryptographic hash calculation or based on a separately defined consensus building rule.

The information registrant devices 10 in the second example embodiment, or the embedded SIM manufacturer device 100, the embedded SIM equipped product manufacturer device 110, the old contract MNO device 120, the new contract MNO device 130, the embedded SIM equipped product owner device 140 and the embedded SIM equipped product device 150 that serve as the information registrant devices 10 in the third example embodiment have no concern with a consensus building process, a rule or a method for distributing the approval fee. These devices only need to simply care about the success or failure of a transaction issued thereby. However, as for confirmation of the success or failure of a transaction, the information user device 20 can confirm registration information issued by itself, but any particular confirmation is not required. That is, at the time of broadcasting an information registration request transaction, the confirmation is unnecessary if it believes that the transaction has succeeded based on the consensus building process of the peer-to-peer network 160, but if it does not immediately believe, any confirmation is possible is possible.

A blockchain is obtained by cryptographic hash calculation of a plurality of transactions issued in the past and a plurality of blocks generated in the past, and all the nodes participating in the peer-to-peer network 160 hold the same information through the consensus building process. For this reason, falsification such as change and deletion is practically impossible. If a certain participating node 170 intends to falsify past data, the node 170 needs to redo hash calculation of a transaction which the node wants to falsify and a block holding the transaction and all transactions generated after that and hash calculation of all blocks generated after that, and continue to overcome competition for cryptographic hash calculation or keep showing that there is no inconsistency on the consensus building process against all the other participating nodes 170. Whether the falsification succeeds or not depends on superiority and inferiority between computer power of the participating node 170 which wants to falsify and the total value of computer power of all the other participating nodes 170. As block generation progresses, the probability that a malicious node continues to win will drop dramatically, so that the falsification of the blockchain will be found in the near future and replaced with another valid blockchain. This is that a blockchain cannot be falsified virtually.

Therefore, in a case where the owner of the embedded SM equipped product device 150 is changed (or not changed) and the MNO in use contract transfers to another MNO or the use contract of the embedded SIM equipped product device 150 is terminated, update or deletion of the DB for embedded SIM management is done in the following form; that is, broadcasting a transaction in which change of transfer destination information (the public key of the owner, contract MNO information for setup profile or operation profile) with an embedded SIM number (eUICC-ID) as a main key, and adding to the blockchain through the consensus building process.

Fourth Example Embodiment

This example embodiment describes an embedded SIM management system which is robust against an attack such that a malicious third party who knows another person's embedded SIM number (eUICC-ID) generates any pair of private key and public key and broadcasts a fake information registration request transaction. Hereinafter, the configuration and operation of this example embodiment will be described with reference to FIGS. 9 and 10.

Figure 9:
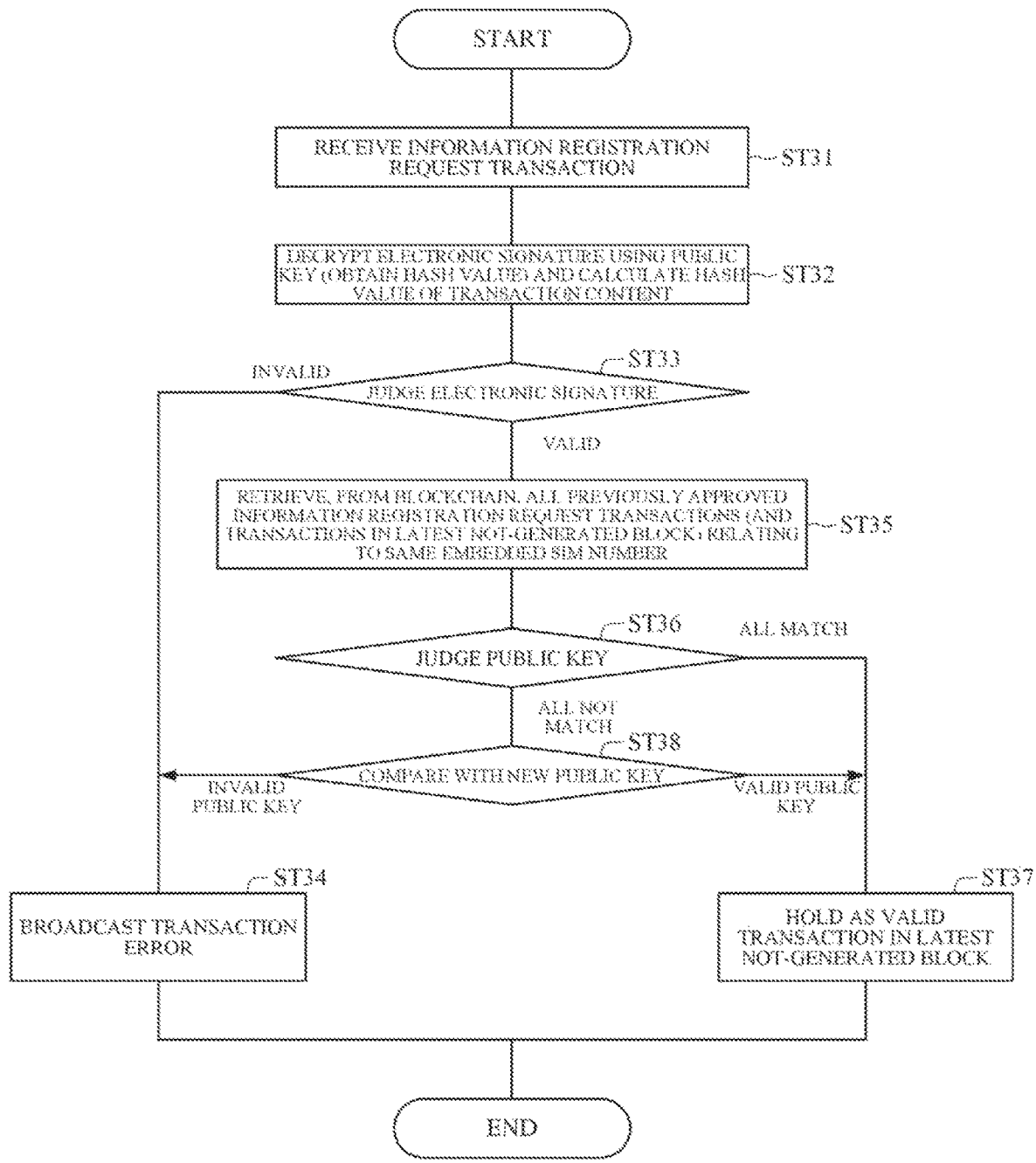
FIG. 9 is a flowchart showing an example a process performed by a node participating in the peer-to-peer network.

FIG. 9 is a flowchart showing an example of processing by a node participating in a peer-to-peer network. The processing shown in FIG. 9 is equivalent to, for example, the processing by the blockchain management part 2g of the node device 2a shown in FIG. 45.

With reference to FIG. 9, the blockchain management part 2g receives an information registration request transaction broadcast by the information registrant device 3 (ST31). Then, the blockchain management part 2g decrypts an electronic signature included in the received information registration request transaction by using a public key included in the received information registration request transaction. Moreover, the blockchain management part 2g calculates a hash value from the content (in the case shown in FIG. 6, an embedded SIM number, other information necessary for registration, and a timestamp) of the received information registration request transaction (ST32). Next, the blockchain management part 2g compares the hash value obtained by decrypting the electronic signature with the above-described generated hash value and thereby judges the validity of the electronic signature (ST33). Then, in a case where the electronic signature is invalid, the blockchain management part 2g handles the currently received information registration request transaction as an invalid transaction and broadcasts a transaction error to the peer-to-peer network (ST34).

On the other hand, in a case where the electronic signature is valid, the blockchain management part 2g retrieves, from the blockchain 2f, all the previously approved information registration request transactions (and transactions in a block that is the latest but is not generated yet, which will be referred to as the latest not-generated block) relating to the same embedded SIM number as the embedded SIM number included in the currently received information registration request transaction (ST35). Next, the blockchain management part 2g judges, based on the public key included in the currently received information registration request transaction and public keys included in the information registration request transactions retrieved at Step ST35, whether all the public keys match, that is, only one kind of public key is present, or the public keys do not match, that is, a public key which does not match the other public keys is present (ST36). In a case where all the public keys match, the blockchain management part 2g handles the currently received information registration request transaction as a valid transaction and holds the transaction in the latest not-generated block (ST37).

On the other hand, in a case where the public keys do not match, the blockchain management part 2g compares the public key included in the currently received information registration request transaction with a new public key to be described in a fifth example embodiment (ST38). Then, in a case where the public key included in the currently received information registration request transaction matches the new public key, the blockchain management part 2g handles the currently received information registration request transaction as a valid transaction and holds the transaction in the latest not-generated block (ST37). However, in a case where the public key included in the currently received information registration request transaction does not match the new public key, the blockchain management part 2g handles the currently received information registration request transaction as an invalid transaction and broadcasts a transaction error to the peer-to-peer network (ST34). Thus, in a case where a public key included in a currently received information registration request transaction matches a new public key that is a newest public key at least, the blockchain management part 2g handles the received information registration request transaction as a valid transaction.

Figure 10:
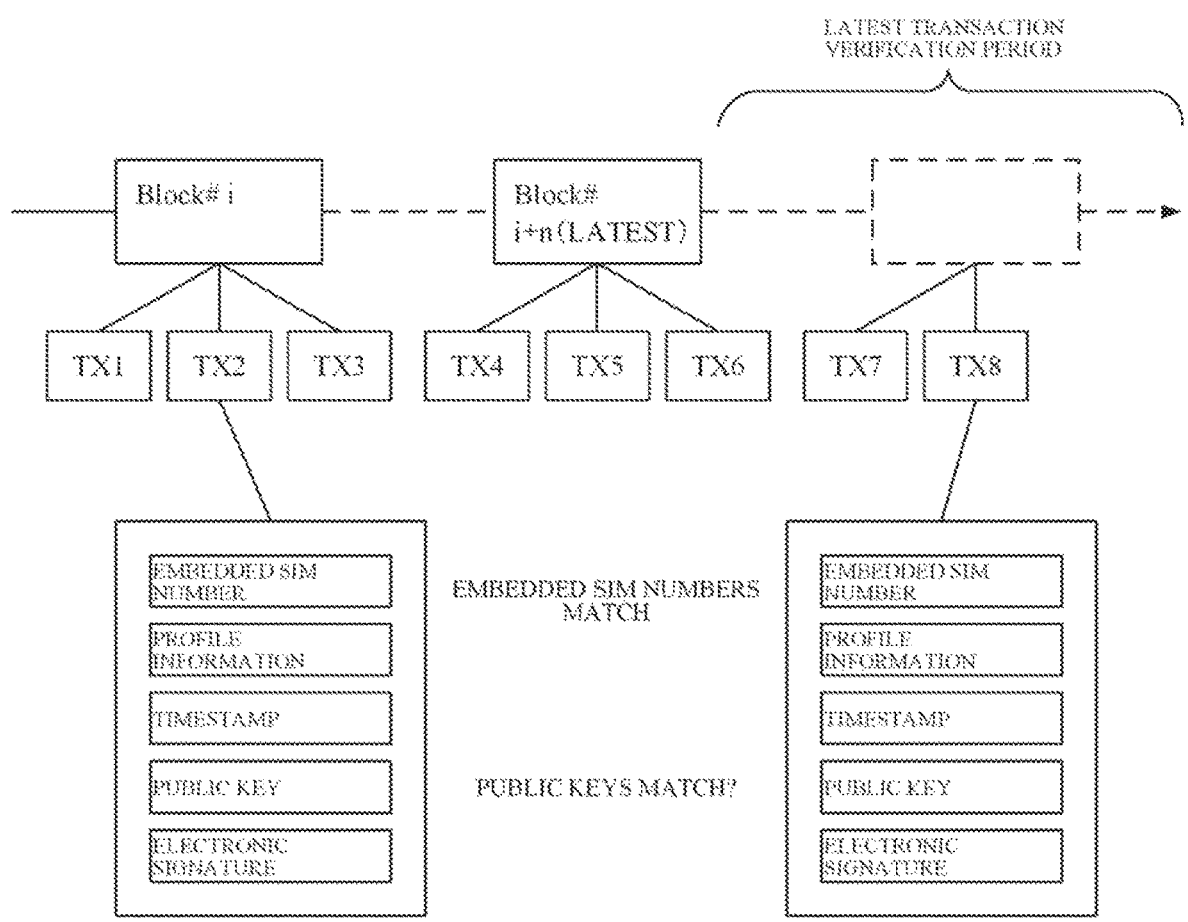
FIG. 10 is a conceptual diagram showing an example of processing at steps ST35 and ST36 of FIG. 9.

FIG. 10 is a conceptual diagram showing an example of the processing at steps ST35 and ST36 of FIG. 9. In FIG. 10, TX8 denotes a currently received information registration request transaction. TX1 to TX7 denote previously approved information registration request transactions (and transactions in the latest not-generated block). The information registration request transaction TX2 is a transaction including the same embedded SIM number as an embedded SIM number included in the information registration request transaction TX8. In the case shown in FIG. 10, the blockchain management part 2g retrieves, from the previous information registration request transactions, the information registration request transaction TX2 having the same embedded SIM number as the embedded SIM number included in the information registration request transaction TX8. Subsequently, the blockchain management part 2g compares the public keys of the information registration request transactions TX2 and TX8. Then, in a case where the public keys of the information registration request transactions TX2 and TX8 match, the blockchain management part 2g handles the currently received information registration request transaction TX8 as a valid transaction.

Fifth Example Embodiment

In this example embodiment, a number portability information management system configured to be able to change a private key and public key pair will be described.

In general, it is conceivable that a legitimate owner of an embedded SIM equipped product updates a private key and public key pair as usual operation. Alternatively, it is conceivable that, as usual operation, a legitimate owner of an embedded SIM equipment product abandons a contract to use the embedded SIM equipped product or transfers the ownership to another person. In this example embodiment, as will be described later, the above-described situation is dealt with by broadcasting an information registration request transaction including a new public key to a peer-to-peer network. In other words, in this example embodiment, the above-described situation is resolved by broadcasting a content in which information of changing the public key of the legitimate owner for an embedded SIM number (eUICC-ID) to a new public key (including the public key of another person who the ownership is transferred to) is added to an information registration request transaction, to a peer-to-peer network only one time (or every time a public key is updated or the ownership is transferred). The configuration and operation of this example embodiment will be described with reference to FIGS. 11, 12, 13 and 9.

Figure 11:
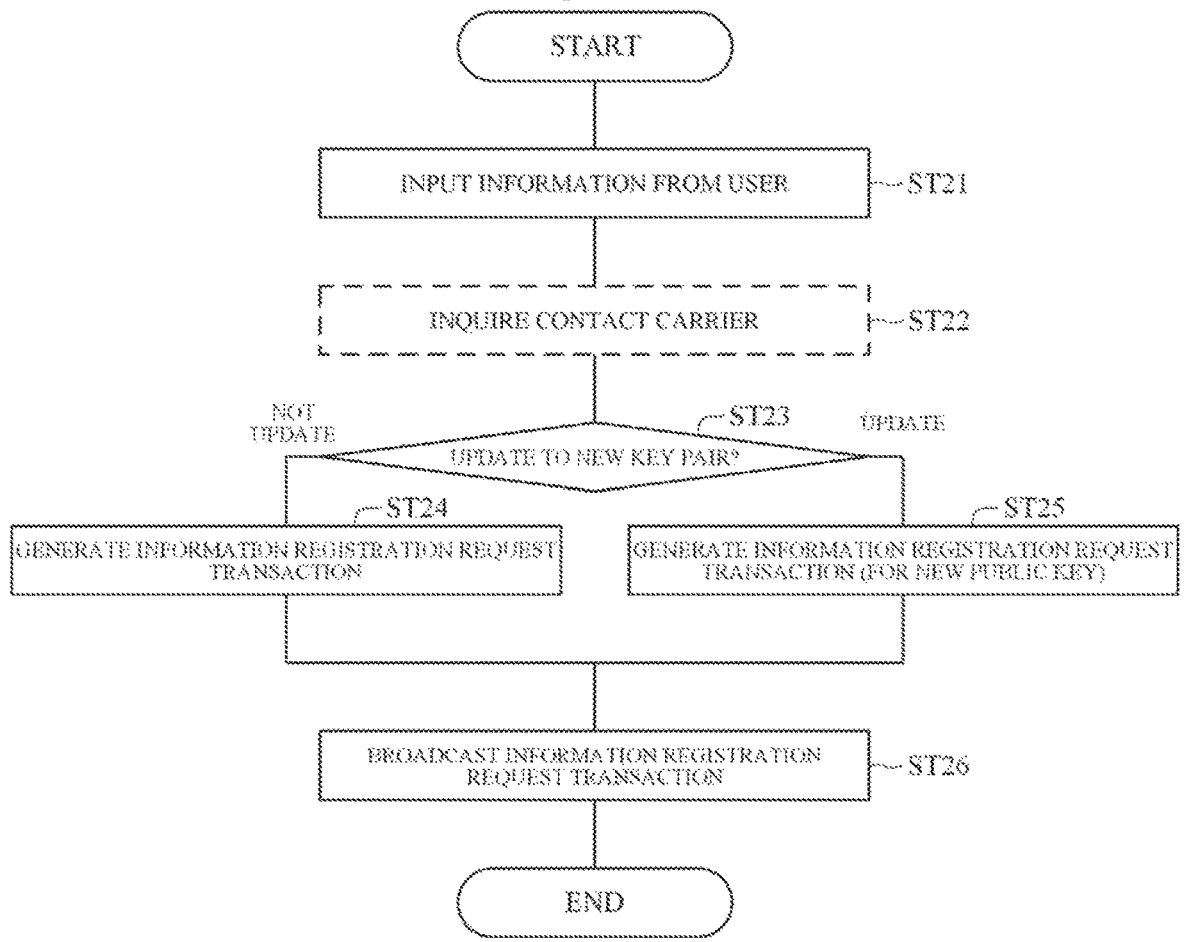
FIG. 11 is a flow diagram showing an example of a process in which the information registrant device transmits an information registration request transaction signal to the peer-to-peer network.

FIG. 11 is a flow diagram showing how the information registrant device 10 transmits an information registration request transaction signal to the peer-to-peer network 160. Step ST21 is a step in which the information registrant device 10 accepts an input of information from an information registrant. At step ST21, a private key, a public key, and information which can be known by a requester (the information registrant) are input. Step ST22 is a step in which the information registrant device 10 inquires a contact of inquiry (for example, a device of the contact of inquiry about necessary information shown in FIG. 4) about necessary information. At step ST22, the information registrant device 10 obtains a setup profile or the like from the device of the contact of inquiry about necessary information, or the like. In this example embodiment, Step ST22 may be omitted. Step ST23 is a step for judging whether or not to update to a new key pair. Step ST24 is a step for generating an information registration request transaction in the case of not updating to a new key pair. Processing performed at step ST24 is the same as the processing performed at step ST03 of FIG. 5. Step ST25 is a step for generating an information registration request transaction in the case of updating to a new key pair. Step ST26 is a step for broadcasting the information registration request transaction generated at Step ST24 or Step ST25 to the peer-to-peer network 160.

Figure 12:
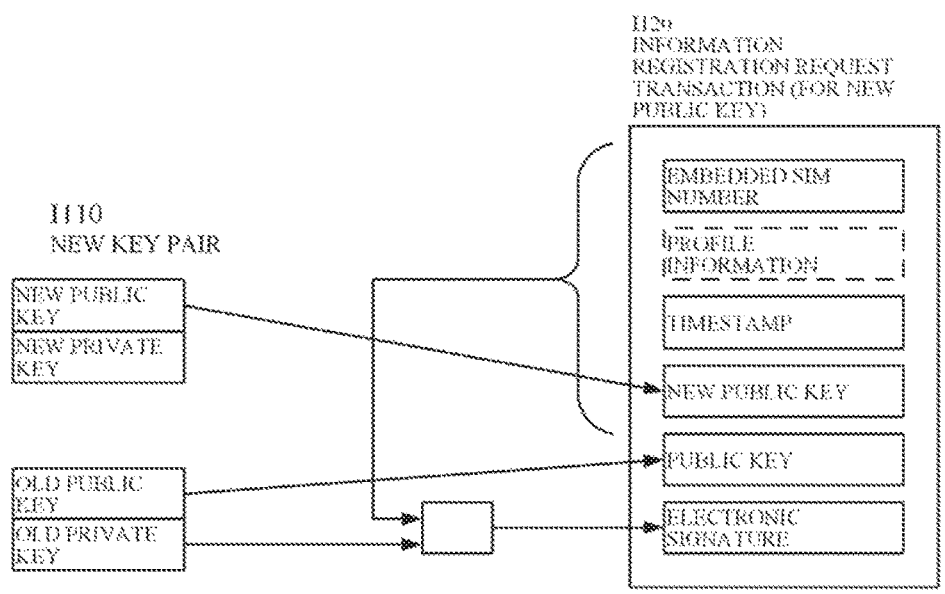
FIG. 12 is an explanatory diagram of step ST25 for generating an information registration request transaction when updating to a new key pair, shown in FIG. 11.

FIG. 12 is an explanatory diagram of Step ST25 for generating an information registration request transaction in the case of updating to a new key pair. With reference to FIG. 12, an information registration request transaction (for a new public key) I120 includes an embedded SIM number, profile information, a timestamp, a new public key, an old public key, and an electronic signature. The electronic signature is put on the embedded SIM number, the profile information, the timestamp and the new public key by using the old private key. The profile information may be omitted. Thus, it is understood that in the case of updating to a new key pair, a new public key is included in an information registration request transaction, when compared with the case shown in FIG. 6.

Figure 13:
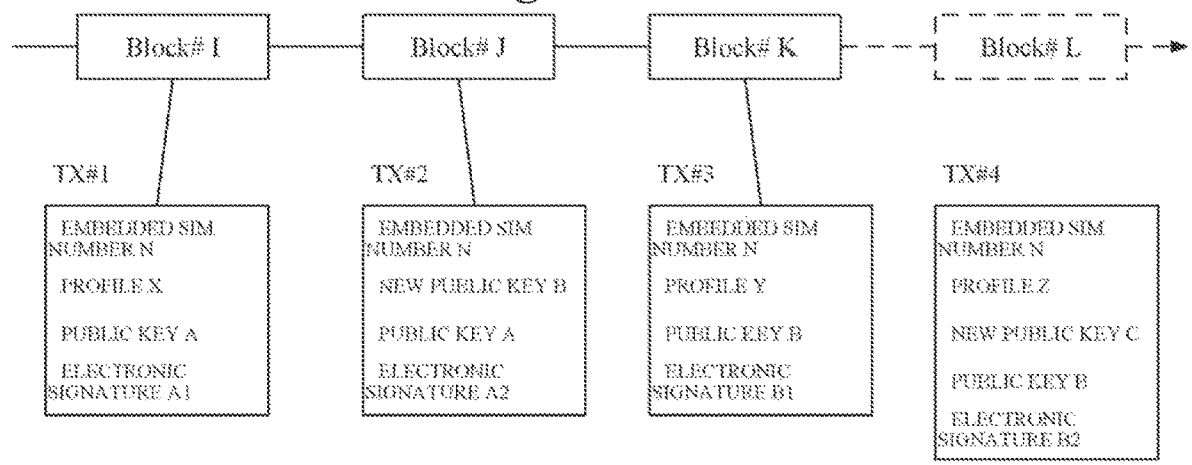
FIG. 13 is a diagram showing an example of a plurality of information registration request transactions relating to the same embedded SIM number accumulated in a blockchain of a certain node.

FIG. 13 shows an example of a plurality of information registration request transactions TX #1 to TX #4 relating to the same embedded SIM number accumulated in a blockchain of a certain node. The information registration request transaction TX #1 includes an electronic signature A1 put on information including an embedded SIM number N and a profile X by using a public key A. The information registration request transaction TX #2 is a transaction for updating the key pair and includes an electronic signature A2 put on information including the embedded SIM number N and a new public key B by using the public key A. Because the profile X is not changed, the information of the profile X is not shown in the information registration request transaction TX #2. The information registration request transaction TX #3 is a transaction for updating the profile and includes an electronic signature B1 put on information including the embedded SIM number N and a new profile Y by using a public key B. The information registration request transaction TX #4 is a transaction for updating both the key pair and the profile, and includes an electronic signature B2 put on information including the embedded SIM number N, a new profile Z and a new public key C by using the public key B.

FIG. 9 is a flowchart showing an example of processing by a node participating in a peer-to-peer network. As described before, the processing shown in FIG. 9 is equivalent to, for example, the processing by the blockchain management part 2g of the node device 2a shown in FIG. 45. Because the overall flow of the processing shown in FIG. 9 has already been described, a flow in a scene of processing the information registration request transactions TX #2 to TX #4 shown in FIG. 13 will be described below.

In a scene where the information registration request transaction TX #2 is received, an already registered transaction including the same embedded SIM number N is only TX #1. Therefore, when judging that the electronic signature A2 is valid, the blockchain management part 2g retrieves the transaction TX #1 (ST35). In this case, the public keys match between the transactions TX #1 and TX #2. Therefore, the blockchain management part 2g holds the transaction TX #2 as a valid transaction in the latest not-generated block (ST37). The transaction TX #2 includes the new public key B. Therefore, the public key B is handled as a valid public key afterward.

Next, it is assumed that the information registration request transaction TX #3 is received. In this scene, already registered transactions including the same embedded SIM number N are two transactions TX #1 and TX #2. Therefore, when judging that the electronic signature B1 is valid, the blockchain management part 2g retrieves the transactions TX #1 and TX #2 (ST35). In this case, the public keys do not match among the transactions TX #1 to TX #3. For this reason, the blockchain management part 2g compares the public key B included in the transaction TX #3 with the currently valid new public key B (ST38). Since the public keys match consequently, the blockchain management part 2g holds the transaction TX #3 as a valid transaction in the latest not-generated block (ST37). Since the transaction TX #3 includes a new profile Y, the profile Y is handled as a valid profile afterward.

Next, it is assumed that the information registration request transaction TX #4 is received. In this scene, already registered transactions including the same embedded SIM number N are three transactions TX #1 to TX #3. Therefore, when judging that the electronic signature B2 is valid, the blockchain management part 2g retrieves the transactions TX #1 to TX #3 (ST35). In this case, the public keys do not match among the transactions TX #1 to TX #4. For this reason, the public key B included in the transaction TX #4 is compared with the currently valid new public key B (ST38). Since the public keys match consequently, the blockchain management part 2g holds the transaction TX #4 as a valid transaction in the latest not-generated block (ST37). The transaction TX #4 includes a new public key C and a new profile Z. For this reason, the public key C is handled as a valid public key afterward and the profile Z is handled as a valid profile afterward.

Thus, according to this example embodiment, in a case where a key pair is updated, an information registration request transaction including a new public key is broadcast. Moreover, the blockchain management part 2g is configured to, in a case where a public key included in a currently received information registration request transaction matches a latest "new public key" included in a retrieved information registration request transaction, handle the received information registration request transaction as a valid transaction. With such a configuration, it is possible to change a pair of private key and public key.

Sixth Example Embodiment

In this example embodiment, an embedded SIM management system which is robust against an attack such that, for the purpose of seizing the ownership of any embedded SIM number (eUICC-ID) having never been used, a malicious third party generates any pair of private key and public key and firstly broadcasts an information registration request transaction including the new public key will be described.

In this example embodiment, the manufacturer of an embedded SIM becomes the initial owner of an embedded SIM number range, or transfers the ownership of an embedded SIM number (or number range) to an embedded SIM equipped product manufacture that is the sales destination of the embedded SIM. Then, an initial information registration request transaction including a new public key for any embedded SIM number (or number range or plural discontinuous numbers) is broadcast from an embedded SIM manufacturer device or an embedded SIM equipped product manufacturer device, or from a device of the initial purchaser (that is, owner) of an embedded SIM equipped product. It is needless to say that public keys and electronic signatures included in information registration request transactions vary depending on transmitters of broadcast signals. A "new public key" included in an information registration request transaction includes a public key of a person approved as a legitimate owner of an embedded SIM (or an embedded SIM equipped product) by the transmitter of the information registration request transaction. Hereinafter, the configuration and operation of this example embodiment will be described with reference to FIGS. 14 to 30.

First, a configuration in which an initial information registration request transaction including a new public key for any embedded SIM number (or number range or plural discontinuous numbers) is broadcast by an embedded SIM manufacturer device will be described with reference to FIGS. 14 to 17.

Figure 14:
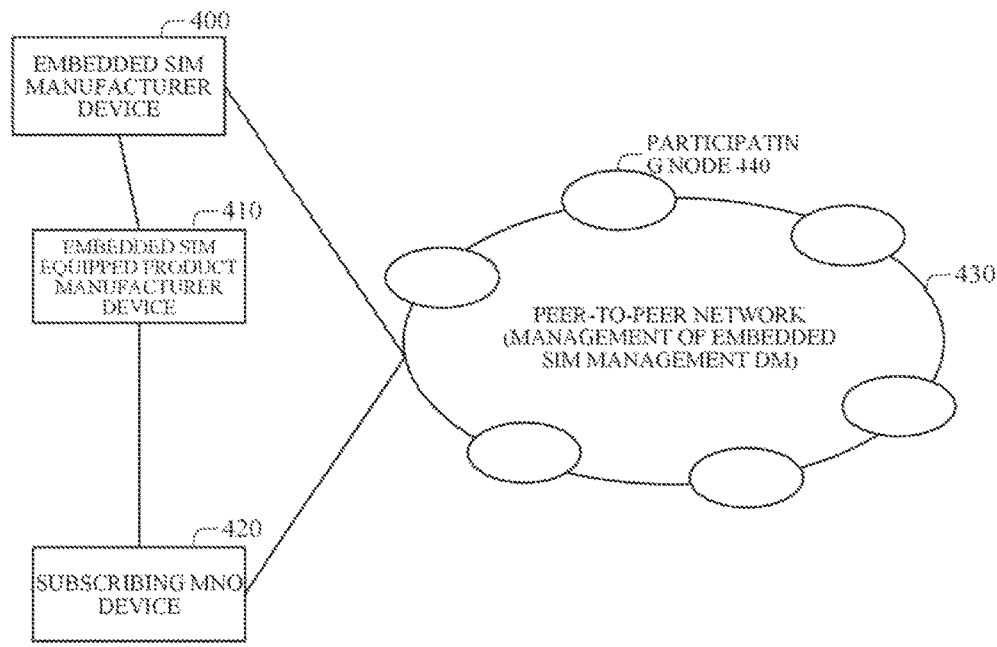
FIG. 14 is a configuration diagram of a sixth example embodiment of the present invention.

With reference to FIG. 14, the system includes an embedded SIM manufacturer device 400, an embedded SIM equipped product manufacturer device 410, a contract MNO device 420, a peer-to-peer network 430 that manages a blockchain for embedded SIM management DB, and a plurality of participating nodes 440 that participate in the peer-to-peer network 430.

Figure 15:
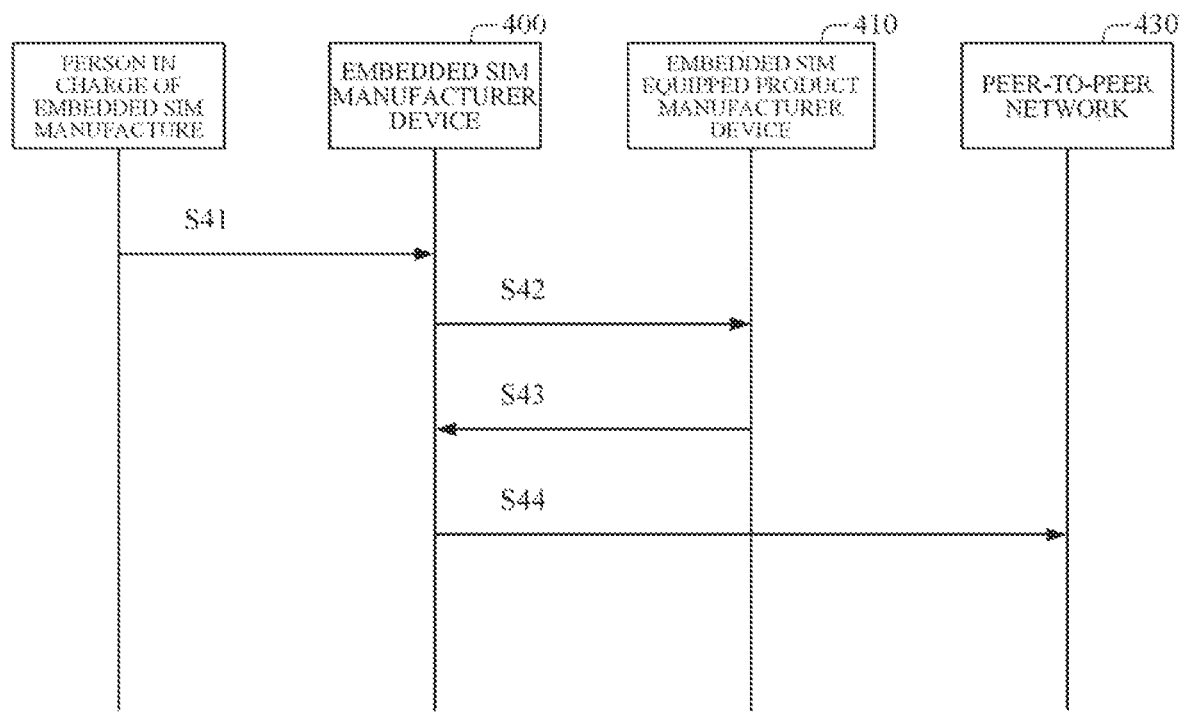
FIG. 15 is a signal sequence diagram showing an example of a process to broadcast an information registration request transaction from an embedded SIM manufacturer device to a peer-to-peer network.

FIG. 15 is a signal sequence diagram showing how an information registration request transaction is broadcast from the embedded SIM manufacturer device 400 to the peer-to-peer network 430 managing the embedded SIM management DB. As shown in FIG. 15, a person in charge of embedded SIM manufacture inputs necessary information into the embedded SIM manufacturer device 400. Moreover, the embedded SIM manufacturer device 400 obtains necessary information from the embedded SIM equipped product manufacturer device 410. After that, the embedded SIM manufacturer device 400 broadcasts, to the peer-to-peer network 430, an information registration request transaction including the above-described information provided with a timestamp and an electronic signature using a private key.

To be specific, in FIG. 15, Signal S41 represents an information input signal to the embedded SIM manufacturer device 400 by the person in charge of embedded SIM manufacture. Signal S41 includes a private key, a public key, information that can be known by the person, and a contact of inquiry about other information (URL, or the like). Signal S42 is a necessary information acquisition request signal for information registration to the embedded SIM quipped product manufacturer device 410, by the embedded SIM manufacturer device 400. Signal S43 is a response signal to Signal S42. Signal S42 includes outsourcing of management of an embedded SIM number range to the embedded SIM equipped product manufacturer device 410, an inquiry about a public key of the embedded SIM equipped product manufacturer, the URL of a contract for inquiry, and the like. Signal S43 includes response information with respect to the inquiry. Signal S44 is an information registration request transaction signal broadcast from the embedded SIM manufacturer device 400 to the peer-to-peer network 430. Signal S44 includes information on the embedded SIM that can be known to the embedded SIM manufacturer device itself, other information necessary for registration obtained in signal S43, a timestamp, an electronic signature calculated by using the above information and a private key, and a public key.

Figure 16:
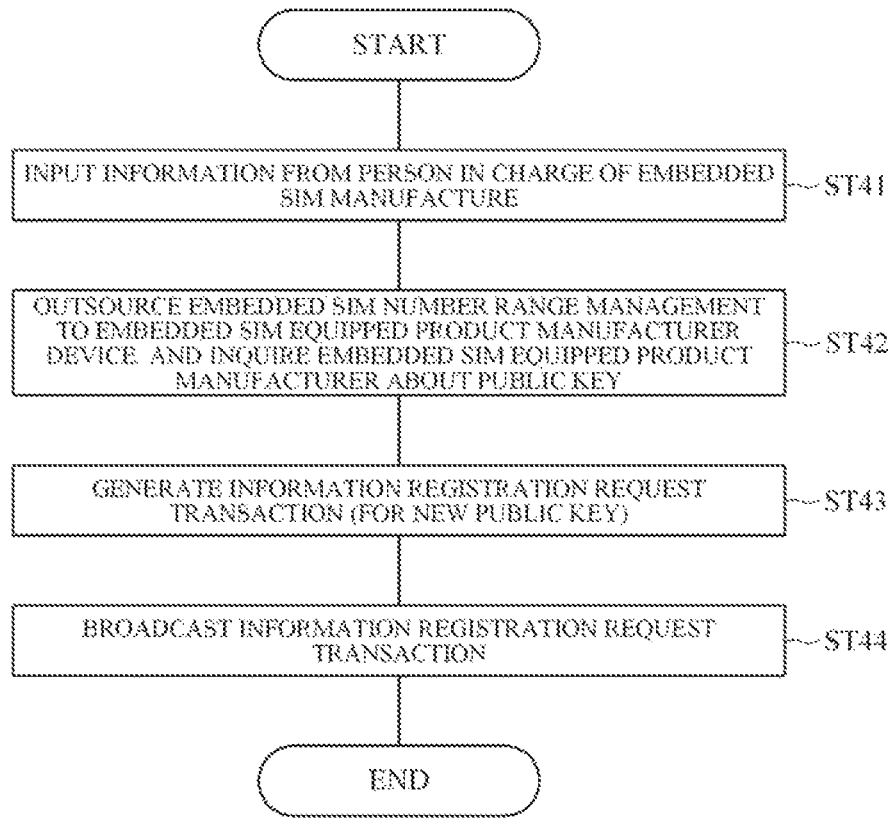
FIG. 16 is a flow diagram showing an example of a process in which the embedded SIM manufacturer device transmits an information registration request transaction signal to the peer-to-peer network.

FIG. 16 is a flow diagram how the embedded SIM manufacturer device 400 transmits an information registration request transaction signal to the peer-to-peer network 430 managing the DB for embedded SIM management. Step ST41 is a step in which the embedded SIM manufacturer device 400 inputs the above-described information from the person in charge of embedded SIM manufacture. Step ST42 is a step in which the embedded SIM manufacturer device 400 inquires the embedded SIM equipped product manufacturer device 410 about the above-described information. Step ST43 is a step in which the embedded SIM manufacturer device 400 generates an information registration request transaction (for a new public key). Step ST44 is a step in which the embedded SIM manufacturer device 400 broadcasts the generated information registration request transaction to the peer-to-peer network 430.

Figure 17:
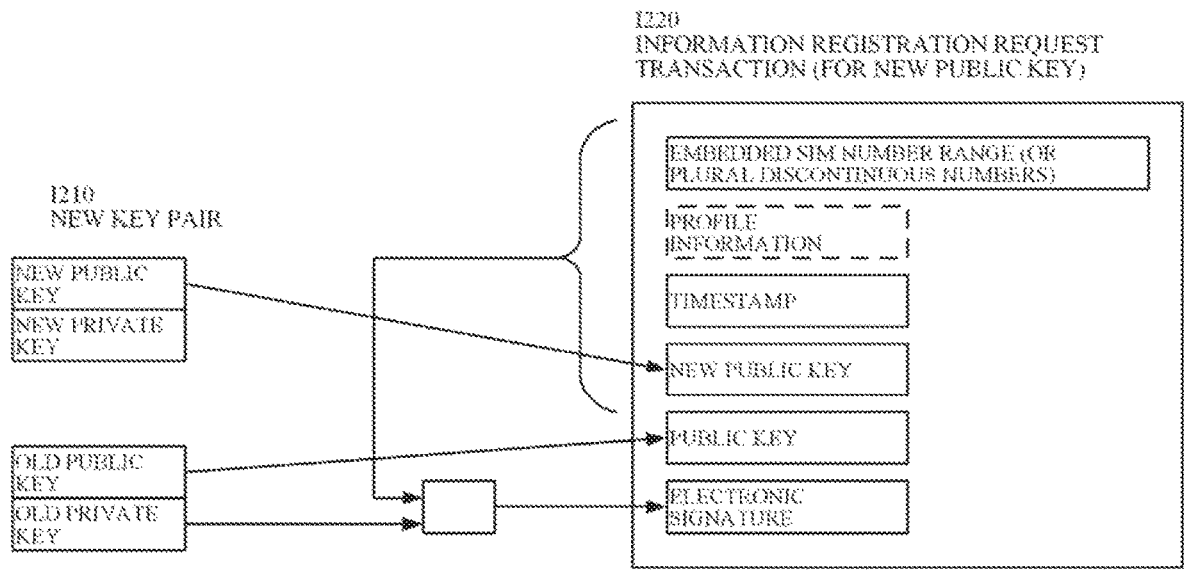
FIG. 17 is an explanatory diagram of step ST43 for generating an information registration request transaction (for a new public key), shown in FIG. 16.

FIG. 17 is an explanatory diagram of Step ST43 for generating an information registration request transaction (for a new public key). An information registration request transaction (for a new public key) I220 includes an embedded SIM number range (or plural discontinuous numbers), profile information, a timestamp, a new public key, a public key, and an electronic signature. The electronic signature is put on the embedded SIM number range (or plural discontinuous numbers), the profile information, the timestamp and the new public key by using a private key. The profile information may be omitted.

Next, a configuration in which an initial information registration request transaction including a new public key for any embedded SIM number (or number range or plural discontinuous numbers) is broadcast from an embedded SIM equipped product manufacturer device will be described with reference to FIGS. 18 to 21.

Figure 18:
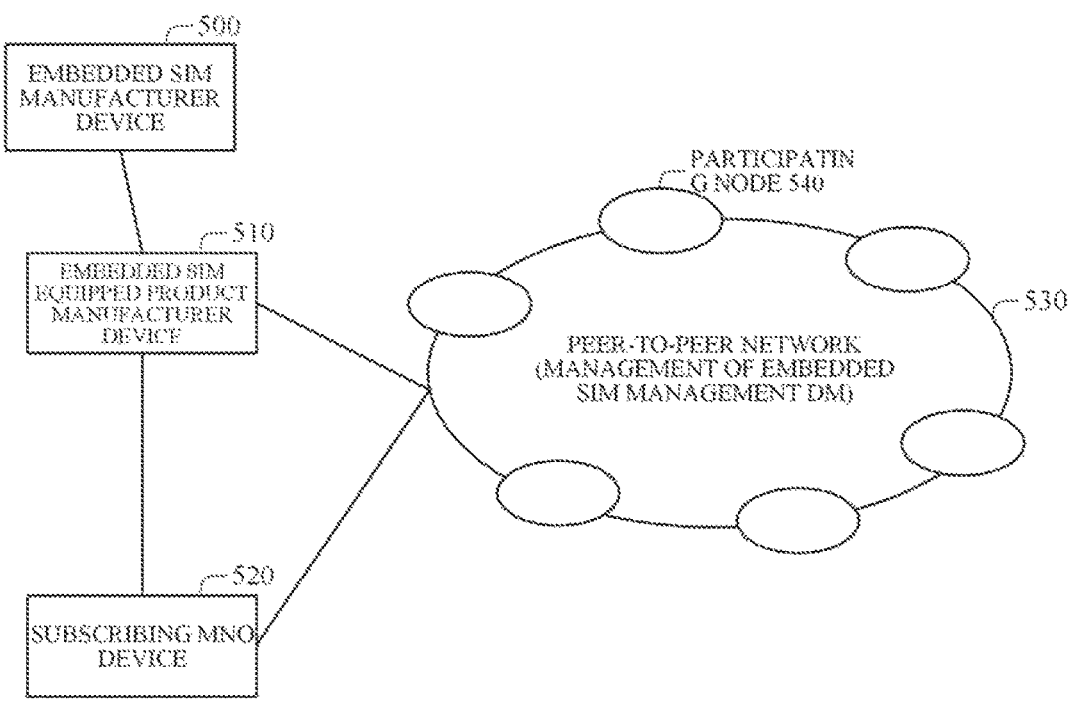
FIG. 18 is another configuration diagram of the sixth example embodiment of the present invention.

With reference to FIG. 18, the system includes an embedded SIM manufacturer device 500, an embedded SIM equipped product manufacturer device 510, a contract MNO device 520, a peer-to-peer network 530 that manages a DB for embedded SIM management, and a plurality of participating nodes 540 that participate in the peer-to-peer network 530.

Figure 19:
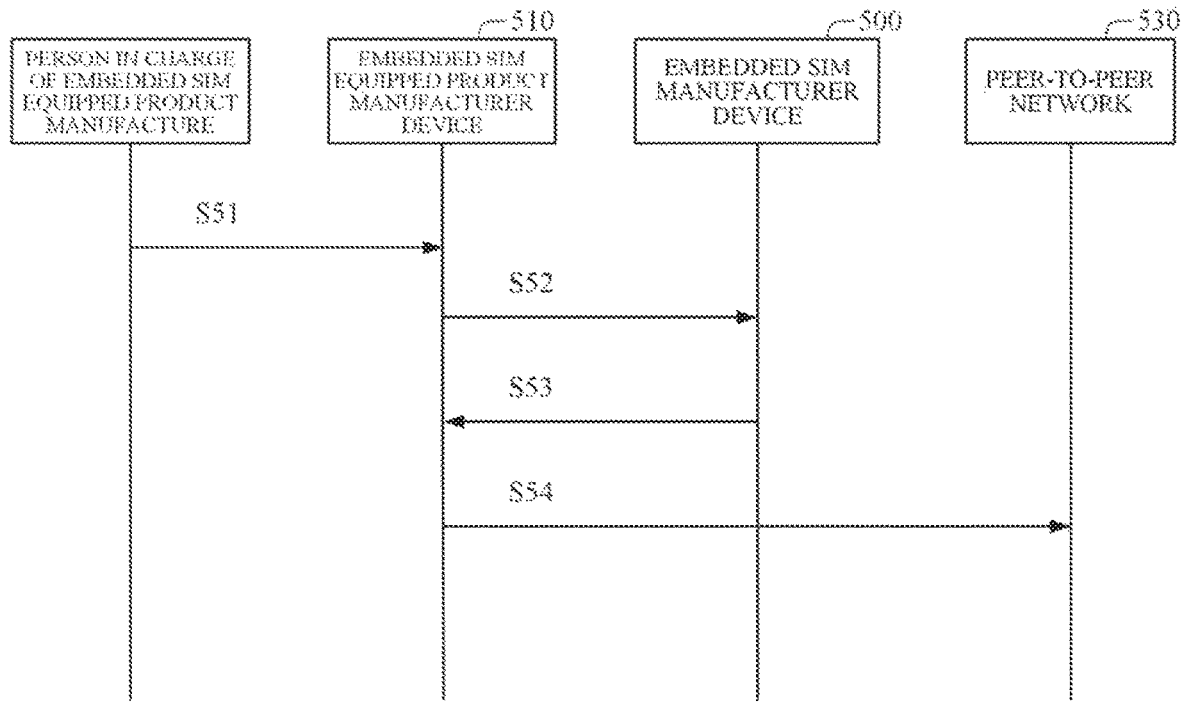
FIG. 19 is a signal sequence diagram showing an example of a process to broadcast an information registration request transaction from an embedded SIM equipped product manufacturer device to the peer-to-peer network.

FIG. 19 is a signal sequence diagram showing how an information registration request transaction is broadcast from the embedded SIM equipped product manufacturer device 510 to the peer-to-peer network 530 that manages the DB for embedded SIM management. As shown in FIG. 19, a person in charge of embedded SIM equipped product manufacture inputs necessary information into the embedded SIM equipped product manufacturer device 510. Moreover, the embedded SIM equipped product manufacturer device 510 obtains necessary information from the embedded SIM manufacturer device 500. After that, the embedded SIM equipped product manufacturer device 510 broadcasts, to the peer-to-peer network 530, an information registration request transaction including the above-described information provided with a timestamp and an electronic signature by using a private key.

To be specific, in FIG. 19, Signal S51 represents an information input signal to the embedded SIM equipped product manufacture device 510 by the person in charge of embedded SIM equipped product manufacture. Signal S51 includes a private key and public key pair of the embedded SIM equipped product manufacturer device and information (URL, or the like) of the embedded SIM manufacturer device 500. Signal S52 is a request signal to obtain an embedded SIM number range outsourcing certificate, from the embedded SIM equipped product manufacturer device 510 to the embedded SIM manufacturer device 500. Moreover, Signal S53 is a response signal to Signal S52. Signal S52 includes the URL or the like of the embedded SIM manufacturer device 500. Signal S53 includes the embedded SIM number range outsourcing certificate. Signal S54 is an information registration request transaction signal that is broadcast by the embedded SIM equipped product manufacturer device 510 to the peer-to-peer network 530.

Figure 20:
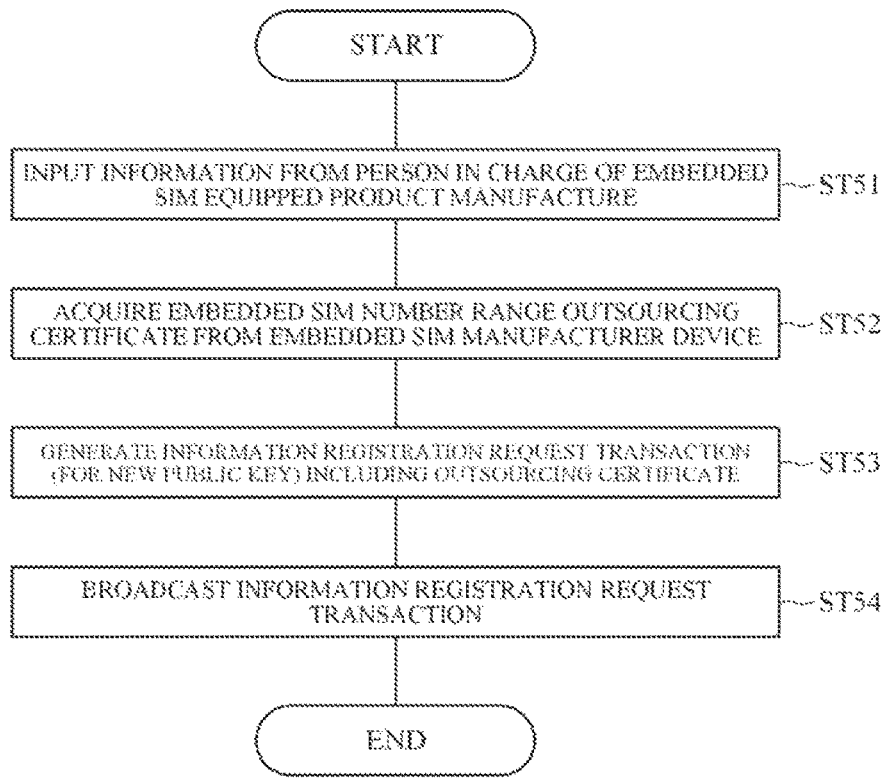
FIG. 20 is a flow diagram showing an example of a process in which the embedded SIM equipped product manufacturer device transmits an information registration request transaction signal to the peer-to-peer network.

FIG. 20 is a flow diagram showing how the embedded SIM equipped product manufacturer device 510 transmits an information registration request transaction signal to the peer-to-peer network 530 that manages the DB for embedded SIM management. Step ST51 is a step in which the embedded SIM equipped product manufacturer device 510 inputs the above-described information input by the person in charge of embedded SIM equipped product manufacture. Step ST52 is a step in which the embedded SIM equipped product manufacturer device 510 inquires the embedded SIM manufacturer device 500 about the above-described information. Step ST53 is a step in which the embedded SIM equipped product manufacturer device 510 generates an information registration request transaction (for a new public key). Step ST54 is a step in which the embedded SIM equipped product manufacturer device 510 broadcasts the generated information registration request transaction to the peer-to-peer network 530.

Figure 21:
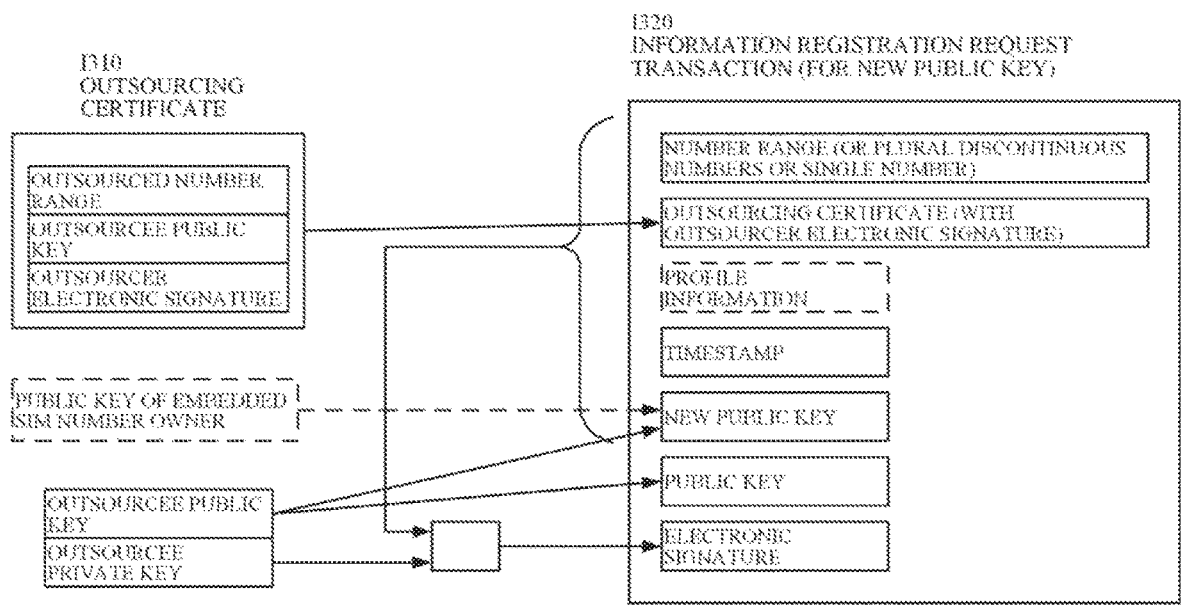
FIG. 21 is an explanatory diagram of step ST53 for generating an information registration request transaction (for a new public key), shown in FIG. 20.

FIG. 21 is an explanatory diagram of Step ST53 for generating an information registration request transaction (for a new public key). An information registration request transaction (for a new public key) I320 includes an embedded SIM number range (or plural discontinuous numbers or a single number), an outsourcing certificate (with an outsourcer electronic signature) I310, profile information, a timestamp, a new public key (an outsourcee public key), a public key (an outsourcee public key), and an electronic signature. The outsourcing certificate I310 includes an outsourced number range, an outsourcee public key, and an outsourcer electronic signature. The electronic signature included in the transaction is put on the embedded SIM number range (or plural discontinuous numbers or a single number), the outsourcing certificate (with outsourcer electronic signature), the profile information, the timestamp, and the new public key (outsourcee public key), by using an outsourcee private key. The profile information may be omitted. As the new public key, a public key of an embedded SIM number owner may be used.

Next, a configuration in which an initial information registration request transaction including a new public key for any embedded SIM number is broadcast from an initial embedded SIM equipped product owner device will be described with reference to FIGS. 22 to 25.

Figure 22:
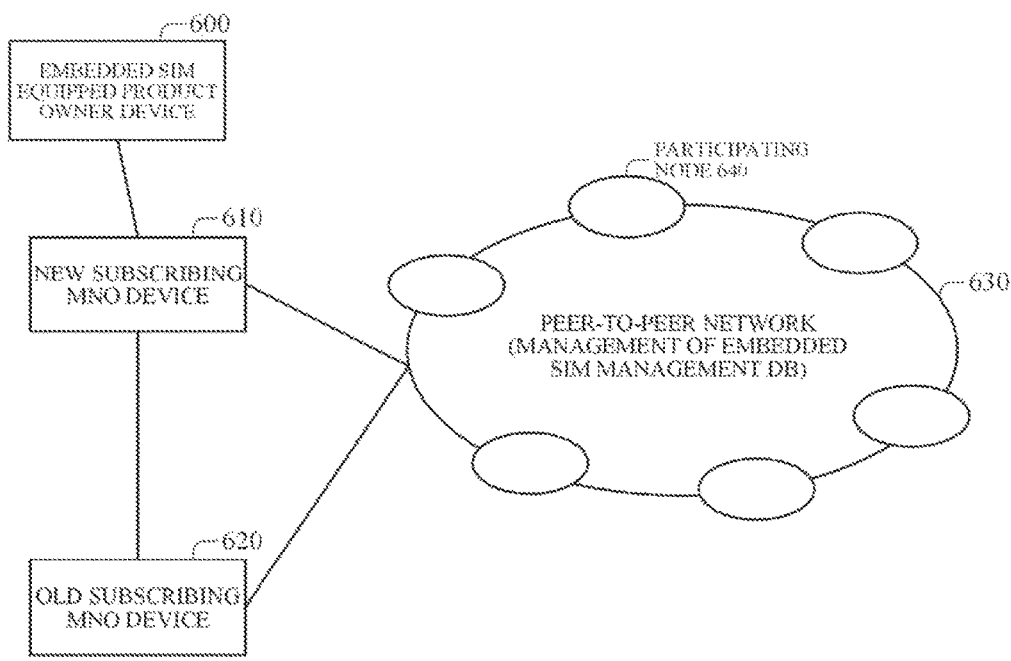
FIG. 22 is another configuration diagram of the sixth example embodiment.

With reference to FIG. 22, the system includes an embedded SIM equipped product owner device 600, a new contract MNO device 610, an old contract MNO device 620, a peer-to-peer network 630 that manages a DB for embedded SIM management, and a plurality of participating nodes 640 participating in the peer-to-peer network 630.

Figure 23:
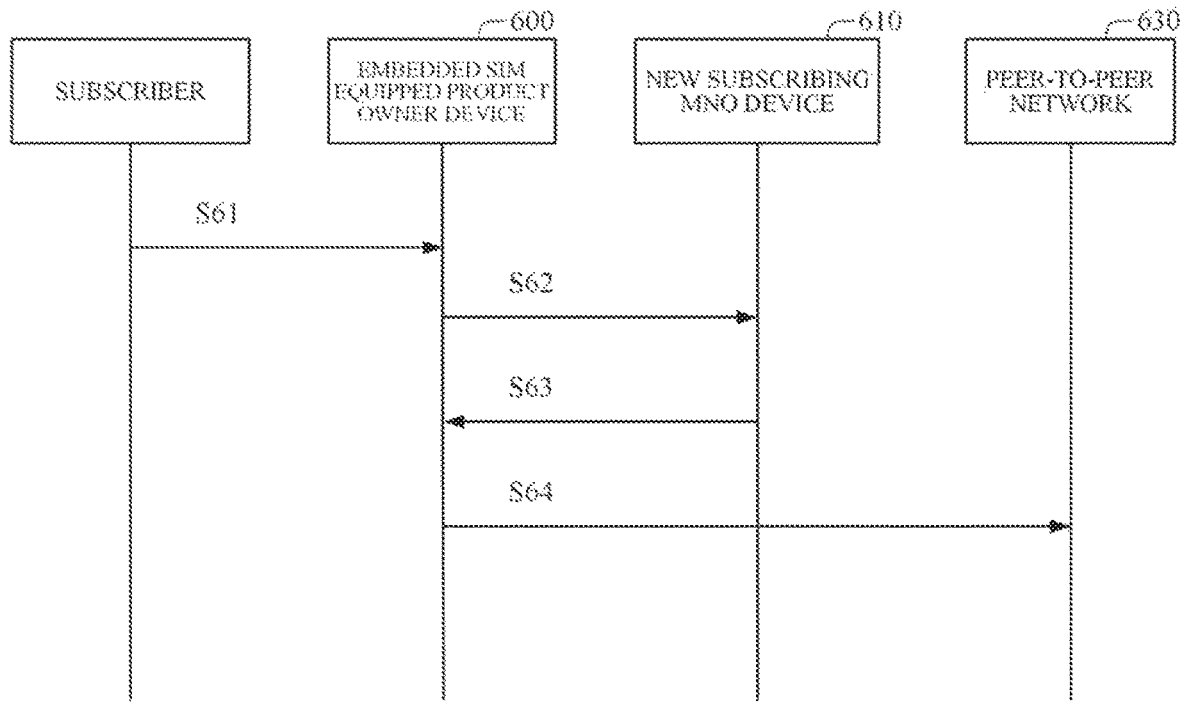
FIG. 23 is a signal sequence diagram showing an example of a process to broadcast an information registration request transaction from an embedded SIM equipped product owner device to the peer-to-peer network.

FIG. 23 is a signal sequence diagram showing how the embedded SIM equipped product owner device 600 broadcasts an information registration request transaction to the peer-to-peer network 630 managing the DB for embedded SIM management. As shown in FIG. 23, a subscriber inputs necessary information into the embedded SIM equipped product owner device 600. Moreover, the embedded SIM equipped product owner device 600 acquires necessary information from the new contract MNO device 610. After that, the embedded SIM equipped product owner device 600 broadcasts an information registration request transaction including the above-described information provided with a timestamp and an electronic signature by using a private key, to the peer-to-peer network 630.

To be specific, in FIG. 23, Signal S61 represents an information input signal that is input by the subscriber into the embedded SIM equipped product owner device 600. Signal S61 includes a private key and public key pair of the subscriber and information (URL, or the like) of the new contract MNO device 610. Signal S62 is a request signal to obtain profile information, a subcontract certificate (and an outsourcing certificate) and so on, sent from the embedded SIM equipped product owner device 600 to the new contract MNO device 610. Moreover, Signal S63 is a response signal to Signal S62. Signal S62 includes the URL or the like of the new contract MNO device 610. Signal S63 includes a subcontract certificate (and an outsourcing certificate). Signal S64 is an information registration request transaction signal that is broadcast from the embedded SIM equipped product owner device 600 to the peer-to-peer network 630.

Figure 24:
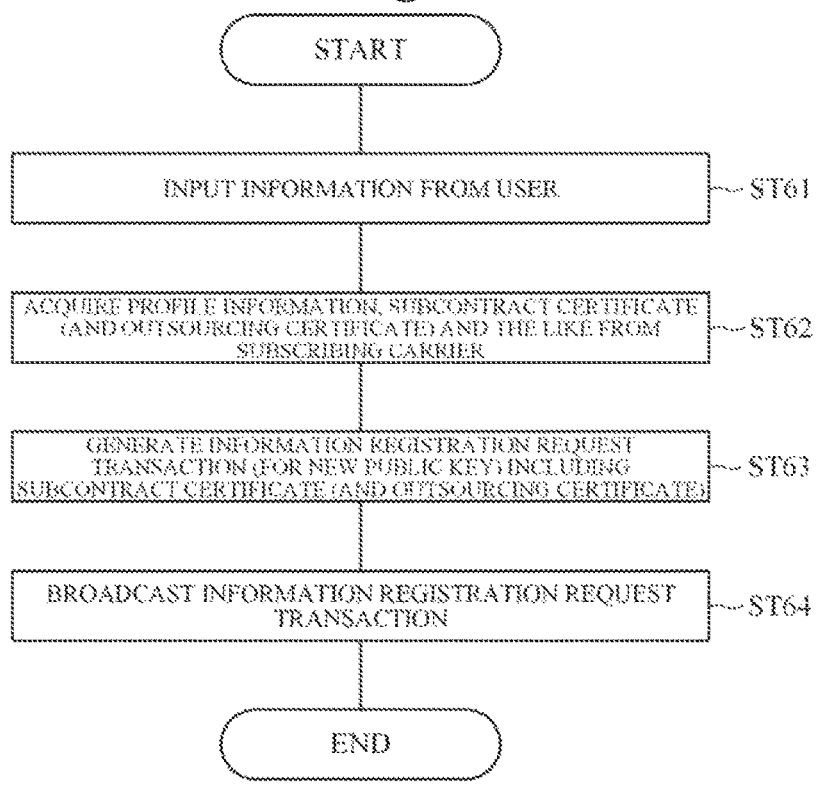
FIG. 24 is a flow diagram showing an example of a process in which the embedded SIM equipped product owner device transmits an information registration request transaction signal to the peer-to-peer network.

FIG. 24 is a flow diagram showing how the embedded SIM equipped product owner device 600 transmits an information registration request transaction signal to the peer-to-peer network 630 that manages the DB for embedded SIM management. Step ST61 is a step in which the embedded SIM equipped product owner device 600 inputs the above-described information input by the subscriber. Step ST62 is a step in which the embedded SIM equipped product owner device 600 inquires the new contract MNO device 610 about the above information. Step ST63 is a step in which the embedded SIM equipped product owner device 600 generates an information registration request transaction (for a new public key). Step ST64 is a step in which the embedded SIM equipped product owner device 600 broadcasts the generated information registration request transaction to the peer-to-peer network 630.

Figure 25:
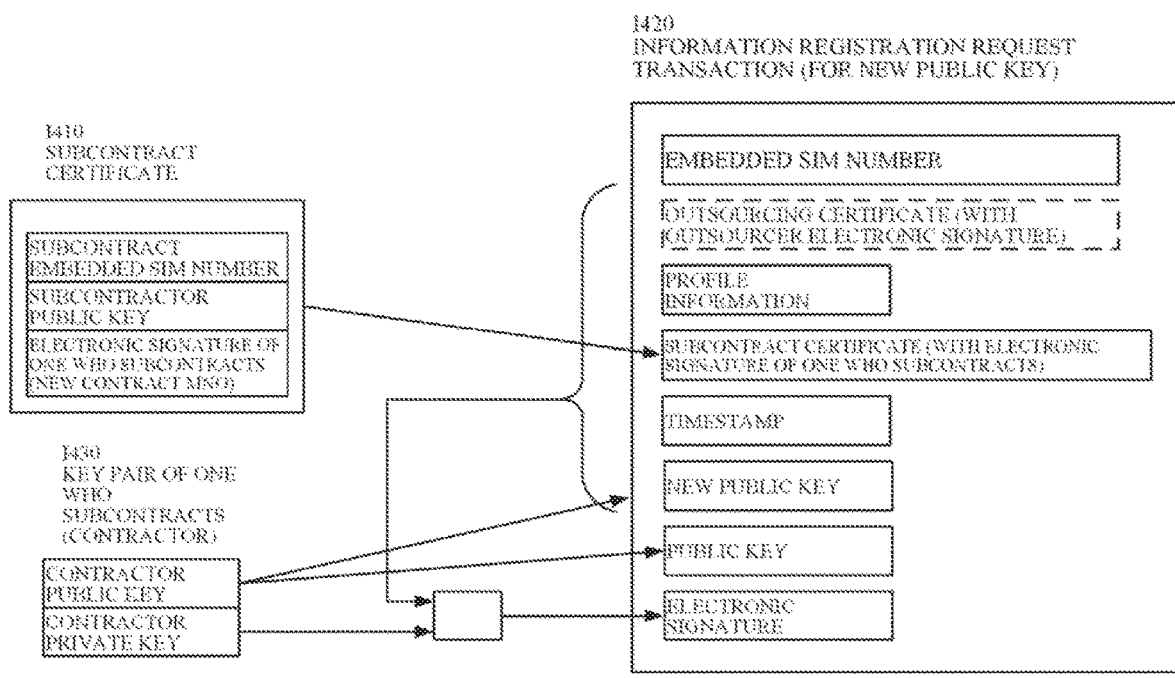
FIG. 25 is an explanatory diagram of step ST63 for generating an information registration request transaction (for a new public key), shown in FIG. 24.

FIG. 25 is an explanatory diagram of Step ST63 for generating an information registration request transaction (for a new public key). An information registration request transaction (for a new public key) I420 includes an embedded SIM number, an outsourcing certificate (with an outsourcer electronic signature), profile information, a subcontract certificate (with an electronic signature of one who subcontracts) I410, a timestamp, a new public key (a subscriber public key), a public key (subscriber public key), and an electronic signature. The subcontract certificate I410 includes a subcontracted embedded SIM number, a subcontractor public key, and an electronic signature of one who subcontracts (a new contract MNO). The electronic signature included in the transaction is put on the embedded SIM number, the outsourcing certificate (with the outsourcer electronic signature), the profile information, the subcontract certificate (with the electronic signature of one who subcontracts), the timestamp, and the new public key (the subscriber public key), by using a subscriber private key. The outsourcing certificate may be omitted. Herein, I430 denotes a key pair of the subcontractor (subscriber), which includes a subscriber public key and a subscriber private key.

Next, the operation of the participating node 440, 540, 640 will be described with reference to FIGS. 26 to 30. FIGS. 26 to 30 are flowcharts showing an example of processing by the participating node 440, 540, 640 participating in the peer-to-peer network. The processing is equivalent to the processing by the blockchain management part 2g of the node device 2a shown in FIG. 45.

With reference to FIGS. 26 to 30, the blockchain management part 2g receives an information registration request transaction broadcast from the information registrant device 3 (the embedded SIM manufacturer device 400 in FIG. 14, the embedded SIM equipped product manufacturer device 510 in FIG. 18, the embedded SIM equipped product owner device 600 in FIG. 22) (ST71). Then, the blockchain management part 2g executes a process that is not shown in FIG. 26 such as judgment of the validity of an electronic signature and, if the electronic signature is valid, the blockchain management part 2g retrieves, from the blockchain, all the previously approved information registration request transactions (and transactions in the latest not-generated block) relating to the same embedded SIM number (or number range or discontinuous numbers) as an embedded SIM number (or number range or discontinuous numbers) included in the currently received information registration request transaction (ST75).

Next, the blockchain management part 2g judges whether or not the currently received information registration request transaction is a first transaction relating to the embedded SIM number (or number range or discontinuous numbers) based on the retrieval result (ST76). If the transaction is not a first transaction, the blockchain management part 2g executes the process that is not shown in FIG. 26. On the other hand, if the transaction is a first transaction, the blockchain management part 2g executes the following process.

The blockchain management part 2g judges whether or not the received information registration request transaction includes a certificate and, if a certificate is included, judges the kind of the certificate (ST77). Then, the blockchain management part 2g executes a process corresponding to the judgment result.

Figure 27:
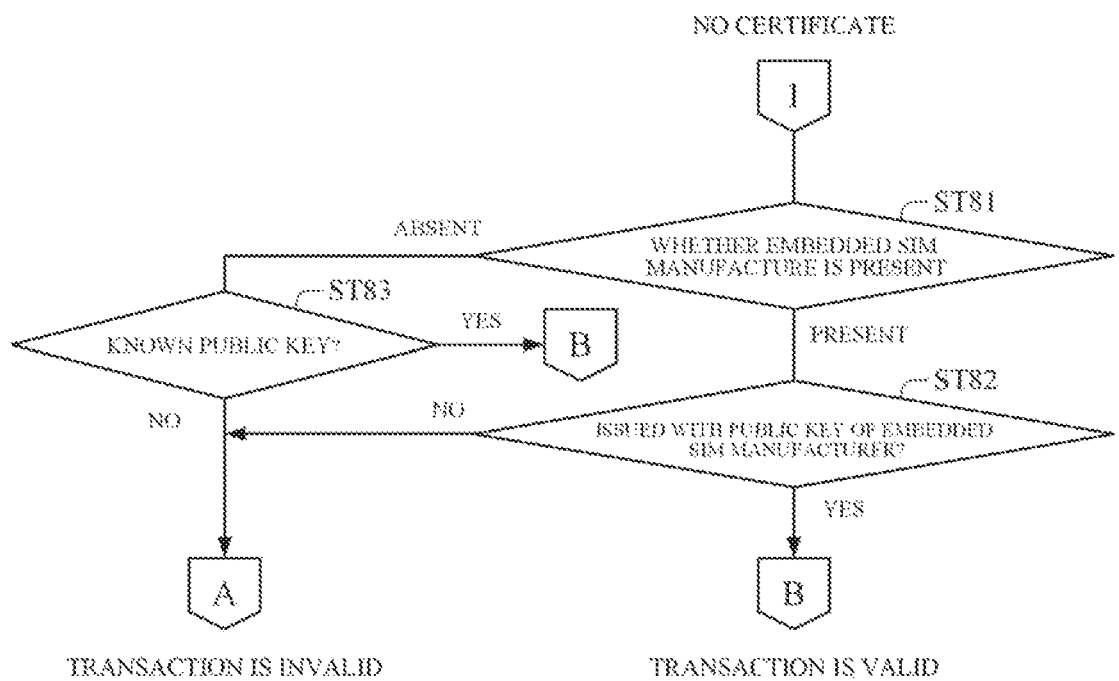
FIG. 27 is a flowchart showing an example of a process performed by a participating node which participates in the peer-to-peer network.

First, in a case where a certificate is not included, the blockchain management part 2g judges the transaction as a valid transaction if an embedded SIM manufacturer is present and the transaction has been issued with its public key or if an embedded SIM manufacturer is absent and the transaction is issued with a known public key, whereas the blockchain management part 2g judges the transaction as an invalid transaction in the other cases (ST81, ST82, ST83 in FIG. 27).

Figure 28:
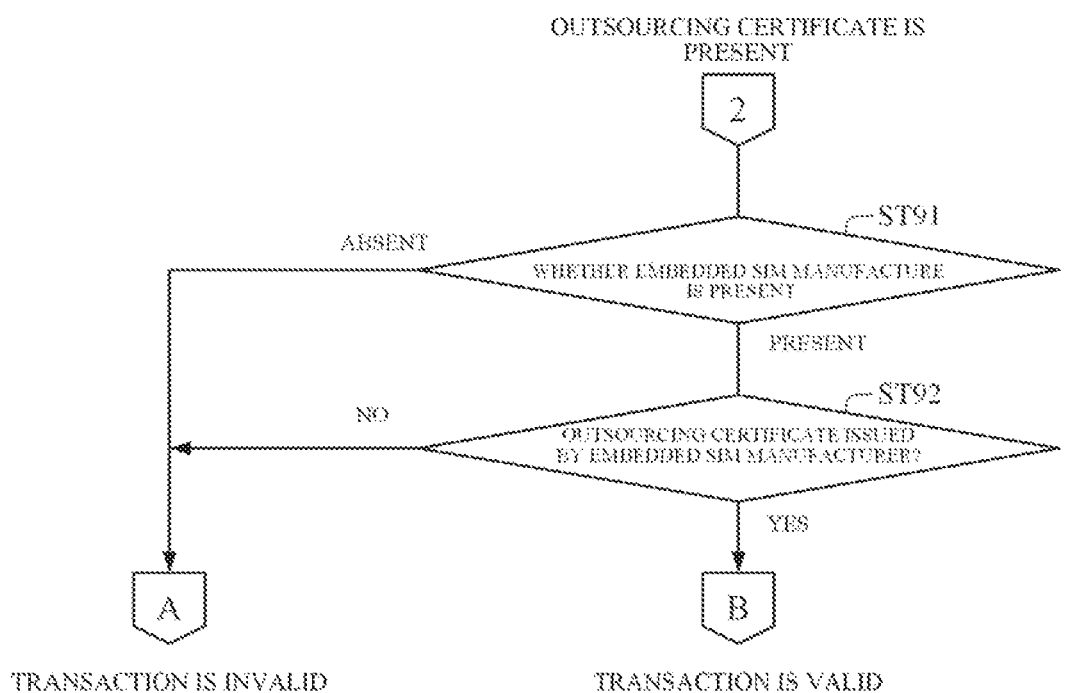
FIG. 28 is a flowchart showing an example of a process performed by a participating node which participates in the peer-to-peer network.

Further, in a case where an outsourcing certificate is included, the blockchain management part 2g judges the transaction as a valid transaction if an embedded SIM manufacturer is present and the outsourcing certificate has been issued thereby, whereas the blockchain management part 2g judges the transaction as an invalid transaction in the other cases (ST91, ST92 in FIG. 28).

Further, in a case where a subcontract certificate is included, the blockchain management part 2g judges the transaction as a valid transaction if one who subcontracts is present and the subcontract certificate has been issued thereby, whereas the blockchain management part 2g judges the transaction as an invalid transaction in the other cases (ST101, ST102 in FIG. 29).

Further, in a case where both an outsourcing certificate and a subcontract certificate are included, if one who subcontracts is present and the subcontract certificate has been issued thereby, the blockchain management part 2g judges the transaction as a valid transaction by the processing shown in FIG. 29 in the same manner as in the case where a subcontract certificate is included. If one who subcontracts is absent, or if one who subcontracts is present but the subcontract certificate has not been issued thereby, the blockchain management part 2g judges the transaction as an invalid transaction (ST111, ST112 in FIG. 30).

Figure 26:
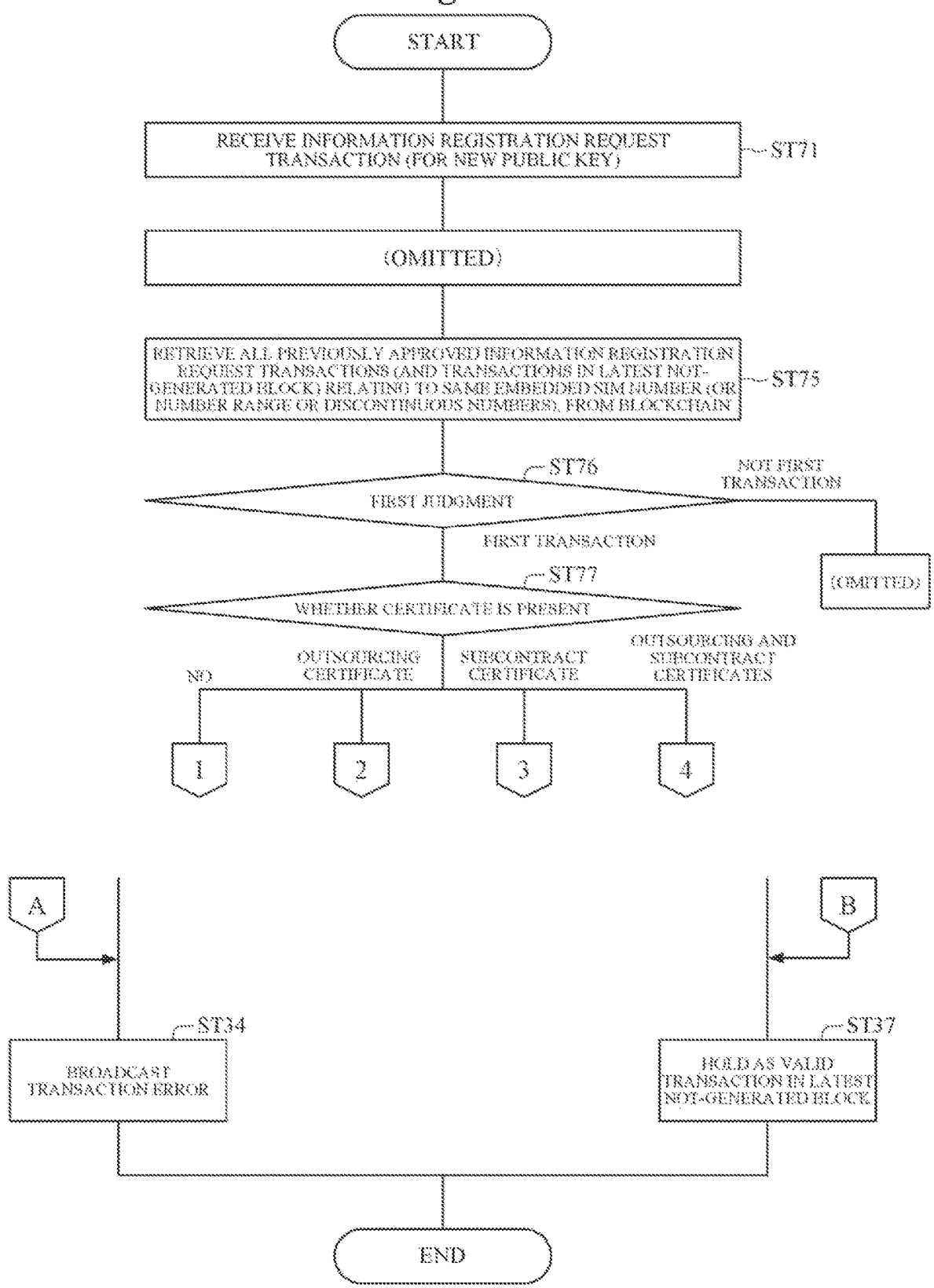
FIG. 26 is a flowchart showing an example of a process performed by a participating node which participates in the peer-to-peer network.

In the case of judging as a valid transaction in FIGS. 27 to 30, the blockchain management part 2g handles the currently received information registration request transaction as a valid one and holds the transaction in the latest not-generated block (ST37 in FIG. 26). On the other hand, in the case of judging as an invalid transaction in FIGS. 27 to 30, the blockchain management part 2g handles the currently received information registration request transaction as an invalid one and broadcasts a transaction error to the peer-to-peer network (ST34 in FIG. 26).

Seventh Example Embodiment

In this example embodiment, an embedded SIM management system that is robust against an attack that, for the purpose of launching a DoS attack against a communication carrier, a malicious third party broadcasts an information registration request transaction with many and unspecified embedded SIM numbers as the same profile information will be described.

Figure 31:
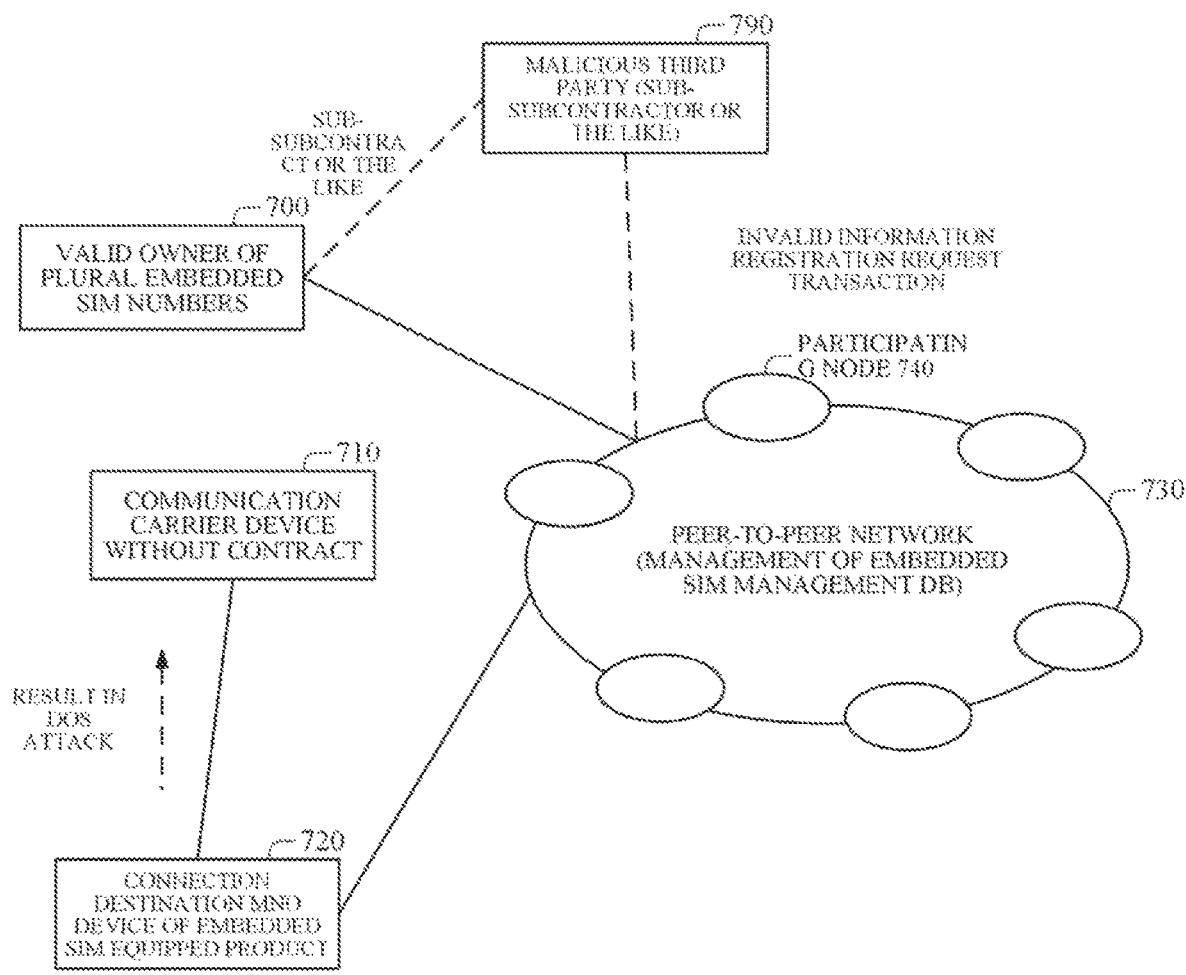
FIG. 31 is a diagram showing an example of a scene in which a malicious third party broadcasts an invalid information registration request transaction.

FIG. 31 shows a scene in which a person who has been, for example, sub-subcontracted by a valid owner 700 of a plurality of embedded SIM numbers becomes a malicious third party 790 and, in order to associate many and unspecified embedded SIM numbers with profile information of a communication carrier device 710 which has no contract, broadcasts an invalid information registration request transaction. When such an invalid information registration request transaction is registered as a valid transaction onto a number portability DB of each participating node 740 in a peer-to-peer network 730, the peer-to-peer network 730 returns an invalid response to an inquiry by a connection destination MNO device 720 of an embedded SIM equipped product, and consequently, the connection destination MNO device 720 of the embedded SIM equipped product launches a DoS attack against the communication carrier device 710 having no contract.

Figure 32:
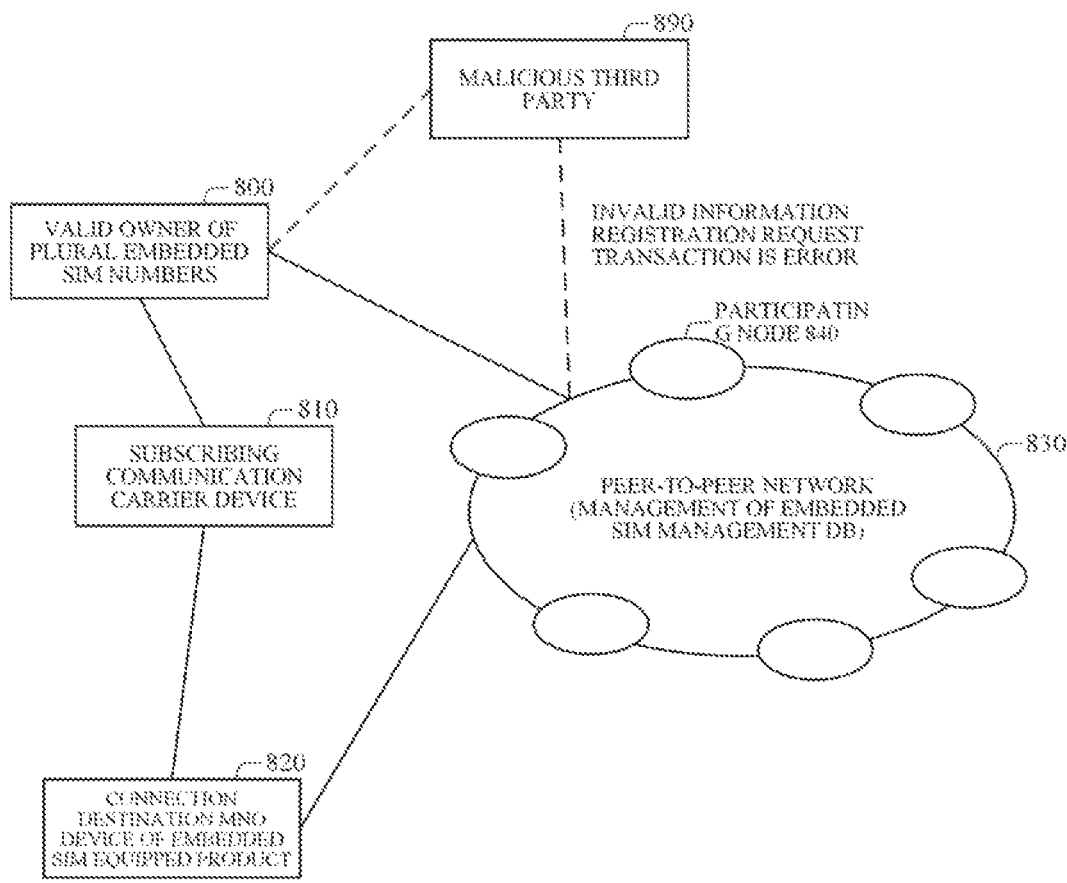
FIG. 32 is a configuration diagram of a seventh example embodiment of the present invention.

FIG. 32 is a configuration diagram of an embedded SIM management system according to this example embodiment, which includes a valid owner (subscriber device) 800 of (a plurality of) embedded SIM numbers, a subscribing communication carrier device 810, a connection destination MNO device 820 of an embedded SIM equipped product, a peer-to-peer network 830, and a participating node 840 participating therein. Reference numeral 890 denotes a malicious third party.

Figure 33:
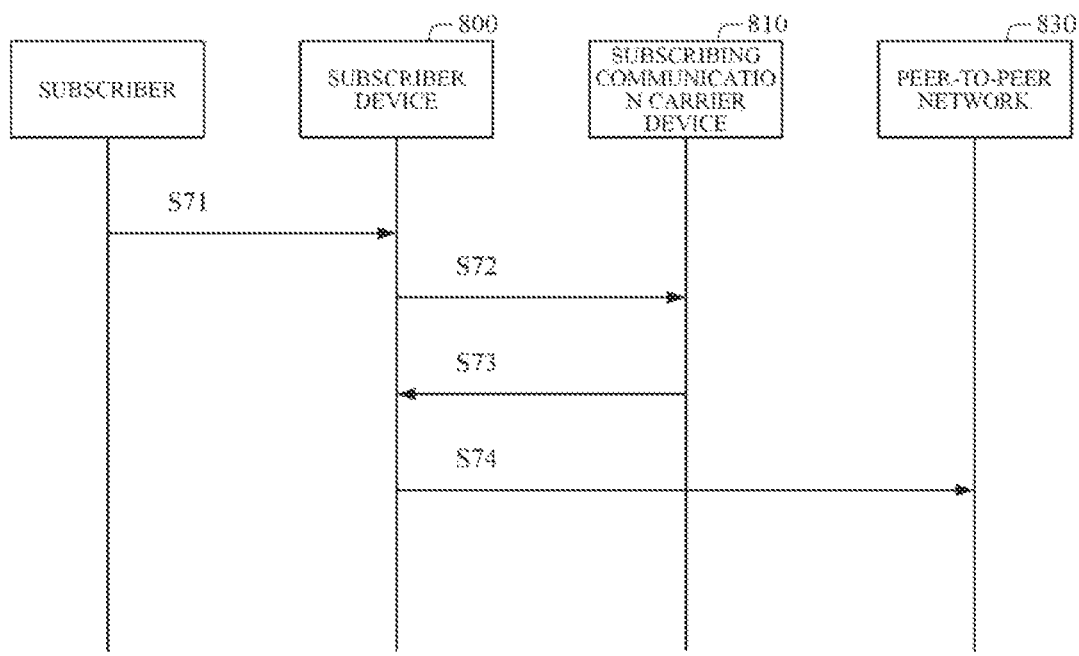
FIG. 33 is a signal sequence diagram showing an example of a process to broadcast an information registration request transaction from a subscriber device to a peer-to-peer network.

FIG. 33 is a signal sequence diagram showing how an information registration request transaction is broadcast from the subscriber device 800 to the peer-to-peer network 830 that manages the embedded SIM management DB. As shown in FIG. 33, the subscriber inputs necessary information into the subscriber device 800. Moreover, the subscriber device 800 obtains necessary information from the subscribing communication carrier device 810. After that, the subscriber device 800 broadcasts, to the peer-to-peer network 830, an information registration request transaction including the above-described information provided with a timestamp and an electronic signature using a private key.

To be specific, in FIG. 33, Signal S71 represents an information input signal from the subscriber to the subscriber device 800. Signal S71 includes a private key and public key pair of the subscriber and information (URL, or the like) of the subscribing communication carrier device 810. Signal S72 is a request signal to obtain profile information, a contract certificate (with an electronic signature of the subscribing carrier) and so on, from the subscriber device 800 to the subscribing communication carrier device 810. Moreover, Signal S73 is a response signal to Signal S72. Signal S72 includes the URL of the subscribing communication carrier device 810, and the like. Signal S73 includes profile information and a contract certificate (with an electronic signature of the subscribing carrier). Signal S74 is an information registration request transaction signal that is broadcast from the subscriber device 800 to the peer-to-peer network 830.

FIG. 34 is a flow diagram showing how the subscriber device 800 transmits an information registration request signal to the peer-to-peer network 830 that manages embedded SIM management DB. Step ST121 is a step in which the subscriber device 800 inputs the above-described information input by the user. Step ST122 is a step in which the subscriber device 800 inquires the subscribing communication carrier device 810 about the above-described information. Step ST123 is a step in which the subscriber device 800 generates an information registration request transaction. Step ST124 is a step in which the subscriber device 800 broadcasts the generated information registration request transaction to the peer-to-peer network 830.

FIG. 35 is an explanatory diagram of Step ST123 for generating an information registration request transaction. An information registration request transaction I620 includes an embedded SIM number, profile information, a contract certificate (with an electronic signature of a subscribing carrier), a timestamp, a public key (a subscriber public key), and an electronic signature. A contract certificate (with an electronic signature of a subscribing carrier) I610 includes an embedded SIM number, a subscribing carrier public key, a subscriber public key, and confidence information (encrypted with the subscribing carrier public key). The electronic signature included in the transaction is put, by using a subscriber private key, on the embedded SIM number, the profile information, the contract certificate (with the electronic signature of the subscribing carrier) and the timestamp.

Figure 36:
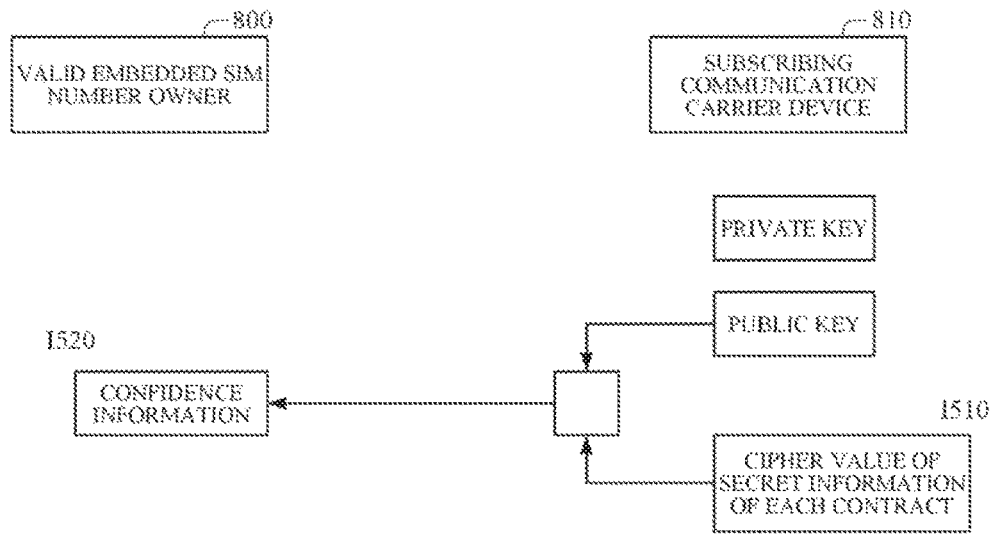
FIG. 36 is an explanatory diagram of confidence information (encrypted with a contract carrier public key) included in a contract certificate shown in FIG. 35.

FIG. 36 is an explanatory diagram of confidence information (encrypted with a subscribing carrier public key) I520 included in the contract certificate I610. The confidence information is made in the subscribing communication carrier device 810 by encrypting a cipher value I510 of secret information for each subscription (secret information known only to the user and the subscribing carrier) with a private key of the subscribing communication carrier, and is given to a valid embedded SIM number owner.

Figure 37:
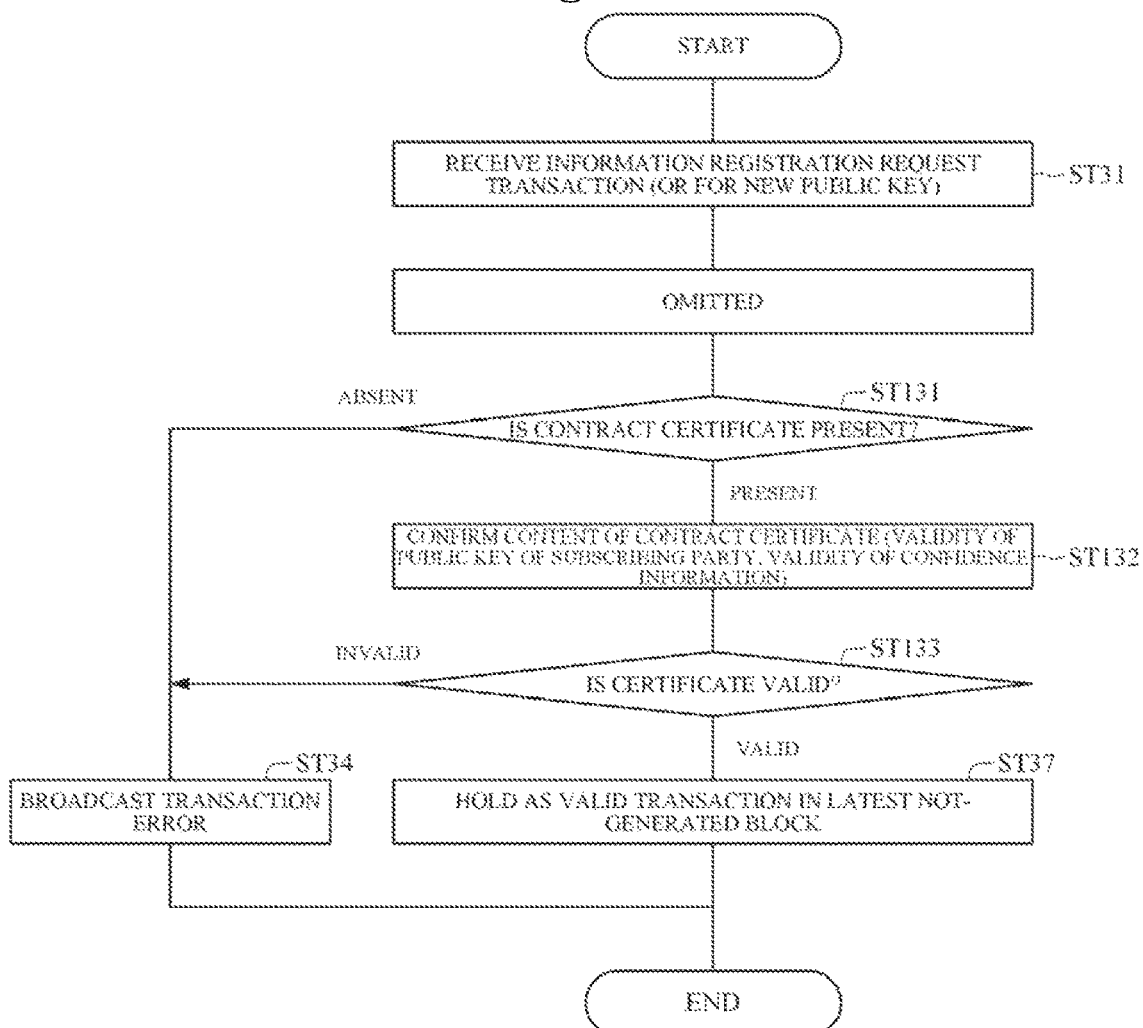
FIG. 37 is a flowchart showing an example of a process performed by a participating node which participates in the peer-to-peer network.

Next, the operation of the participating node 840 will be described with reference to FIG. 37. FIG. 37 is a flowchart showing an example of processing by the participating node 840 participating in the peer-to-peer network. The processing is equivalent to the processing by the blockchain management part 2g of the node device 2a shown in FIG. 45.

With reference to FIG. 37, upon receiving an information registration request transaction broadcast from the information registrant device 3 (the valid owner (subscriber device) 800 of plural embedded SIM numbers or the malicious third party 890 in FIG. 32) (ST31 or ST71), the blockchain management part 2g executes a process that is not shown in FIG. 37 such as judgment of the validity of the electronic signature and, if the electronic signature is valid, judges whether or not the currently received information registration request transaction includes a contract certificate (ST131). In a case where a contract certificate is not included, the blockchain management part 2g handles the currently received information registration request transaction as an invalid one and broadcasts a transaction error to the peer-to-peer network (ST34).

On the other hand, in a case where a contract certificate is included, the blockchain management part 2g confirms the content of the contract certificate (ST132). In confirmation of the content of the contract certificate, the blockchain management part 2g confirms the validity of a public key of a subscription party associated with the embedded SIM number and the validity of certificate information. In the case of judging that the contract certificate is invalid (ST133, invalid), the blockchain management part 2g handles the currently received information registration request transaction as an invalid one and broadcasts a transaction error to the peer-to-peer network (ST34). On the other hand, in the case of judging that the contract certificate is valid (ST133, valid), the blockchain management part 2g handles the currently received information registration request transaction as a valid one and holds it in the latest not-generated block (ST37).

Thus, in this example embodiment, an information registration request transaction includes a subscription certification including confidence information made by encrypting secret information known only to the user and the subscribing carrier with the public key of the subscribing carrier. Because a malicious third party does not know the confidence information, the malicious third party cannot issue an information registration request transaction including the confidence information. Therefore, it is possible to prevent the influence by the invalid information registration request transaction described above.

Eighth Example Embodiment

In above example embodiments, update and inquiry of the content of the embedded SIM management DM written into a blockchain has been mainly described. In this example embodiment, a remote setup method by using the OTA technology to an actual embedded SIM will be described with reference to FIGS. 38 to 43.

With reference to FIG. 38, an embedded SIM management system according to this example embodiment includes an embedded SIM equipped product owner device 900, an embedded SIM equipped product device 910, a product installation location MNO device 920, a subscribing MNO device 930, a peer-to-peer network 940 that manages a DB for embedded SIM management, and a plurality of participating nodes 950 that participate in the peer-to-peer network 940.

FIG. 39 shows an example of an information registration request transaction generated in this example embodiment. According to FIG. 39, an information registration request transaction in this example embodiment includes an embedded SIM number, profile information, a contract certificate, a timestamp, a public key, and an electronic signature. Moreover, the profile information includes a contract MNO-ID, a contract IMSI, a contract MSISDN, a remote setup program code (a program code), and a profile setup status. That is, according to FIG. 39, new information elements in this example embodiment are a remote setup program code and a profile setup status managed for each use contract MNO.

Herein, a remote setup program code of the information elements shown in FIG. 39 is held together with other information of a transaction in each of the participating nodes 950 participating in the peer-to-peer network 940, and automatically executed based on a rule given for the network and a corresponding program code. The rule given for the network is such as a contract fulfillment automatic implementation rule of a smart contract in Ethereum described before (Non-Patent Document 2). The program code herein is a program code mainly for prompting the product installation location MNO device (that is, an MNO device to which the product connects) to perform remote setup of a profile by the OTA technology of the embedded SIM. As will be described later, the remote setup program code is executed in accordance with a profile setup request transaction having been received to generate an embedded SIM remote setup instruction signal that prompts remote setup of a profile by the OTA technology of the embedded SIM. The embedded SIM remote setup instruction signal generated by the remote setup program code is transmitted to the product installation location MNO device, and consequently, remote setup of the profile by the OTA technology is prompted.

Further, the profile setup status is a status whether a profile has been remotely set up on the actual embedded SIM is performed. The profile setup status includes "not set," "setup requesting," "already set," and the like.

Figure 40:
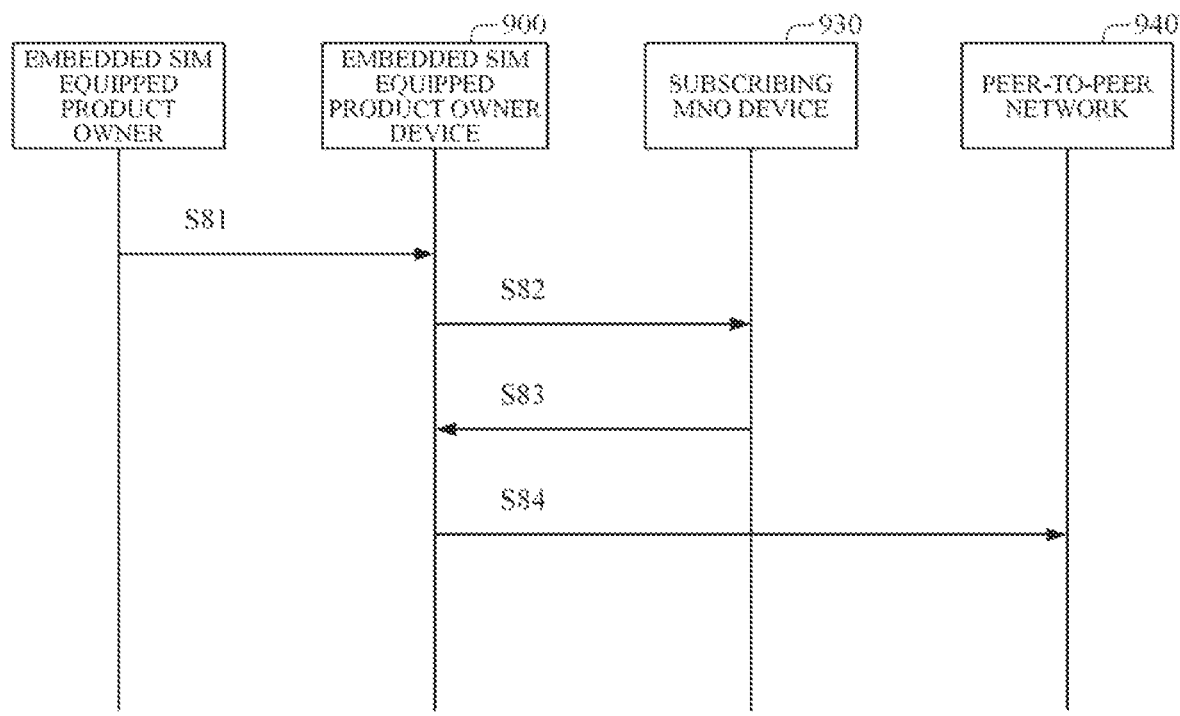
FIG. 40 is a signal sequence diagram showing an example of a process in which an embedded SIM equipped product owner device 900 broadcasts an information registration request transaction including new information (a remote setup program code, a profile setup status)

FIG. 40 is a signal sequence diagram showing how the embedded SIM equipped product owner device 900 broadcasts an information registration request transaction including new information (remote setup program code, profile setup status). As shown in FIG. 40, the embedded SIM equipped product owner inputs necessary information into the embedded SIM equipped product owner device 900. Moreover, the embedded SIM equipped product owner device 900 obtains necessary information from the subscribing MNO device 930. After that, the embedded SIM equipped product owner device 900 broadcasts an information registration request transaction including the above-described information provided with a timestamp and an electronic signature using a private key, to the peer-to-peer network 940.

To be specific, in FIG. 40, Signal S81 represents a signal for the owner of an embedded SIM equipped product to input contract MNO information or the like into the embedded SIM equipped product owner device 900 managed by the owner. Signal S82 represents a signal for the embedded SIM equipped product owner device 900 to inquire the subscribing MNO device 930 about necessary information. Moreover, Signal S83 represents a response signal to Signal S82, from the subscribing MNO device 930. Signal S82 includes an embedded SIM number (eUICC-ID), or the like. Signal S83 includes profile information for subscription. The profile information included by Signal S83 includes a contract MNO-ID, a contract IMSI, a contract MSISDN, a remote setup program code, a contract certificate, and so on. Signal S84 represents an information registration request transaction signal broadcast from the embedded SIM equipped product owner device 900 to the peer-to-peer network 940. Signal S84 includes an information setup request transaction in which the information included in Signal S83 and the profile information are made to be "not set" and the information are electronically signed, and a public key and the electronic sign are provided.

Figure 41:
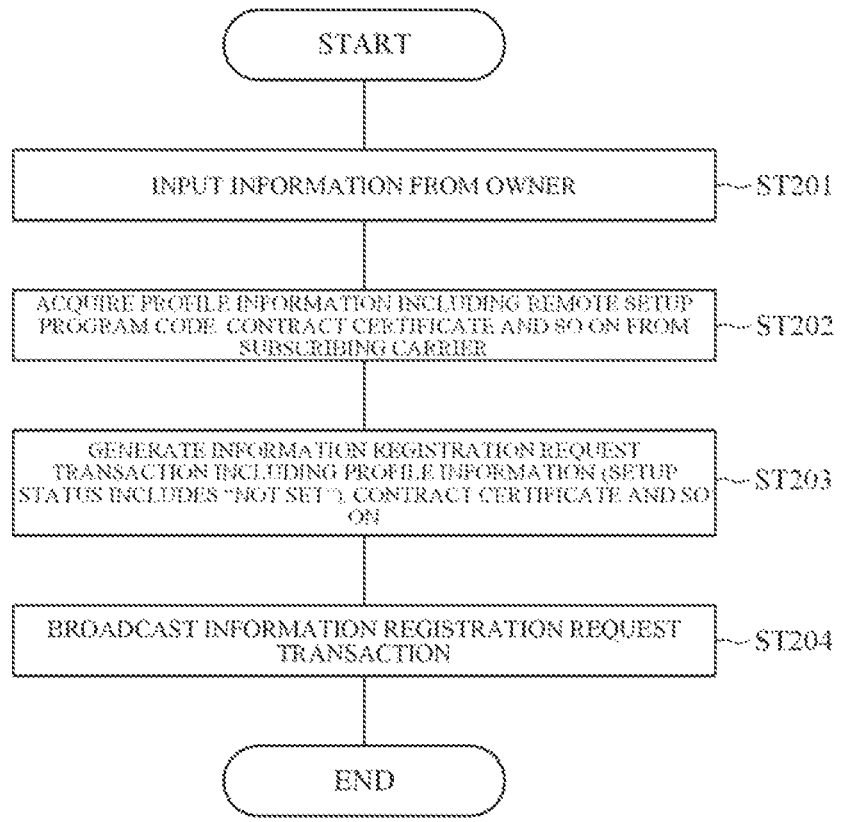
FIG. 41 is a flow diagram showing an example of a process in which the embedded SIM equipped product owner device transmits an information registration request transaction signal to the peer-to-peer network.

FIG. 41 is a flow diagram showing how the embedded SIM equipped product owner device 900 transmits an information registration request transaction signal to the peer-to-peer network 940 that manages the embedded SIM management DB. Step ST201 is a step in which the embedded SIM equipped product owner device 900 receives an input of information from the embedded SIM equipped product owner. Step ST202 is a step in which the embedded SIM equipped product owner device 900 inquires the subscribing MNO device 930 about necessary information. Step S203 is a step in which the embedded SIM equipped product owner device 900 generates an information registration request transaction. Step ST204 is a step in which the embedded SIM equipped product owner device 900 broadcasts the generated information registration request transaction to the peer-to-peer network 830.

Figure 42:
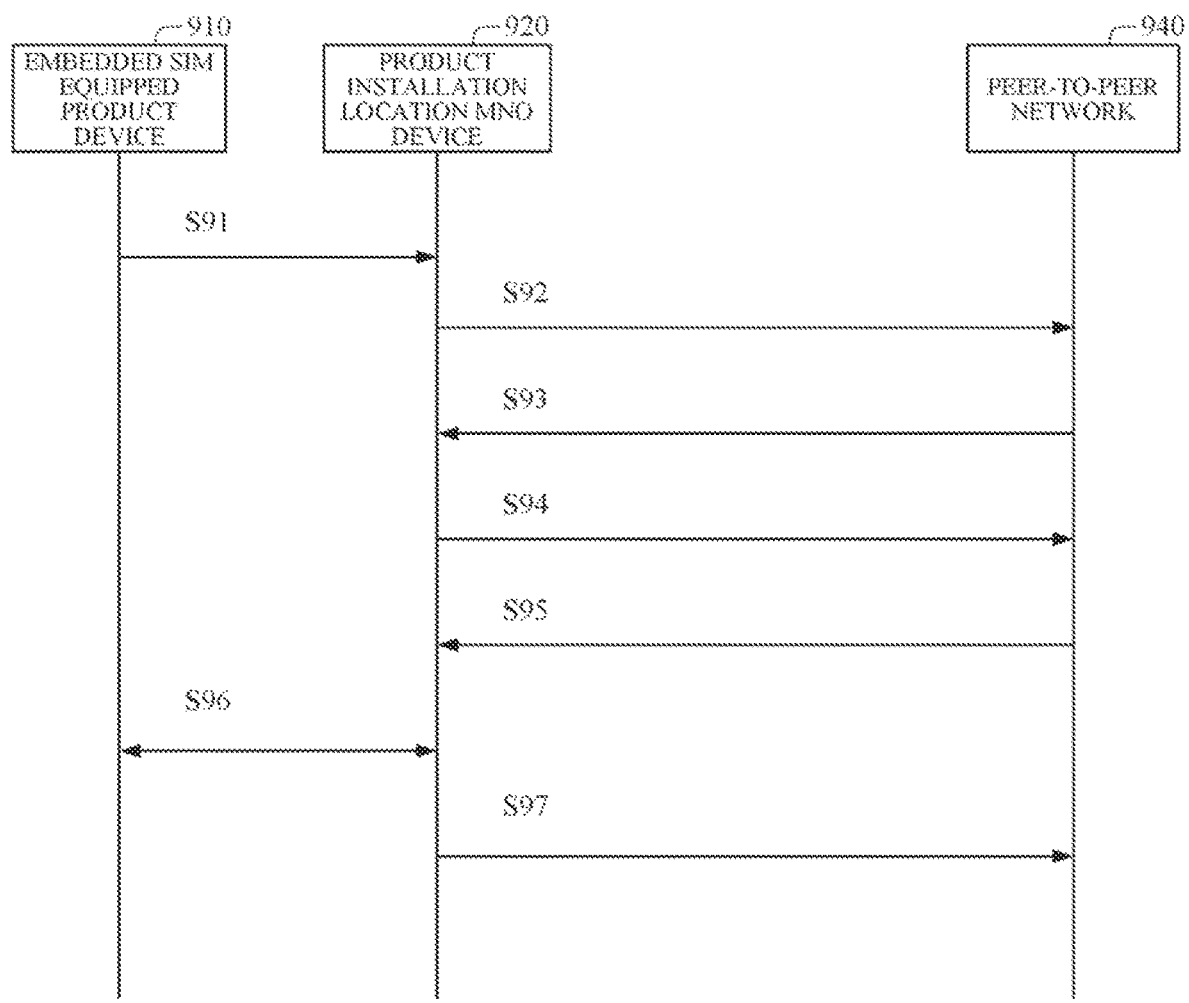
FIG. 42 is a signal sequence diagram showing an example of a process in which an embedded SIM equipped product device is initially connected to a product installation location MNO device and then, through profile information remote setup by the OTA technology to an actual embedded SIM, broadcasts an information registration request transaction for rewiring the result of setup.

FIG. 42 is a signal sequence diagram showing how the embedded SIM equipped product device 910 initially connects to the product installation location MNO device 920, performs remote setup of profile information by the OTA technology onto the actual embedded SIM, and broadcasts an information registration request transaction for rewriting the result of the setup.

Signals S91 to S93 in FIG. 42 are the same as Signal S11 to S13 in FIG. 7. Therefore, a detailed description will be omitted.

Signal S94 in FIG. 42 represents a signal for broadcasting a profile setup request transaction (a request for update of a setup status) to the embedded SIM broadcast from the product installation location (connection location) MNO device 920 to the peer-to-peer network 940. Signal S95 represents an embedded SIM remote setup instruction signal to the product installation location MNO device (a source of a request for update of a setup status) 920 from any of the participating nodes 950 participating in the peer-to-peer network 940. The embedded SIM remote setup instruction signal is automatically generated by the remote setup program code executed in accordance with a profile setup request transaction. Signal S96 represents a series of signals for actual remote setup by the OTA technology between the product installation location MNO device (connection MNO device) 920 and the embedded SIM equipped product device 910. Signal S97 represents an information registration request transaction signal as a result of remote setup broadcast from the product installation location MNO device 920 to the peer-to-peer network 940.

Figure 43:
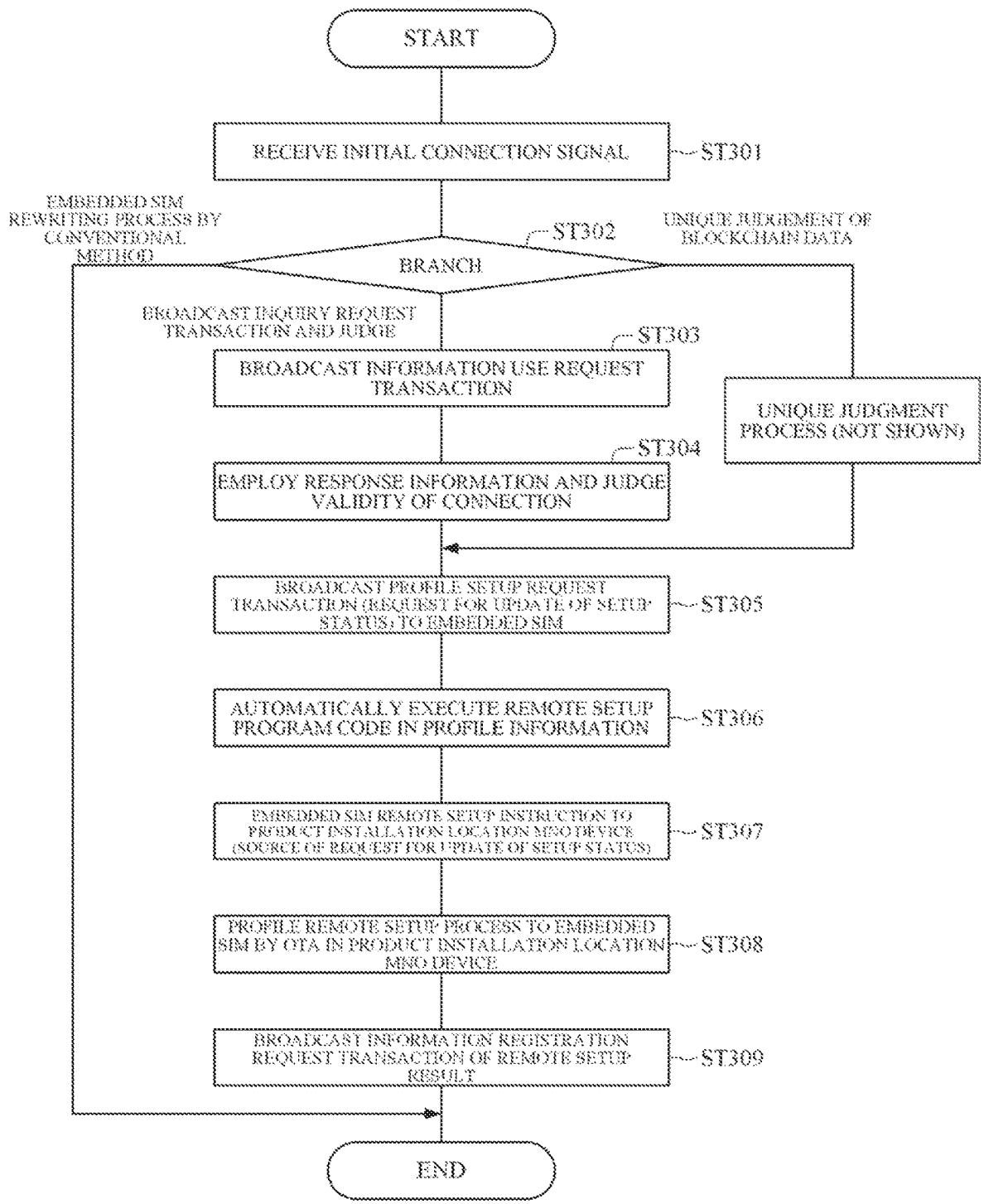
FIG. 43 is a flow diagram showing an example of a process in which the product installation location MNO device transmits an information registration request transaction signal to the peer-to-peer network.

FIG. 43 is a flow diagram showing how the product installation location MNO device 920 transmits an information registration request transaction signal to the peer-to-peer network 940 that manages the embedded SIM management DB. Step ST301 is a step for receiving an initial connection signal in the product installation location MNO device 920. Step ST302 is a process branching step. In Step ST302, the process branches based on whether the product installation location MNO device 920 performs an embedded SIM rewriting process by a conventional method (left branch in FIG. 43) or whether the product installation location MNO device 920 performs unique judgment using the cache of blockchain data (right branch in FIG. 43), or the product installation location MNO device 920 performs judgment by broadcasting an information use request transaction to the peer-to-peer network 940 (center branch in FIG. 43). Step ST303 is a step in which the product installation location MNO device 920 broadcasts an information use request transaction for inquiring about setup profile information associated with the eUICC-ID of the embedded SIM installed in the device having emitted the initial connection signal (the embedded SIM equipped product device 910) to the peer-to-peer network 940. Step ST304 is a step in which the product installation location MNO device 920 waits for a response signal to the broadcast signal and adopts any of the response contents and a response node from among them. Step ST304 is a step for judging the validity of the information in the initial connection signal received at Step ST301 based on the adopted response content. Step ST305 is a step for broadcasting a profile setup request transaction (a request for update of a setup state) to the embedded SIM. Step S306 is a step in which each of the participating nodes 950 automatically executes the remote setup program code in the profile information according to the profile setup request transaction. Step S307 is a step for issuing an embedded SIM remote setup instruction from one of the participating nodes 950 participating in the peer-to-peer network 940 to the product installation location MNO device (the source of request for update of the setup state) 920. Step ST308 is a step for performing profile remote setup to the embedded SIM (of the embedded SIM equipped product device 910) by the OTA technology in the product installation location MNO device 920. Step ST309 is a step for broadcasting the information registration request transaction of the remote setup result.

Thus, according to this example embodiment, the participating node 950 manages profile information including a remote setup program code. Moreover, the participating node 950 executes a remote setup program code in accordance with a profile setup request transaction, and generates and transmits an embedded signal remote setup instruction signal. Consequently, the product installation location MNO device 920 can automatically perform profile remote setup to an embedded SIM (of the embedded SIM equipped product device 910) by the OTA technology for the embedded SIM equipped product device 910, in accordance with the received embedded signal remote setup instruction signal. In other words, according to this example embodiment, it is possible to automatically perform profile remote setup to an embedded SIM by the OTA technology based on an initial connection signal from the embedded SIM equipped product device 910.

Ninth Example Embodiment

Next, an example of a flow of a series of processes described in the first to eighth example embodiment will be described with reference to FIG. 44.

Figure 44:
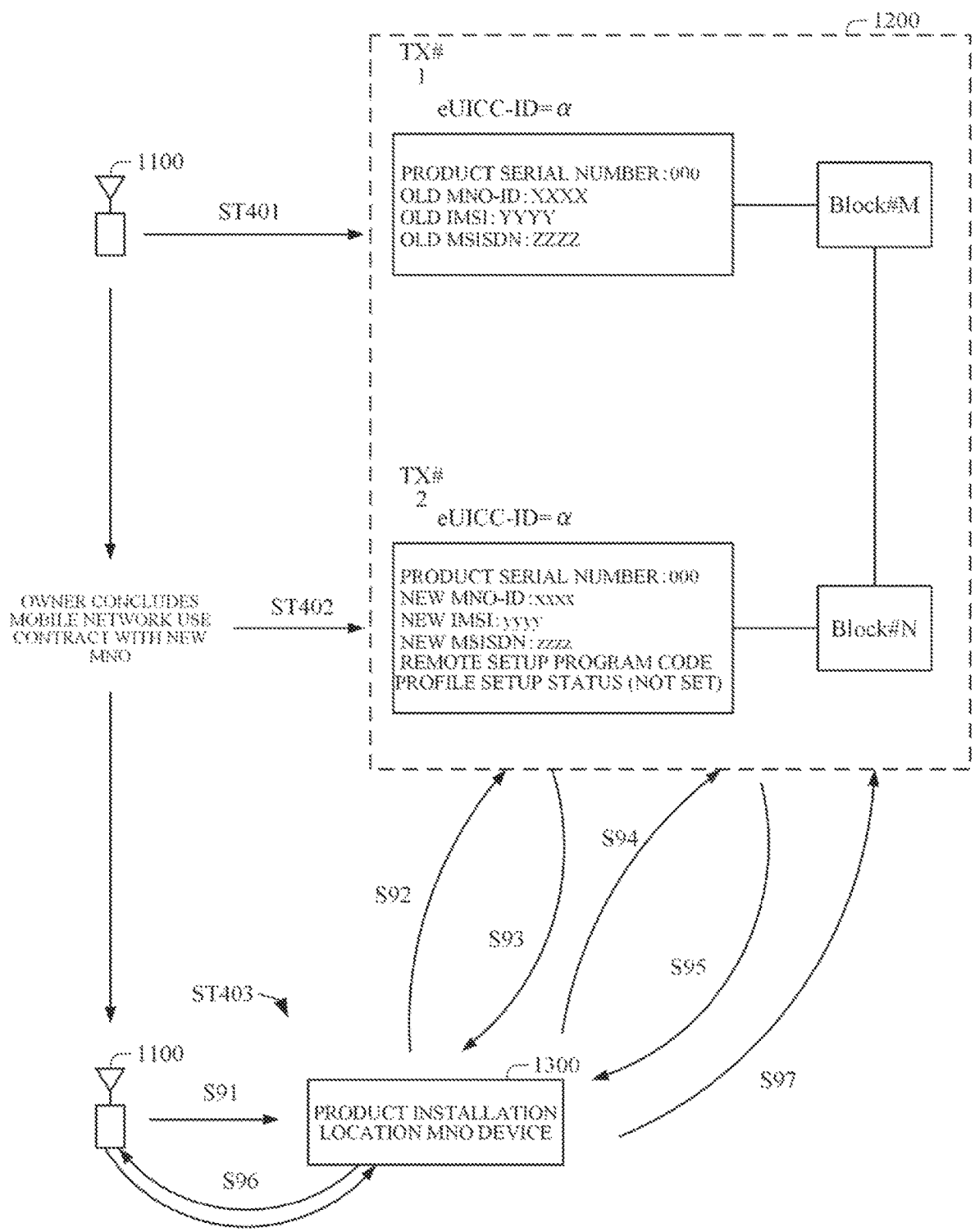
FIG. 44 is a configuration diagram of a ninth example embodiment of the present invention.

With reference to FIG. 44, an embedded SIM management system according to this example embodiment includes an embedded SIM equipped product device 1100, (a participating node configuring) a peer-to-peer network 1200, and a product installation location MNO device 1300. Moreover, the embedded SIM management system according to this example embodiment includes an embedded SIM equipped product manufacturer device, an embedded SIM equipped product owner device, a subscription MNO device, or the like, not shown in FIG. 44.

In the case shown in FIG. 44, for example, at the time of shipment of the embedded SIM equipped product device 1100 from the factory, information such as an embedded SIM number (eUICC-ID), an embedded SIM equipped product manufacture number (product serial number), an MNO access ID for setup profile (old MNO-ID), an IMSI for setup profile (old IMSI) and an MSISDN for setup profile (old MSISDN) is written into an embedded SIM installed in the embedded SIM equipped product device 1100. Moreover, an embedded SIM equipped product manufacturer device, which is a device corresponding to a manufacturer such as the manufacturer of the embedded SIM equipped product device 1100, broadcasts an information registration request transaction including the above-described information to the peer-to-peer network 1200 (ST401).

A purchaser of the embedded SIM equipped product device 1100 concludes a mobile network use contract with a new MNO. Then, an embedded SIM equipped product owner device or the like broadcasts an information registration request transaction including a remote setup program code, new profile setup information and so on to the peer-to-peer network 1200 (ST402). The processing at step ST402 is the same as, for example, the processing of FIG. 40 in the eighth example embodiment.

After that, the embedded SIM equipped product device 1100 transmits an initial connection signal from any location to the product installation location MNO device 1300 (ST403, S91). After that, the processing as described in FIG. 42 is executed.

That is, the product installation location MNO device 1300 having received the initial connection signal broadcasts an information use request transaction to the peer-to-peer network 1200 (ST92). The (participating node participating in the) peer-to-peer network 1200 returns a response signal in accordance with the received information use request transaction (S93). Subsequently, the product installation location MNO device 1300 confirms the validity of the connection based on the received response signal, and thereafter, broadcasts a profile setup request transaction to the peer-to-peer network 1200 (S94). The peer-to-peer network 1200 (each participating node thereof) executes a remote setup program code based on the profile setup request transaction. Then, an embedded SIM remote setup instruction signal generated as a result of execution of the remote setup program code is transmitted to the product installation location MNO device 1300 (S95). Upon receiving the embedded SIM remote setup instruction signal, the product installation location MNO device 1300 rewrites setup information of the embedded SIM in the embedded SIM equipped product device 1100 to a new one by the OTA technology, based on the received embedded SIM remote setup instruction signal (S96). After that, the product installation location MNO device 1300 broadcasts an information registration request transaction representing the remote setup result to the peer-to-peer network 1200 (S97).

Thus, according to this example embodiment, based on an initial connection signal from the embedded SIM equipped product device 1100, it is possible to automatically perform profile remote setup to an embedded SIM by the OTA technology.

Tenth Example Embodiment

In this example embodiment, the summary of the present invention will be described.

Figure 48:
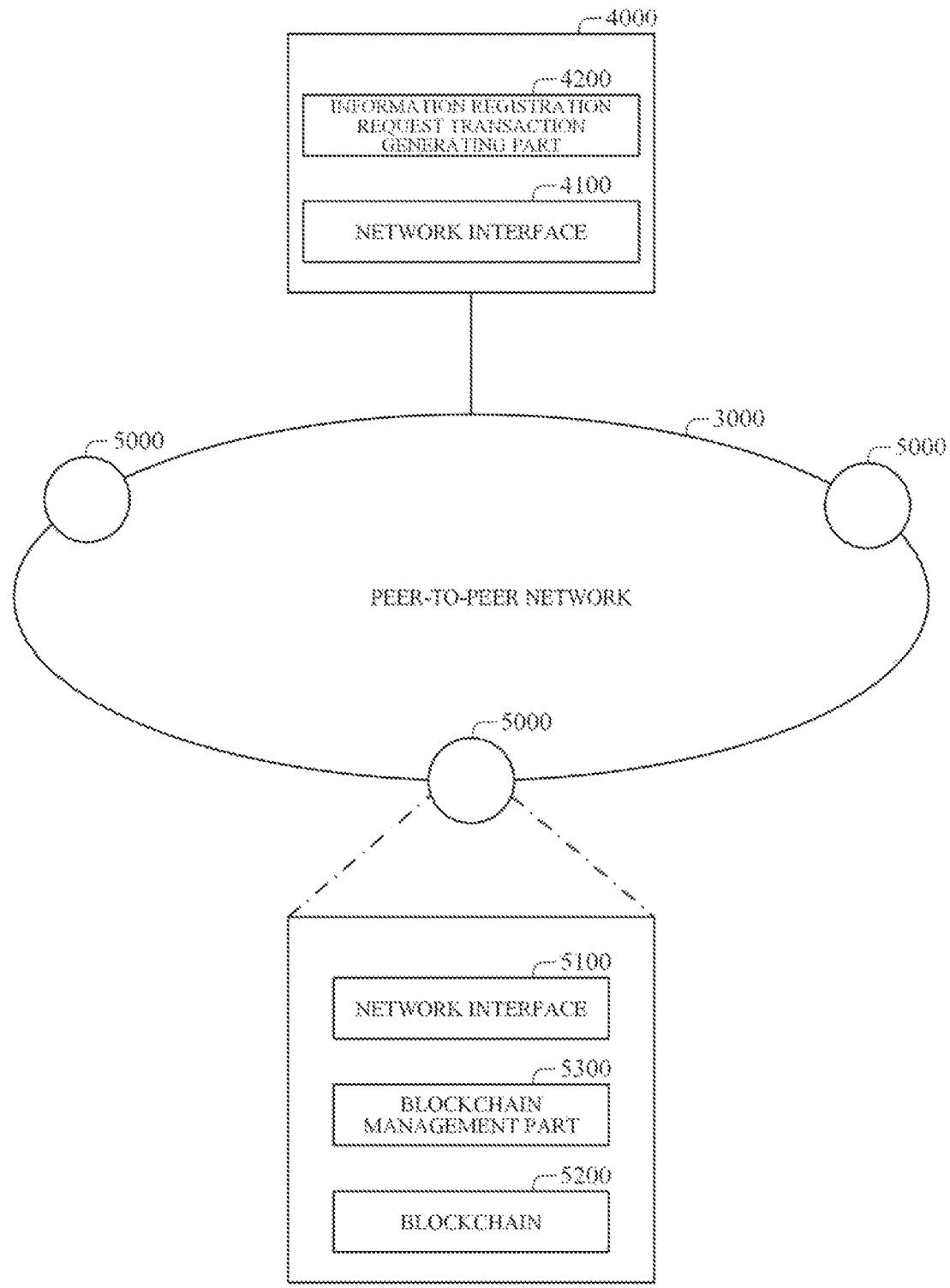
FIG. 48 is a configuration diagram of a tenth example embodiment of the present invention.

With reference to FIG. 48, an embedded SIM management system 2000 according to this example embodiment includes a peer-to-peer network 3000 including a plurality of node devices 5000 capable of peer-to-peer communication with each other, and an information registrant device 4000.

The information registrant device 4000 includes a network interface 4100 and an information registration request transaction generating part 4200. The information registration request transaction generating part 4200 generates an information registration request transaction and broadcasts the generated information registration request transaction to the peer-to-peer network 3000 via the network interface 4100. To be more specific, the information registration request transaction generating part 4200 is configured to generate an information registration request transaction based on embedded SIM information including SIM identification information and a profile, an electronic signature put on the embedded SIM information by using a private key of the information registrant, and a public key paired with the private key. The information registration request transaction generating part 4200 can be configured in a similar manner as the information registration request transaction generating part described in the first to ninth example embodiments, but is not limited thereto.

Each of the node devices 5000 includes a network interface 5100, a blockchain 5200, and a blockchain management part 5300. The blockchain 5200 is a data structure in which blocks each bundling transactions of a predetermined period are connected in chain. For example, the blockchain 5200 may be a blockchain of Ethereum, but is not limited thereto. The blockchain 5200 is also referred to as a DB for embedded SIM management. The blockchain management part 5300 accumulates information registration request transactions received through the network interface 5100 into the blockchain 5200, based on a consensus building algorithm executed in cooperation with the other node device 5000. The blockchain management part 5300 may be configured in a similar manner to the blockchain management parts described in the first to ninth example embodiments, but is not limited thereto.

The embedded SIM management system 2000 thus configured according to this example embodiment operates in the following manner. That is to say, the information registrant device 4000 causes the information registration request transaction generating part 4200 to generate an information registration request transaction based on embedded SIM information including SIM identification information and a profile, an electronic signature put on the embedded SIM information by using a private key of the information registrant, and a public key paired with the private key. Next, the information registrant device 4000 causes the network interface 4100 to broadcast the information registration request transaction to the peer-to-peer network 3000.

Each of the node devices 5000 causes the network interface 5100 to receive the information registration request transaction having been broadcast. Next, each of the node devices 5000 causes the blockchain management part 5300 to accumulate the received information registration request transactions into the blockchain 5200, based on a consensus building algorithm executed in cooperation with the other node device 5000.

Thus, according to this example embodiment, embedded SIM information is managed by the blockchain technology, it is possible to provide an embedded SIM management system which is excellent in reliability, availability and maintainability.

<Supplementary Notes>

The whole or part of the example embodiments disclosed above can be described as, but not limited to, the following supplementary notes.

[Supplementary Note 1]

A node device configuring a peer-to-peer network, the node device comprising:

a network interface; and a blockchain management part configured to receive, through the network interface, an information registration request transaction that includes embedded Subscriber Identity Module, SIM, information including SIM identification information and a profile, an electronic signature put on the embedded SIM information by using a private key of an information registrant, and a public key paired with the private key, and accumulate the received information registration request transaction into a blockchain based on a consensus building algorithm executed in cooperation with another node device configuring the peer-to-peer network.

[Supplementary Note 2]

The node device according to Supplementary Note 1, wherein the blockchain management part is configured to retrieve, from the blockchain, another information registration request transaction that includes same SIM identification information as the SIM identification information included by the received information registration request transaction, and judge validity of the received information registration request transaction based on a result of comparison between a public key included by the retrieved another information registration request transaction and the public key included by the received information registration request transaction.

[Supplementary Note 2A]

The node device according to Supplementary Note 2, wherein the blockchain management part is configured to judge the received information registration request transaction is valid when the public key included by the received information registration request transaction matches the public keys included by all the retrieved other information registration request transactions.

[Supplementary Note 2B]

The node device according to Supplementary Note 2, wherein the blockchain management part is configured to judge the received information registration request transaction is valid when the public key included by the received information registration request transaction matches a latest public key included by the retrieved another information registration request transaction.

[Supplementary Note 3]

The node device according to Supplementary Note 2, wherein the blockchain management part is configured to judge the received information registration request transaction is valid when the public key included by the received information registration request transaction matches at least a latest public key included by the retrieved another information registration request transaction.

[Supplementary Note 4]

The node device according to Supplementary Note 1, wherein the blockchain management part is configured to judge validity of the received information registration request transaction based on an outsourcing certification or a subcontract certificate included by the received information registration request transaction.

[Supplementary Note 5]

The node device according to any of Supplementary Notes 1 to 4, further comprising an inquiry responding part configured to, upon receiving an information inquiry request through the network interface, acquire the embedded SIM information corresponding to SIM identification information included by the information inquiry request from the information accumulated in the blockchain, and generate a response to be transmitted through the network interface.

[Supplementary Note 6]

The node device according to any of Supplementary Notes 1 to 5, wherein a program code is included in the embedded SIM information, the node device being configured to, upon receiving a profile setup request transaction through the network interface, generate an embedded SIM remote setup instruction signal by executing the program code in accordance with the received profile setup request transaction, and transmit the generated embedded SIM remote setup instruction signal through the network interface.

[Supplementary Note 7]

An embedded Subscriber Identify Module, SIM, management method executed by a node device configuring a peer-to-peer network, the embedded SIM management method comprising:

receiving, through a network interface, an information registration request transaction that includes embedded SIM information including SIM identification information and a profile, an electronic signature put on the embedded SIM information by using a private key of an information registrant, and a public key paired with the private key, and accumulating the received information registration request transaction into a blockchain based on a consensus building algorithm executed in cooperation with another node device configuring the peer-to-peer network.

[Supplementary Note 8]

A computer program comprising instructions for causing a computer configuring a peer-to-peer network to functions as:

a network interface; and a blockchain management part configured to receive, through the network interface, an information registration request transaction that includes embedded Subscriber Identity Module, SIM, information including SIM identification information and a profile, an electronic signature put on the embedded SIM information by using a private key of an information registrant, and a public key paired with the private key, and accumulate the received information registration request transaction into a blockchain based on a consensus building algorithm executed in cooperation with another node device configuring the peer-to-peer network.

[Supplementary Note 9]

An information registrant device configured to broadcast an information registration request transaction to a peer-to-peer network configured by a plurality of node devices capable of peer-to-peer communication with each other, the information registrant device comprising:

a network interface; and an information registration request transaction generating part configured to generate the information registration request transaction and broadcast the transaction to the peer-to-peer network through the network interface, wherein the information registration request transaction generating part is configured to generate the information registration request transaction based on embedded Subscriber Identity Module, SIM, information including SIM identification information and a profile, an electronic signature put on the embedded SIM information by using a private key of an information registrant, and a public key paired with the private key.

[Supplementary Note 10]

The information registrant device according to Supplementary Note 9, wherein the information registration request transaction generating part is configured to generate the information registration request transaction based on an electronic signature put on information including the SIM identification information and a new public key used instead of the public key by using the private key, and the public key paired with the private key.

[Supplementary Note 11]

The information registrant device according to Supplementary Note 9, wherein the information registration request transaction generating part is configured to generate the information registration request transaction based on an electronic signature put on information including the SIM identification information and a new profile used instead of the profile by using the private key of the user terminal, and the public key paired with the private key.

[Supplementary Note 12]

The information registrant device according to Supplementary Note 9, wherein the information registration request transaction generating part is configured to generate the information registration request transaction based on an electronic signature put on information including the SIM identification information and a new public key and also including an outsourcing certificate or a subcontract certificate by using a predetermined private key, and a public key paired with the predetermined private key.

[Supplementary Note 13]

The information registrant device according to any of Supplementary Notes 9 to 12, wherein the information registration request transaction generating part is configured to include confidence information that is secret information known to only a user and a contract carrier encrypted with a public key of the contract carrier, into the information registration request transaction.

[Supplementary Note 14]

An embedded Subscriber Identify Module, SIM, management system comprising a peer-to-peer network configured by a plurality of node devices capable of peer-to-peer communication with each other, and an information registrant device, wherein:

the information registrant device includes:

a first network interface; and an information registration request transaction generating part configured to generate an information registration request transaction and broadcast the transaction to the peer-to-peer network through the first network interface;

the information registration request transaction generating part is configured to generate the information registration request transaction based on embedded SIM information including SIM identification information and a profile, an electronic signature put on the embedded SIM information by using a private key of the information registrant, and a public key paired with the private key; and each of the node devices includes:

a second network interface; and a blockchain management part configured to accumulate the information registration request transaction received through the second network interface into a blockchain based on a consensus building algorithm executed in cooperation with the other node device.

[Supplementary Note 15]

The embedded SIM management system according to Supplementary Note 14, wherein the blockchain management part is configured to retrieve, from the blockchain, another information registration request transaction that includes same SIM identification information as the SIM identification information included by the received information registration request transaction, and judge validity of the received information registration request transaction based on a result of comparison between a public key included by the retrieved another information registration request transaction and the public key included by the received information registration request transaction.

[Supplementary Note 16]

The embedded SIM management system according to Supplementary Note 15, wherein the blockchain management part is configured to judge the received information registration request transaction is valid when the public key included by the received information registration request transaction matches the public keys included by all the retrieved other information registration request transactions.

[Supplementary Note 17]

The embedded SIM management system according to Supplementary Note 15, wherein the blockchain management part is configured to judge the received information registration request transaction is valid when the public key included by the received information registration request transaction matches a latest public key included by the retrieved another information registration request transaction.

[Supplementary Note 18]

The embedded SIM management system according to Supplementary Note 15, wherein the blockchain management part is configured to judge the received information registration request transaction is valid when the public key included by the received information registration request transaction matches at least a latest public key included by the retrieved another information registration request transaction.

[Supplementary Note 19]

The embedded SIM management system according to Supplementary Note 14, wherein the information registration request transaction generating part is configured to generate the information registration request transaction based on an electronic signature put on information including the SIM identification information and a new public key used instead of the public key by using the private key, and the public key paired with the private key.

[Supplementary Note 20]

The embedded SIM management system according to Supplementary Note 14, wherein the information registration request transaction generating part is configured to generate the information registration request transaction based on an electronic signature put on information including the SIM identification information and a new profile used instead of the profile by using the private key of the user terminal, and the public key paired with the private key.

[Supplementary Note 21]

The embedded SIM management system according to Supplementary Note 14, wherein the information registration request transaction generating part is configured to generate the information registration request transaction based on an electronic signature put on information including the SIM identification information and a new public key and also including an outsourcing certificate or a subcontract certificate by using a predetermined private key, and a public key paired with the predetermined private key.

[Supplementary Note 22]

The embedded SIM management system according to Supplementary Note 21, wherein the blockchain management part is configured to judge validity of the received information registration request transaction based on the outsourcing certificate or the subcontract certificate included by the received information registration request transaction.

[Supplementary Note 23]

The embedded SIM management system according to any of Supplementary Notes 14 to 22, wherein the information registration request transaction generating part is configured to include confidence information that is secret information known to only a user and a contract carrier encrypted with a public key of the contract carrier, into the information registration request transaction.

[Supplementary Note 24]

The embedded SIM management system according to any of Supplementary Notes 14 to 23, wherein each of the node devices further comprising an inquiry responding part configured to, upon receiving an information inquiry request through the second network interface, acquire the embedded SIM information corresponding to the SIM identification information included by the information inquiry request, from the information accumulated in the blockchain, and generate a response to be transmitted through the network interface.

[Supplementary Note 25]

The embedded SIM management system according to any of Supplementary Notes 14 to 24, wherein:

a program code is included in the embedded SIM information; and each of the node devices is further configured to, upon receiving a profile setup request transaction through the network interface, generate an embedded SIM remote setup instruction signal by executing the program code in accordance with the received profile setup request transaction, and transmit the generated embedded SIM remote setup instruction signal through the network interface.

The program described in the example embodiments and the supplementary notes is stored in a storage device or recorded on a computer-readable recording medium. For example, the recording medium is a portable medium such as a flexible disk, an optical disk, a magneto-optical disk and a semiconductor memory.

Although the present invention has been described above with reference to the above example embodiments, the present invention is not limited to the example embodiments described above. The configurations and details of the present invention can be changed in various manners that can be understood by one skilled in the art within the scope of the present invention.

The present invention is based upon and claims the benefit of priority from Japanese patent application No. 2016-196566, filed on Oct. 4, 2016, the disclosure of which is incorporated herein in its entirety by reference.

DESCRIPTION OF REFERENCE NUMERALS 1 embedded SIM management system
2 peer-to-peer network
2a node device
2b network interface
2c arithmetic processing part
2d storage part
2e program
2f blockchain
2g blockchain management part
2h inquiry responding part
3 information registrant device
3a network interface
3b arithmetic processing part
3c storage part
3d program
3e information registration request transaction generating part
4 information user device
4a network interface
4b arithmetic processing part
4c storage part
4d program
4e information use request transaction generating part
10 information registrant device
20 information user device
30 peer-to-peer network
40 participating node
100 embedded SIM manufacturer device
110 embedded SIM equipped product manufacturer device
120 old contract MNO device
130 new contract MNO device
140 embedded SIM equipped product owner device
150 embedded SIM equipped product device
160 peer-to-peer network
170 participating node
400 embedded SIM manufacturer device
410 embedded SIM equipped product manufacturer device
420 contract MNO device
430 peer-to-peer network
440 participating node
500 embedded SIM manufacturer device
510 embedded SIM equipped product manufacturer device
520 contract MNO device
530 peer-to-peer network
540 participating node
600 embedded SIM equipped product owner device
610 new contract MNO device
620 old contract MNO device
630 peer-to-peer network
640 participating node
700 valid embedded SIM number owner
710 communication carrier device without contract
720 connection destination MNO device of embedded SIM equipped product
730 peer-to-peer network
740 participating node
790 malicious third party
800 valid embedded SIM number owner (subscriber device)
810 subscribing communication carrier device
820 connection destination MNO device of embedded SIM equipped product
830 peer-to-peer network
840 participating node
890 malicious third party
900 embedded SIM equipped product owner device
910 embedded SIM equipped product device
920 product installation location MNO device
930 subscribing MNO device
940 peer-to-peer network
950 participating node
1100 embedded SIM equipped product device
1200 peer-to-peer network
1300 product installation location MNO device
2000 embedded SIM management system
3000 peer-to-peer network
4000 information registrant device
4100 network interface
4200 information registration request transaction generating part
5000 node device 5100 network interface
5200 blockchain
5300 blockchain management part

What is claimed is:

1. A node device configuring a peer-to-peer network, the node device managing a DB for embedded Subscriber Identity Module, SIM, management, the node device comprising:
a network interface; and
a blockchain management part configured to receive, through the network interface, an information registration request transaction that includes embedded SIM information including SIM identification information and a profile, an electronic signature put on the embedded SIM information by using a private key of an information registrant, and a public key paired with the private key, and accumulate the received information registration request transaction into a blockchain based on a consensus building algorithm executed in cooperation with another node device configuring the peer-to-peer network,
wherein the embedded SIM information includes a program code for prompting remote setup of a profile by a mobile network operator (MNO) device,
the node device being configured to, upon receiving a profile setup request transaction from the MNO device through the network interface, generate an embedded SIM remote setup instruction signal for prompting remote setup of the profile by executing the program code in accordance with the received profile setup request transaction, and transmit, to the MNO device, the generated embedded SIM remote setup instruction signal through the network interface.

2. The node device according to claim 1, wherein the blockchain management part is configured to retrieve, from the blockchain, another information registration request transaction that includes same SIM identification information as the SIM identification information included by the received information registration request transaction, and judge validity of the received information registration request transaction based on a result of comparison between a public key included by the retrieved another information registration request transaction and the public key included by the received information registration request transaction.

3. The node device according to claim 2, wherein the blockchain management part is configured to judge the received information registration request transaction is valid when the public key included by the received information registration request transaction matches at least a latest public key included by the retrieved another information registration request transaction.

4. The node device according to claim 1, wherein the blockchain management part is configured to judge validity of the received information registration request transaction based on an outsourcing certification or a subcontract certificate included by the received information registration request transaction.

5. The node device according to claim 1, further comprising an inquiry responding part configured to, upon receiving an information inquiry request through the network interface, acquire the embedded SIM information corresponding to SIM identification information included by the information inquiry request from the information accumulated in the blockchain, and generate a response to be transmitted through the network interface.

6. An embedded Subscriber Identify Module, SIM, management method executed by a node device configuring a peer-to-peer network, the node device managing a DB for embedded SIM management, the embedded SIM management method comprising:
receiving, through a network interface, an information registration request transaction that includes embedded SIM information including SIM identification information and a profile, an electronic signature put on the embedded SIM information by using a private key of an information registrant, and a public key paired with the private key, and accumulating the received information registration request transaction into a blockchain based on a consensus building algorithm executed in cooperation with another node device configuring the peer-to-peer network,
wherein the embedded SIM information includes a program code for prompting remote setup of a profile by a mobile network operator (MNO) device,
the embedded SIM management method further comprising, upon receiving a profile setup request transaction from the MNO device through the network interface, generating an embedded SIM remote setup instruction signal for prompting remote setup of the profile by executing the program code in accordance with the received profile setup request transaction, and transmitting, to the MNO device, the generated embedded SIM remote setup instruction signal through the network interface.

7. A non-transitory computer-readable recording medium for recording a program comprising instructions for causing a computer configuring a peer-to-peer network the node device managing a DB for embedded Subscriber Identity Module, SIM, management, to functions as:
a network interface; and
a blockchain management part configured to receive, through the network interface, an information registration request transaction that includes embedded SIM, information including SIM identification information and a profile, an electronic signature put on the embedded SIM information by using a private key of an information registrant, and a public key paired with the private key, and accumulate the received information registration request transaction into a blockchain based on a consensus building algorithm executed in cooperation with another node device configuring the peer-to-peer network,
wherein the embedded SIM information includes a program code for prompting remote setup of a profile by a mobile network operator (MNO) device,
the program further comprising instructions for causing the computer to, upon receiving a profile setup request transaction from the MNO device through the network interface, generate an embedded SIM remote setup instruction signal for prompting remote setup of the profile by executing the program code in accordance with the received profile setup request transaction, and transmit, to the MNO device, the generated embedded SIM remote setup instruction signal through the network interface.

* * * * *